(12) United States Patent
Lewis et al.

(10) Patent No.: US 9,002,944 B2
(45) Date of Patent: Apr. 7, 2015

(54) VIRTUAL BADGE, DEVICE AND METHOD

(71) Applicant: Pathfinders International, LLC, West Palm Beach, FL (US)

(72) Inventors: Scott Lewis, West Palm Beach, FL (US); John M. Simion, West Palm Beach, FL (US)

(73) Assignee: Pathfinders International, LLC, West Palm Beach, FL (US)

( * ) Notice: Subject to any disclaimer, the term of this patent is extended or adjusted under 35 U.S.C. 154(b) by 0 days.

(21) Appl. No.: 14/269,643

(22) Filed: May 5, 2014

(65) Prior Publication Data

US 2014/0333412 A1    Nov. 13, 2014

Related U.S. Application Data

(63) Continuation-in-part of application No. 13/661,555, filed on Oct. 26, 2012, and a continuation-in-part of application No. 13/536,618, filed on Jun. 28, 2012, which is a continuation-in-part of application No.

(Continued)

(51) Int. Cl.
*G07C 9/00* (2006.01)
*G06Q 10/00* (2012.01)

(52) U.S. Cl.
CPC ........... *G07C 9/00031* (2013.01); *G06Q 10/00* (2013.01); *G07C 9/00079* (2013.01); *G07C 9/00103* (2013.01); *G07C 9/00111* (2013.01)

(58) Field of Classification Search
USPC ........................................................ 709/204
See application file for complete search history.

(56) References Cited

U.S. PATENT DOCUMENTS

| | | | |
|---|---|---|---|
| 4,786,008 | A | 11/1988 | Corbett |
| 4,956,875 | A | 9/1990 | Bernard et al. |
| 5,278,539 | A | 1/1994 | Lauterbach et al. |
| 5,555,286 | A | 9/1996 | Tendler |

(Continued)

FOREIGN PATENT DOCUMENTS

EP    1 903 757 A1    3/2008

OTHER PUBLICATIONS

Anonymous, "SB1 smart badge", Motorola solutions product preview sheet, pp. 1-2, (Jun. 2012).

(Continued)

*Primary Examiner* — Tu Nguyen
(74) *Attorney, Agent, or Firm* — McHale & Slavin P.A.

(57) ABSTRACT

A system, methods, and devices comprising a virtual badge are disclosed. The virtual badge can be displayed on an electronic device or on another linked or unlinked portable device. For use in both emergency and non-emergency scenarios, the virtual badge comprises images and data which can be scanned, and the capability to alternate colors and/or self-destruct on a pre-set schedule. The system, methods, and devices may use a self-destruct mechanism which renders the virtual badge unusable. Using plugin technologies, the system optionally can enable field collected photos and notes on customizable forms to be mapped, tracked, and time/date stamped, including in a 100% disconnected environment. A modifiable virtual badge can aid in credentialing via certifications and qualifications, inventory, accountability, organization, and efficiency. The system, methods, and devices are designed to aid in access control, and other activities, such as data collection, inventory, accountability, payment gateways, and site management.

27 Claims, 29 Drawing Sheets

Related U.S. Application Data

13/524,724, filed on Jun. 15, 2012, now abandoned, which is a continuation-in-part of application No. 13/296,874, filed on Nov. 15, 2011, which is a continuation-in-part of application No. 12/410,003, filed on Mar. 24, 2009, now Pat. No. 8,154,440, which is a continuation-in-part of application No. 11/696,532, filed on Apr. 4, 2007, now abandoned.

(60) Provisional application No. 61/709,844, filed on Oct. 4, 2012.

(56) References Cited

U.S. PATENT DOCUMENTS

| | | |
|---|---|---|
| 5,592,408 A | 1/1997 | Keskin et al. |
| 5,619,412 A | 4/1997 | Hapka |
| 5,628,050 A | 5/1997 | McGraw et al. |
| 5,652,717 A | 7/1997 | Miller et al. |
| 5,724,255 A | 3/1998 | Smith et al. |
| 5,808,916 A | 9/1998 | Orr et al. |
| 5,815,417 A | 9/1998 | Orr et al. |
| 5,848,373 A | 12/1998 | DeLorme et al. |
| 5,914,675 A | 6/1999 | Tognazzini |
| 5,978,804 A | 11/1999 | Dietzman |
| 6,002,748 A | 12/1999 | Leichner |
| 6,023,223 A | 2/2000 | Baxter, Jr. |
| 6,028,514 A | 2/2000 | Lemelson et al. |
| 6,058,304 A | 5/2000 | Callaghan et al. |
| 6,084,510 A | 7/2000 | Lemelson et al. |
| 6,133,854 A | 10/2000 | Yee et al. |
| 6,141,609 A | 10/2000 | Herdeg et al. |
| 6,151,611 A | 11/2000 | Siegel |
| 6,167,255 A | 12/2000 | Kennedy, III et al. |
| 6,199,045 B1 | 3/2001 | Giniger et al. |
| 6,268,798 B1 | 7/2001 | Dymek et al. |
| 6,273,771 B1 | 8/2001 | Buckley et al. |
| 6,285,281 B1 | 9/2001 | Gatto |
| 6,292,724 B1 | 9/2001 | Apsell et al. |
| 6,315,198 B1 | 11/2001 | Lenglart et al. |
| 6,360,172 B1 | 3/2002 | Burfeind et al. |
| 6,373,430 B1 | 4/2002 | Beason et al. |
| 6,394,356 B1 | 5/2002 | Zagami |
| 6,429,812 B1 | 8/2002 | Hoffberg |
| 6,542,825 B2 | 4/2003 | Jones et al. |
| 6,550,674 B1 | 4/2003 | Neumark |
| 6,574,561 B2 | 6/2003 | Alexander et al. |
| 6,590,529 B2 | 7/2003 | Schwoegler |
| 6,603,405 B2 | 8/2003 | Smith |
| 6,693,586 B1 | 2/2004 | Walters et al. |
| 6,765,528 B2 | 7/2004 | Tranchina et al. |
| 6,771,969 B1 | 8/2004 | Chinoy et al. |
| 6,842,774 B1 | 1/2005 | Piccioni |
| 6,865,476 B1 | 3/2005 | Jokerst, Sr. |
| 6,868,320 B1 | 3/2005 | Burch |
| 6,868,340 B2 | 3/2005 | Alexander et al. |
| 6,999,876 B2 | 2/2006 | Lambert et al. |
| 7,068,163 B2 | 6/2006 | Sari et al. |
| 7,142,900 B1 | 11/2006 | Straub |
| 7,143,130 B2 | 11/2006 | Lin |
| 7,207,480 B1 | 4/2007 | Geddes |
| 7,295,119 B2 | 11/2007 | Rappaport et al. |
| 7,295,960 B2 | 11/2007 | Rappaport et al. |
| 7,631,805 B2 | 12/2009 | Larson et al. |
| 7,760,905 B2 | 7/2010 | Rhoads et al. |
| 7,778,802 B2 | 8/2010 | O'Flaherty et al. |
| 7,808,378 B2 | 10/2010 | Hayden |
| 7,822,816 B2 | 10/2010 | Payne |
| 8,045,954 B2 | 10/2011 | Barbeau et al. |
| 8,073,461 B2 | 12/2011 | Altman et al. |
| 8,131,281 B1 | 3/2012 | Hildner et al. |
| 8,145,183 B2 | 3/2012 | Barbeau et al. |
| 8,154,440 B2 | 4/2012 | Lewis |
| 8,174,931 B2 | 5/2012 | Vartanian et al. |
| 8,548,914 B2 | 10/2013 | Sinton et al. |
| 2002/0042846 A1 | 4/2002 | Bottan et al. |
| 2002/0069312 A1 | 6/2002 | Jones |
| 2002/0077953 A1 | 6/2002 | Dutta |
| 2002/0152028 A1 | 10/2002 | Motoyama et al. |
| 2002/0173909 A1 | 11/2002 | Verbil |
| 2002/0188522 A1 | 12/2002 | McCall et al. |
| 2003/0080897 A1 | 5/2003 | Tranchina et al. |
| 2003/0090735 A1 | 5/2003 | Silverbrook et al. |
| 2004/0010472 A1 | 1/2004 | Hilby et al. |
| 2004/0049345 A1 | 3/2004 | McDonough et al. |
| 2004/0097929 A1 | 5/2004 | Branch et al. |
| 2004/0225432 A1 | 11/2004 | Pilley et al. |
| 2004/0230809 A1* | 11/2004 | Lowensohn et al. .......... 713/186 |
| 2005/0035862 A1* | 2/2005 | Wildman et al. .......... 340/573.1 |
| 2005/0114015 A1 | 5/2005 | Motoyama et al. |
| 2005/0116858 A1 | 6/2005 | Odamura |
| 2005/0152028 A1 | 7/2005 | Mitzkus |
| 2005/0210131 A1 | 9/2005 | Motoyama et al. |
| 2005/0212701 A1 | 9/2005 | Nimmo |
| 2005/0253753 A1 | 11/2005 | Lalik et al. |
| 2005/0267707 A1 | 12/2005 | Mian et al. |
| 2005/0288854 A1 | 12/2005 | Kitajima |
| 2006/0030339 A1 | 2/2006 | Zhovnirovsky et al. |
| 2006/0030356 A1 | 2/2006 | Haub et al. |
| 2006/0079200 A1 | 4/2006 | Hirouchi et al. |
| 2006/0148423 A1 | 7/2006 | Sharpe |
| 2006/0168185 A1 | 7/2006 | McCall et al. |
| 2006/0241761 A1 | 10/2006 | Gately |
| 2007/0106892 A1 | 5/2007 | Engberg |
| 2007/0213737 A1 | 9/2007 | Schermerhorn et al. |
| 2008/0208962 A1 | 8/2008 | Kim et al. |
| 2008/0246652 A1 | 10/2008 | Lewis |
| 2009/0307333 A1 | 12/2009 | Welingkar et al. |
| 2010/0076968 A1 | 3/2010 | Boyns et al. |
| 2010/0210240 A1 | 8/2010 | Mahaffey et al. |
| 2011/0070898 A1 | 3/2011 | Sanjeev et al. |
| 2012/0090038 A1 | 4/2012 | Pacella et al. |
| 2012/0130753 A1 | 5/2012 | Lewis |
| 2012/0270521 A1 | 10/2012 | Lopez Garcia et al. |
| 2012/0315877 A1 | 12/2012 | Lewis |

OTHER PUBLICATIONS

Van Grove, J., "Turn your phone into an 'Hello my name is' badge", Internet article, URL:http://mashable.com/2011/03/09/contxts-interactive-badge, (Mar. 9, 2011) retrieved Jan. 29, 2013.

Schaffhauser, D., "Student-invented mobile app could replace security access badges", Internet article: URLhttp//campustechnology.com/articles/2012/02/13/Student-invented-mobile-app-could-replace-security-access-badges.aspx, Campus Technology, (Feb. 13, 2012) retrieved Jan. 29, 2013.

Garlits, J., "New uses of social media and emergency technologies in emergency management", 14th Annual Federal Emergency Management Higher Education Conference, (Jun. 6-9, 2011).

* cited by examiner

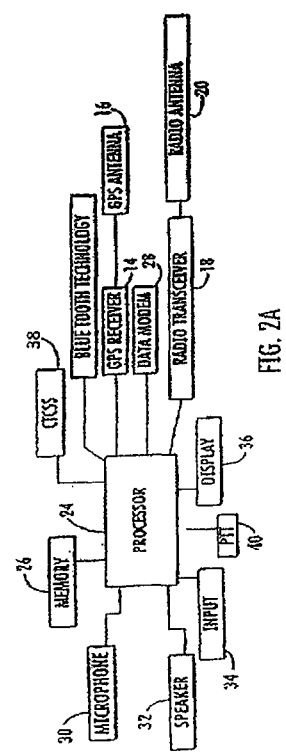
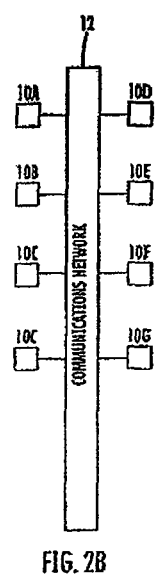
FIG. 2A
FIG. 2B

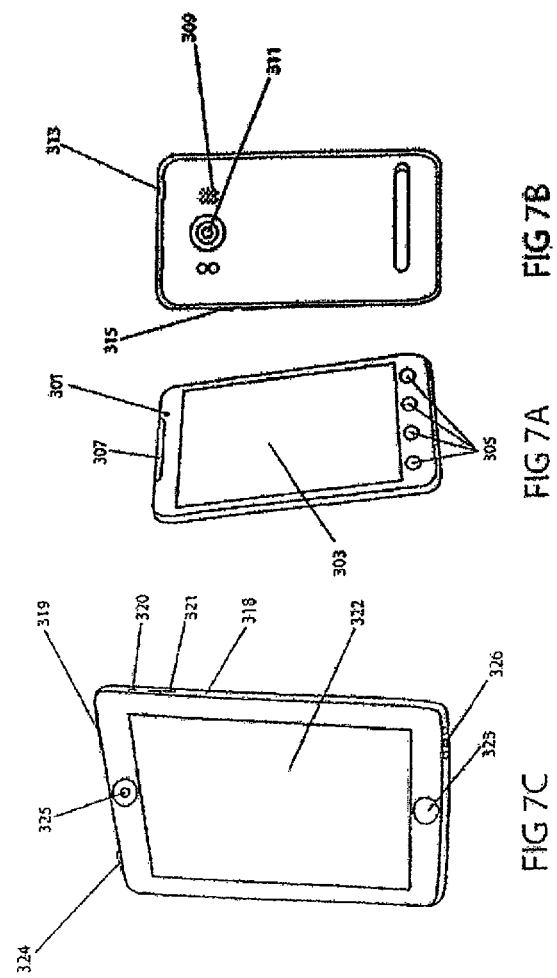

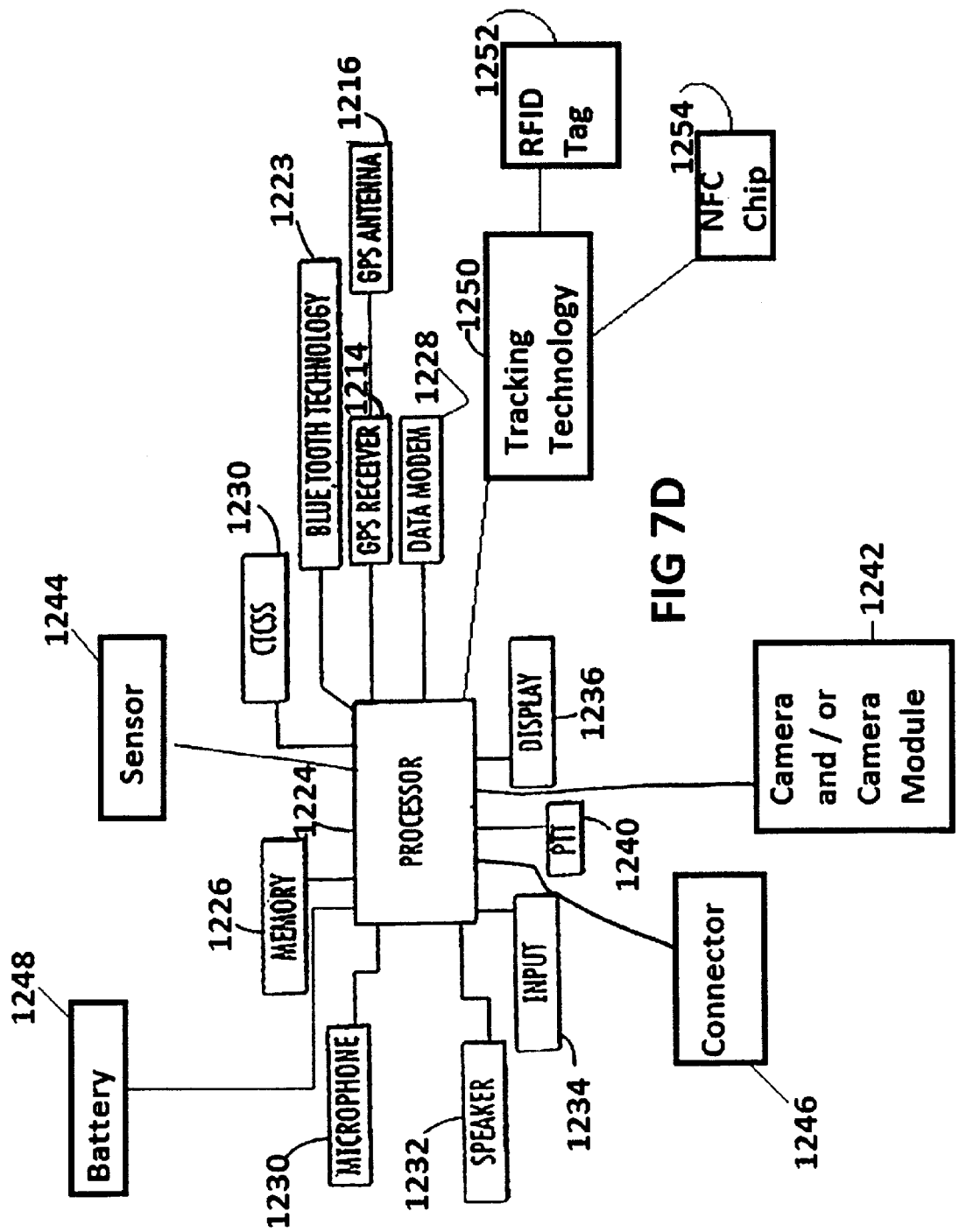

VIRTUAL BADGE, DEVICE AND METHOD

REFERENCE TO RELATED APPLICATIONS

In accordance with 37 C.F.R 1.76, a claim of priority is included in an Application Data Sheet filed concurrently herewith. Accordingly, the present is a continuation-in-part to U.S. patent application Ser. No. 13/661,555, filed on Oct. 26, 2012, entitled, "VIRTUAL BADGE, DEVICE AND METHOD" which claims priority to U.S. Provisional Patent Application No. 61/709,844, filed on Oct. 4, 2012; entitled, "VIRTUAL BADGE, DEVICE AND METHOD", and is a continuation-in-part of U.S. patent application Ser. No. 13/536,618, filed Jun. 28, 2012, entitled, "GPS PATHFINDER CELL PHONE AND METHOD", which is a continuation-in-part of U.S. patent application Ser. No. 13/524,724, filed Jun. 15, 2012, entitled, "GPS PATHFINDER CELL PHONE AND METHOD", which is a continuation-in-part of application U.S. patent application Ser. No. 13/296,874, filed Nov. 15, 2011, entitled, "GPS PATHFINDER CELL PHONE AND METHOD", which is a continuation-in-part of application U.S. patent application Ser. No. 12/410,003, filed Mar. 24, 2009, entitled "GPS PATHFINDER CELL PHONE AND METHOD", now U.S. Pat. No. 8,154,440, issued Apr. 10, 2012, which is a continuation-in-part of application U.S. patent application Ser. No. 11/696,532, filed Apr. 4, 2007, entitled "GPS PATHFINDER METHOD AND DEVICE" and now abandoned. This application is also related to U.S. patent application Ser. No. 13/757,320, filed Feb. 1, 2013, now U.S. Pat. No. 8,671,143, issued Mar. 11, 2014. The contents of each of the above referenced applications or patents are herein incorporated by reference in its entirety.

FIELD OF THE INVENTION

The present invention relates to electronic identification used in normal, day to day functions and for disaster response and recovery systems; and more particularly to systems, methods and/or devices which provide for virtual badge identification on an electronic mobile device, and methods of using the systems, methods and/or devices for operations.

BACKGROUND OF THE INVENTION

The present invention is based in part on technology disclosed in U.S. Pat. No. 8,154,440 ('440 patent). The '440 patent describes a mobile software system for a variety of operations before, during, and after a disaster. The '440 patent further disclosed systems that provided a mechanism which can be used in a variety of emergency management operations. One area not addressed was the need for rapid, massive registration, credentialing, and badge identification of large numbers of personnel, especially following a disaster. Responders, residents, and business owners, plus their employees, all need access to restricted areas. The National Response Framework even mandates such badging, yet no viable, fast, simple, inexpensive, and high capacity system is available. Up until now, plastic badges or temporary paper badges have been the norm. The cost of badge supplies, printers, labor, on site power, and wasted time preparing such items in the chaotic times following a disaster are replaced and/or augmented by the present systems, methods, and device. With the new "virtual" badging system described herein, having web based registration from areas remote from the restricted area as well as a mobile device-based "virtual badge," the present invention provides more rapid and efficient, mass implementation of identification mechanisms for multiple uses, including but not limited to law enforcement and security purposes. Combining background check options and the features of the prior claims allows for more widespread uses, in which the data can ultimately be used in either separate private networks, wider, shared cloud-based data systems, or can be merged and/or accessed at times of emergencies or disasters with public data systems for life safety and security purposes.

The present invention further describes a workflow management system designed to badge and also monitor and track mobile users, if desired. By providing administrators with the ability to send alerts and tasks to their badge users, as well as allowing users to send notes, forms, photos, and events to each other and/or a central server, the virtual badge system in accordance with the present invention can be used to efficiently manage personnel. While the present invention finds countless uses in the disaster and emergency management arenas, other non-emergency applications are contemplated and described herein.

The present invention uses the electronic identification as part of a system that can be configured to function in a variety of emergency and non-emergency operations, preferably using smart electronic devices. The present invention can be adapted to merge the dumb phones with smart phones and/or other mobile smart electronic devices into a system designed to not only work on both types of phones, but also allow for computers and/or smart phones to map and track mixed teams of virtual badge users. The virtual badge electronic identification system and devices are further designed to work regardless of the condition of the local power, cell, and Internet infrastructure—a needed requirement in the emergency management field.

DESCRIPTION OF THE PRIOR ART

Electronic identification devices are known in the art. For example, U.S. Pat. No. 7,207,480 is described as disclosing a system for providing certified digital photos as a form of photo identification. The patent describes an m-wallet transaction in which a vendor requests photo identification from the user of a mobile station, such as a mobile telephone or smart card. In response to the request, the mobile station is described as displaying a digital image of an authorized user of the mobile station. The mobile station is also described as displaying a trust-certification indicator to indicate to the vendor that the image is authentic. The mobile station is also described as being capable of retrieving the image of the authorized user, together with a trust-certification, from a service provider.

U.S. Pat. No. 8,548,914 is described as a method and system for a photo identification payment card transaction verification system for the use with a payment card interchange network. The system is described as being programmable to receive a photo of a card holder, assign a unique photo identifier to the photo, and to receive payment card transaction information for a payment cardholder from an interchange network. The interchange network is described as being capable of processing payment card transactions between a merchant and a cardholder.

U.S. Patent Application Publication No. 2012/0090038 is described as disclosing a method for forwarding, by a mobile device, a request for identification information associated with a user of the mobile device. The method is described as including receiving, from an identification provider, the identification information, and displaying, by the mobile device, at least some of the identification information.

What is needed in the art, however, is an improved electronic identification system that uses a virtual badging system which acts as an identification mechanism and can perform functional operations both in emergency and non-emergency scenarios. Such a must be able to function in a 100% disconnected environment and include a cell phone and/or a simple, inexpensive, lightweight, reusable, electronic device capable of either scanning and/or storing data, images, and/or photos, and being linked to a smart electronic device or dumb phone to assist in entry or re-entry into restricted areas, while providing unique field monitoring solutions to managers in any type of technology connected or disconnected environments.

SUMMARY OF THE INVENTION

The present invention relates to methods, systems, and/or devices which utilize a virtual badge system for use in various stages of operations, including emergency or emergent circumstances. Due to the customizable nature of the software described herein, the present invention is designed for use in non-disaster purposes as well. Such non-disaster uses, or operational functions, include, but are not limited to use with gated community access, restricted access areas, school access, visitor management, payment system gateways, identification verification for ticketing, guest accountability, site safety systems, business management applications, rapid marketing data collection, user-to-user and user-to-business social networking, and planned or spontaneous volunteer management. By providing a system that can be used on a daily basis, should there be a need for the method, system or device in an emergency situation, users will have a certain amount of familiarity, thereby eliminating the requirement of responders and citizens attempting to learn a new system in the chaos immediately following a disaster or chaotic, emergency situation.

A virtual badge, which can be tracked if desired, can contain customizable data, photos, and/or images, which are scannable for various applications. The virtual badge is displayed on an electronic device, such as a smart cell phone, and replicates what a typical plastic badge can display. The virtual badge system can also incorporate the capability to send a wireless electronic message to a local printer. The printer prints out a replication of the virtual badge, including its scannable images or other identifiable information, to a non-electronic medium, such as paper or a temporary, sticker badge, which then can be attached to a user's clothing. Random check points could scan this paper rendition of the virtual badge, providing possible tracking enhancement of visitors to a facility.

This system also can incorporate the Internet and a cell system, or alternatively can be used by linking to a local Wi-Fi or other wireless network area, if so programmed. A separate device is presented, which is either synced with a cell phone with a virtual badge or acts as an independent, stand alone device. The stand alone device can provide a cost-effective alternative to using expensive smart devices, so that a user may hang it around his/her neck with a lanyard and not be required to use a smart device. It is designed so any passerby can readily identify the user and/or a check-point guard can readily observe and/or scan the device to verify the user's identity. The virtual badge, displayed on a cell phone and/or the device, can be pre-programmed to change colors or designs as well as automatically be pre-programmed to "self-destruct" the images, photos, and/or data for security reasons, pursuant to an administrator's specifications. Similarly, an administrator could choose to send a non-scheduled, self-destruct message to the device and immediately render the virtual badge useless. Operating as a self-destruct mechanism, an overriding display of wording like "Expired" across a virtual badge would render a badge useless. For additional security and by using GPS, the virtual badge can be displayed on a map on the user's electronic device, a group leader's electronic device, a web-based administrator's computer and/or a base server. Further, for more efficient management purposes, a group leader's device can be authorized to display a map, which map reveals the locations of a designated group of virtual badge users. The entire new system can be linked into existing software systems using traditional paper badging systems to augment them.

The virtual badge system is unique in that it can allow a badge applicant to submit a remote registration request through a web-based portal, where an agency (or a business entity) such as a Fusion Center or local Sheriff's office, can review and approve the request. After authenticating a request, soliciting a payment if desired, creating a unique number or other identifier, and performing a background check, if desired, the agency then could send out a web link to the applicant via an email, text SMS, or some other electronic means, which contains a link to an App download store and the applicant's unique login credentials where the virtual badge application can be downloaded, logged-in, and then could be displayed either on the phone screen and/or on to a separate device. Using this method, the applicant is not required to be in the physical presence of the reviewing agency's personnel, who normally then would have to print out a plastic or paper badge. This badge is created in a virtual world, allowing for approving and sending out virtual badges across the country or the world, immediately, and then allowing for tracking those virtual badges using still active satellite and/or cell service, if desired, as they are inbound to a location.

Upon activation of the virtual badge (scanning the virtual badge "in"), if the GPS enabled mobile device running the virtual badge application is still linked via cell towers, or other communication networks, such as the Internet, the virtual badge can be mapped and tracked live. Alternatives for scanning in a device could be done by the user or by a supervisor with a virtual badge "team" loaded within his/her device or by having a supervisor's virtual badge scan an image on the user's device, thereby activating the tracking device if desired. GPS tracking could be mandatory without an option for the user to turn it off or alternatively allow the user to stop being tracked, dependent on the administrator's settings. The virtual badge also could be designed to be tracked in a local area network, using wireless systems such as but not limited to RFID (radio frequency identification), NFC (near field communication), or other chip, with an added linked device on a user's lanyard, if desired. For possible military uses where budget constraints are not as limited, live time monitoring using two-way satellite communication allows for even more enhancements.

The virtual badge could be created using a laptop computer running the virtual badge application linked to an electronic display device, such as cell phones in an area with no cell or Internet service at all. In the 100% disconnected environment (such as a system not having any cell tower functioning or within a hardened or dense structure where cell service is not available), the virtual badge could be sent from a laptop server to cell phones and/or the devices, using wireless or hard wired technologies, as best fits the situation. In this scenario, a welcome station could create and send the virtual badge to the guest standing at the station without any prior registration or the need for any cell service. Finally, and most importantly, this virtual badge can be used and mapped and tracked in a 100% disconnected environment following a disaster, or in any remote area where cell service is very limited or does not exist. In such cases, any data relating to location, movement, or direction of travel can be stored within the device. The stored data can be retrieved and analyzed to provide a picture of where and/or when the badge traveled within an area.

The separate, independent electronic device described above could display a series of customizable data, photos, changing background colors, and/or images, which originate from the user's own synced or linked cell phone, or other electronic device or alternatively from a central network administrator using the virtual badge software. This data, photos, and/or images are designed to be viewed and/or scanned, and various settings on the device allow for flexibility for settings to both accommodate battery life as well as changes in views for the user. The device also can be used to track the device holder via technology described herein or additionally by making use of tracking technology, such as but not limited to RFID or NFC technology. The device expands the capability of the system, while widening the scope of the invention to include mapping, tracking, and/or historical uses of the device and its holder, if desired. Because of its design and the ability to erase its memory, the device can be re-used multiple times for many different users, unlike present plastic or paper badges.

The present invention can further allow for tracking and monitoring the use of the virtual badge via other means. Through a scanning device, which could include a checkpoint's use of a smart phone with this system which has its own virtual badge scanning software, or through simply passing by an RFID or NFC reader, the system can log the location, time and date of that virtual badge user passing that check point. As an example, in a 100% disconnected environment, with a cached memory of approved virtual badge data stored within the smart phone of a guard at a check point, the guard could verify the virtual badge holder by scanning the guard's phone's camera over the virtual badge holder's optical machine readable representations of data as part of the displayed image of the badge, such as linear QR or bar code image, thus retrieving from his/her smart phone's local virtual badge database memory a photo and personally identifiable information of the virtual badge user to compare with the person in front of the check point's guard. If the virtual badge has sent its data to a temporary paper badge, the information on the paper badge can be scanned as well. This allows for user verification and/or user tracking in a facility utilizing the same methods. The new system further can allow a supervisor to visualize on a displayed map on his/her mobile or electronic device where all the virtual badges in a designated group currently are located.

The administrator or designee likewise could use the virtual badge data to facilitate seamlessly organizing crews according to the Incident Command System (ICS) or any other business structure. The system also can add or change the data stored in the virtual badge at any time through administrative procedures like scanning a user's driver's license, which may contain additional data to store in the virtual badge. The system can analyze and monitor the use of the virtual badge given the historical data provided by various ingresses and egresses past check points tied to the system, including in a 100% disconnected environment. Alternatively, the system can be linked to other systems for further analysis or integration on a more broad monitoring system via an Application Programming Interface (API) link into another system.

The software used in the present system, methods, or devices is designed to permit the device to automatically or manually download the information stored as data to a laptop "server" or other device which functions as a "server," including datacenter based servers ("cloud" servers), with the virtual badge administrative system within that server, when the cell phone and/or device is within BLUETOOTH®, cellular or other wireless service range of the server. In the situation where there is no cell service, a cell phone and/or device can communicate to the laptop server without the use of cell towers or the Internet, which in a totally or partially disconnected environment, is the setting frequently confronting users. This system relies upon software designs which can incorporate Unix, Linux, Windows, Java, and other common technologies programmed into this application to allow the cell phones and/or devices to optimize their effectiveness, as well as cell phone operating systems included but not limited to: Apple's iOS and variants, Google's Android and variants, RIM's BLACKBERRY® OS, and Windows Mobile OS.

As an illustrative example, a method of identifying an individual using an electronic identification system using a virtual badge may comprise the steps of establishing a customizable set of data to be included in an electronic identification system database for identifying one or more individuals from a user group using a virtual badge; identifying at least one individual that requires electronic identification using said virtual badge; providing an electronic profile for said individual; creating a virtual badge based on said electronic profile; said virtual badge having information, images, or combinations thereof which identify said individual; providing each said individual access to said virtual badge; and downloading said user's virtual badge to a first display device, and displaying said virtual badge on a first display device.

The virtual badge can be adapted to incorporate technologies to minimize or remove counterfeiting. For example, the virtual badge may include a digital chip having a user's information which is designed to generate a unique ID pin code every time it is used. Additionally, the virtual badge can also be used to verify personal identity when utilizing other applications on a user's first display device by integrating into third-party applications. This includes, but is not limited to, Apple's Passbook ticketing information, payment authorization, and gift or reward card usage. The method may further include mapping, tracking, or combinations thereof, said virtual badge downloaded or displayed on said first display device. The first display device may further be linked to a second display device so that virtual badge image displayed on said first display device is displayed on a second display device.

In an alternative embodiment, the method of identifying an individual using an electronic identification system utilizing a virtual badge may comprise: establishing an administrative entity for administering an electronic identification system using a virtual badge; identifying at least one user group to be registered with said administrative agency, said user group having at least one individual member requiring the use of said virtual badge; said administrative entity establishing a customizable set of data to be included in an electronic identification system database for identifying one or more individuals from a user group using a virtual badge; each said individual member registering with said administrative entity, said registration including providing information which identifies said individual; creating said virtual badge for each said individual of said user group, said virtual badge having one or more identifying indicia unique to each said individual; storing said virtual badge on a server administered by said administrative agency; providing each said individual of said user group access to said virtual badge; and displaying said virtual badge on a first electronic display unit. The method may further include mapping, tracking, or combinations thereof, said virtual badge downloaded or displayed on said first display device. The first display device may further be linked to a second display device so that virtual badge image displayed on said first display device will be displayed to a second display device. The method may also include the step of generating a unique identifying pin code. The unique pin code may be generated each time of use or at other predetermined times for heightened security from hackers.

In another alternative embodiment, the method of providing a virtual identification badge to an individual for providing access to a predetermined area may comprise: establishing an administrative entity for administering an electronic identification system using a virtual badge for access to a predetermined area, said administrative entity registering and issuing said virtual badge to an individual authorized to receive said virtual badge; providing an individual to be registered with said administrative agency; establishing a database having identifying information related to said individual, said data stored on a remote server controlled by said administrative entity; creating a virtual badge for said individual, said virtual badge having one or more identifying indicia unique to each said individual, one or more information identifying said administrative agency, or combinations thereof; providing said individual with electronic access to said virtual badge; displaying said virtual badge on a first display unit, and providing an on-site administrator for verifying the contents displayed on said virtual badge. The method may further include mapping, tracking, or combinations thereof, said virtual badge displayed on said first display device prior to reaching the predetermined area, while within the predetermined area, or after exiting the predetermined area. The first display device may further be linked to a second display device so that virtual badge image displayed on said first display device will be displayed to a second display device.

In another alternative embodiment, the method of providing a virtual identification badge to an individual for providing access to a predetermined area may comprise: establishing an administrative entity for administering an electronic identification system using a virtual badge for access to a predetermined area, said administrative entity registering and issuing said virtual badge to an individual authorized to receive said virtual badge; providing an individual to be registered with said administrative agency; establishing a database having identifying information related to said individual, said data stored on a remote server controlled by said administrative entity; creating a virtual badge for said individual, creating a mirrored, temporary paper badge based on the virtual badge, said virtual badge having one or more identifying indicia unique to each said individual, one or more information identifying said administrative agency, or combinations thereof; providing said individual with electronic access to said virtual badge; displaying said virtual badge on a first display unit, displaying the temporary paper rendition of said virtual badge, displaying the temporary badge, or combinations thereof, and providing an on-site administrator for verifying the contents displayed on said virtual badge, temporary paper rendition of said virtual badge, or combinations thereof. The method may further include mapping, tracking, or combinations thereof, said virtual badge displayed on said first display device prior to reaching the predetermined area, while within the predetermined area, or after exiting the predetermined area. The first display device may further be linked to a second display device so that virtual badge image displayed on said first display device will be displayed to a second display device.

In one embodiment, the present invention provides a system for controlling access to an area and monitoring movement within the area comprising a first electronic device having a screen for displaying images, a processor operable to execute instructions and a data storage medium for storing instructions which when executed by the processor cause the processor to display an electronic profile for an individual requiring electronic identification, said electronic profile established by an administrative entity which establishes a customizable set of data to be included in an electronic identification system database for identifying one or more said individuals, said data forming a virtual badge to identify said individual; and to execute a self-destruct mechanism associated with said virtual badge which renders said virtual badge unusable after a prescribed time period or upon command from said administrative entity.

In another embodiment, the present invention provides one or more non-transitory computer readable medium having computer readable instructions embodied thereon, wherein when executed by at least one processor, the computer-executable instructions cause least one processor to at least: display an electronic profile for an individual requiring electronic identification, said electronic profile established by an administrative entity which establishes a customizable set of data to be included in an electronic identification system database for identifying one or more said individuals, said data forming a virtual badge to identify said individual; and execute a self-destruct mechanism associated with said virtual badge which renders said virtual badge unusable after a prescribed time period or upon command from said administrative entity. As used herein, the term "non-transitory computer readable medium" includes all computer readable media with the exception of a transitory, propagating signal.

In addition to the system and method of generating a virtual badge for electronic identification, the virtual badge can be used to perform a variety of functional, commercial and non-commercial operations. In one embodiment, the present invention provides for creating, maintaining, and managing moving inventories for further reference. As an example, a virtual badge user at a gated facility could use the virtual badge scanner to scan a bar code or other identifying system mounted on a piece of equipment as it enters or leaves the gated area. Using the built in form system, the virtual badge user also could enter data and/or take a geocoded, time/date stamped photo of the resource to further document the resource's movements and condition. On the virtual badge sending such data collection to the central system, accountability and documentation is created to more efficiently track and manage resources, even in a 100% disconnected environment.

In another embodiment, the present invention provides for allowing users or an administrator in non-disaster purposes the ability to "hide" or set time and/or day parameters for tracking users' location (and information submitted) from the database, the administrator, other discrete users, groups, businesses, organizations, or affiliations, subject to an administrator's approval.

In another embodiment, the present invention can be configured to provide workforce and business management tools which can automatically upload data stored on the device to an internet-based server or a laptop server with the back end software. All data that is submitted in the field may be accessed by authorized administrative users as soon as it is available on the server, near-instantaneously when the devices and server are connected to a wireless network, or after the data has been uploaded via BLUETOOTH® or other wireless technology in a disconnected environment. Given the sensitivity of the data, additional encryption and security levels can be set by an administrator.

In another embodiment, the present invention can be configured to allow a user to unlock a door with NFC or other evolving technologies, with either a time or date restricted functionality tied to such access. For example, the virtual badge with its self-destruct capability might replace a swipe card for regular access or be used by a hotel visitor for room access for a set time period. A user could bypass the wait for a check in line at a hotel if properly pre-registered, remotely, and using Wi-Fi network, NFC, and/or Mesh Wi-Fi network with BLUETOOTH® or other wireless technology to check in to the hotel, and for instance, download the local Internet access password for a hotel, gain access to a designated room number, and charge drinks or meals to a virtual badge—all without local staff intervention for increased virtual badge efficiency uses. In this example, a required hotel check out time could be automatically pre-programmed into the virtual badge, barring access before or after a certain time of day.

In another embodiment, the present invention can be configured to perform background checks as part of the registration process. For example, a school facility may desire visitors to be checked through national sexual predator systems prior to accessing the school. The system can be programmed to automatically reject access to a remote or on site application for a virtual badge, with various pre-set levels of questionable background issues to prevent access to a virtual badge from a potential user, which method maintains a potential user's privacy rights by simply denying access to a virtual badge for any specific background issues while not relaying the reasons for said denial to any administrator.

In another embodiment, the present invention can be used in the health care industry. For example, the device can be used to collect health care data. In this embodiment, a doctor could prescribe a virtual badge in an electronic device, in which said virtual badge is loaded with a prescription protocol for a homebound patient, for example, with a specific physical therapy and medication regimen. In this embodiment the virtual badge could be sent a message over a cell network, for example, to signal a homebound patient that it was time to take a specific medicine. The virtual badge user could interact with the mobile electronic device with the virtual badge software to notify the prescribing doctor a verification notice via the system that the medication had been taken or the therapy had been completed. Patient accountability is thus another benefit of this system.

The present invention could be used to collect monitoring data from a homebound patient. As an example, the patient's vital signs might be monitored by a separate sensor hardware, which hardware could transmit the data to the virtual badge, via wireless networks described above, which data then could be sent via the system to the doctor's office. With sensory ranges pre-set by the doctor, email, PUSH notification, or alarm alerts could be automatically sent to the doctor (or other agent if desired, such as a 911 service), should certain levels be detected by the sensors. Using a PUSH notification within the virtual badge system, an administrator likewise could send a message to the homebound patient for any variety of reasons.

In another embodiment, the present invention can be used to prevent fraud, such as involving fraudulent claims from a Medicare recipient or medical provider. Under this scenario, a home health care worker is prescribed for multiple visits to a patient a certain number of times per week. Using a virtual badge, the worker can be monitored and/or tracked via GPS technologies to verify performance of his/her duties. The worker also could, for example, scan the user's virtual badge with the patient's own virtual badge, again providing an additional authentication of a prescribed visit actually having occurred. Using the virtual badge forms, the home health aid could use a check list or drop down menu of various services provided, including taking any photos as needed, all of which data is time/date stamped and geocoded by the system to validate the services actually were provided. Besides documentation and validation via the system, a more rapid reimbursement system could be tied to the successful validation of duties via a virtual badge verification to the reimbursing agency that the services had been performed, thereby streamlining billing procedures to speed up payment processes using a paperless method built around this system via API links and the virtual badge payment processing gateways described previously.

In another embodiment, the present invention can be used to accommodate individuals with special needs, such as persons with disabilities. For example, the virtual badge could receive a message to alert a virtual badge user, using for example the push technology. In addition to the device's display of the message, the system also could be programmed to trigger a flashing light function and/or an audible tone function to alert the hearing or visually impaired user of the need to respond to a virtual badge signal or message.

In another embodiment, the present invention can be used for tracking within a large facility which does not have access to satellite or cell tower GPS systems. New wireless technology inventions will provide other alternative ways of more accurately tracking virtual badge users. For example, in an active shooter scenario, a facility may have thousands of employees and dozens of guests using virtual badges. With security personnel having instant access to the location of all persons within the facility, including being able to identify which floor or room number those users were at any point in time, safety messages via the system's PUSH notification system, evacuation procedures, and mass check out systems can instantly be communicated to any group or all virtual badge users in a given location.

In another embodiment, the present invention can be used to provide a system and a method to ensure data integrity and transmission success for virtual badges via a sync through a Wi-Fi network or Mesh Wi-Fi network with BLUETOOTH® or other wireless technology in an extremely limited connectivity environment. For example, if cell service is very poor in an area, certain system features are invented to deal effectively with such situations. One programmed solution takes a smart phone's normal 8-16 megapixel photos and auto compresses a virtual badge's photo(s) to under 50 kilobytes to facilitate transmission over limited cell networks. Alternatively, the smart phone is programmed to auto-store in a queue visible to the user any data not yet transmitted via any network as described above. Once connectivity is achieved to a cell system or a laptop with the virtual badge system, a manual or auto download could occur transferring all of the data from the mobile device to the backend system.

In another embodiment, the present invention can be used to ensure data integrity and transmission success for virtual badges via a sync through a Wi-Fi network or Mesh Wi-Fi network with BLUETOOTH® or other wireless technology in an extremely limited or no connectivity environment so as to preserve the battery life of the electronic device while it is using a virtual badge. For example, one proprietary solution in a virtual badge involves takes a smart phone, which commonly will trigger an automatic "searching for network" mechanism within the phone when in areas of low cell-connectivity. This system will disable this function to preserve the battery life and automatically cache the GPS and field form collected data within the device until such time as the data can be successfully transmitted over wireless technologies. Another proprietary battery saving feature of a virtual badge system allows an administrator to set the ping-rate settings between the mobile electronic device & server of the virtual badge system, or alternatively the mobile electronic device and a satellite based GPS system, so that the accuracy of the tracking mechanisms within the device can be altered—with greater accuracy needing more frequent pings or connections to and from the GPS system and/or virtual badge server(s), thereby using more battery life quicker (or alternatively lowering the ping rates, reducing the tracking accuracy, while increasing the battery life of the device). A third custom programmed feature focused on battery life of the device automatically programs the tracking to "go to sleep" if the device has not moved within a pre-set and configurable radius. Again, the system is designed for an administrator to pre-set a virtual badge user's settings, with GPS and server ping rates being the items that affect battery life the most.

In another embodiment, the present invention can be used to ensure data integrity and transmission success for virtual badges via a sync through a Wi-Fi network or Mesh Wi-Fi network with BLUETOOTH® or other wireless technology to display to an administrator the status of a user's virtual badge. For example, as a user's device loses battery strength, an icon on a map representing the virtual badge user's location can be programmed to automatically change to a customizable color at a certain low level of battery life. The same icon is programmed to turn another color on the display map (red in this example), when the last recorded GPS location of the device was transmitted. With this capability, an administrator is provided knowledge ahead of time of the normal loss of a signal due to battery life as the color displayed on the map might change from green to yellow to red or alternatively to be informed of the last known location of a device before it lost connectivity, either by loss of battery life or if, for instance, the user turned the device off or deleted the mobile application, thereby disabling the system.

In another embodiment, the present invention can be used to ensure data integrity and transmission success for virtual badges via a sync through a Wi-Fi network or Mesh Wi-Fi network with BLUETOOTH® or other wireless technology to alert an administrator of certain types of virtual badge user events. For example, if a virtual badge user's device loses signal or battery life completely, an automated alert can be sent to administrators using the virtual badge system. Another example of these alert messages is if an administrator selects a virtual badge form template to be flagged, any time a virtual badge user submits one of these form templates, an alert message may be sent. These alert messages can be in the form of email alerts, SMS texts, and PUSH notifications. Such alerts are tied to the virtual badge reporting modules, which can display statistics about various important events.

In another embodiment, the present invention can be configured to use voice communication to utilize the virtual badge software system. This voice communication system would use existing voice communication commands that are already in the mobile electronic display device's operating system, such as the Google Android or iOS platforms. The user would then be able to optionally control the application via voice commands, an example of which would be submitting Forms by voice activation, for hands-free use of the application. When executed verbally by a user, other functions, such as filling in forms on the device via voice communication can occur.

In another embodiment, the present invention can be configured to use a hands-free wearable computer with an optical head mounted display wirelessly linked for the purpose of using hands-free voice commands to operate one or more applications. Head-Up Display (HUD) devices such as the 'Google Glass' or similar hardware for the purpose of displaying relevant app information on the HUD screen, such as overlaid augmented reality views of assessments and submitted information can be utilized as part of the system. The hands-free HUD device would also be linked to the virtual badge application via BLUETOOTH® for the purpose of using hands-free voice commands to operate the application, such as submitting Forms, viewing assessments, or receiving PUSH notifications as previously described.

Accordingly, it is an objective of the present invention to provide a system, method, and device for electronic identification.

It is an objective of the present invention to provide a system, method, and device for electronic identification using electronic devices.

It is an objective of the present invention to provide a system, method, and device for electronic identification using mobile electronic devices.

It is a further objective of the present invention to provide a system, method, and device for electronic identification with a virtual badge to provide a cell phone and/or a device which can indicate the locations of other similar devices without input from the operators of the other devices. Real time tracking can thus be achieved as well.

It is yet a further objective of the invention to provide a system, method, and device for electronic identification with a virtual badge to provide a series of various methods to apply for, enroll, create, authorize, manage, monitor, authenticate, credential, and mass distribute virtual badges to mobile users via methods described herein.

It is yet a further objective of the invention to provide a system, methods, and device for electronic identification with a virtual badge to provide electronic devices which can communicate with each other and also with a base station.

It is yet a further objective of the invention to provide a system, methods, and device for electronic identification with a virtual badge in which data stored on an electronic device can be transferred to independent electronic devices, or between one or more electronic devices and a base station.

It is yet a further objective of the invention to provide a system, method, and device for electronic identification with a virtual badge to provide a functional and efficient database to serve as the repository for all information gathered in the field via an electronic device.

It is yet a further objective of the invention to provide a system, method, and device for electronic identification using a virtual badge to provide the means for an authorized and affiliated governmental or private entity to control a disaster response operation, using integrated, ICS systems and forms, via an electronic device which interfaces with a web-based or laptop version of the virtual badge software to allow for administrative activities, in or out of a disconnected environment in a disaster.

It is yet a further objective of the invention to provide a system, method, and device for electronic identification with a virtual badge to allow users to create discrete groups, businesses, organizations, and affiliations via an electronic device for the purpose of business management and user privacy.

It is yet a further objective of the invention to provide a system, method, and device for electronic identification with a virtual badge to provide organization tools via an electronic device such that responders and users in the field can customize the organization of their workers and users into groups as desired by an administrator or team leader.

It is yet a further objective of the invention to provide a system, methods, and device for electronic identification with a virtual badge having inventory management related tools.

It is yet a further objective of the invention to provide a system, method, and device for electronic identification to provide a mobile credit card payment system, which includes a credit card payment gateway and identification verification for mobile users for the purpose of processing payment and/or receiving credits, rewards, gifts, and achievements via an electronic first-display device for virtual badge jobs or purchases completed in the field.

It is a further objective of the invention to provide a system, methods, and device for electronic identification configured to use voice communication.

It is yet a further objective of the invention to provide a system, methods, and device for electronic identification which uses a hands-free wearable computer with an optical head mounted display.

It is yet a further objective of the invention to provide a system, methods, and device for electronic identification which uses a hands-free wearable computer with an optical head mounted display wirelessly linked for the purpose of using hands-free voice commands to operate one or more applications.

It is yet a further objective of the invention to provide a system, methods, and device for electronic identification with a virtual badge to provide privacy controls, if pre-set as available to a user by an administrator.

It is yet a further objective of the invention to provide a system, methods, and device for electronic identification with a virtual badge to provide the user with tools for integration with a client's existing software (via software APIs) such that the data collected via the software system may be exported and integrated for additional uses, reporting, analysis, or other business purposes.

It is yet a further objective of the invention to provide a system and a method to display a virtual badge on a cell phone equipped in order to provide sufficient mass produced and inexpensive identification to allow monitored access to restricted areas or planned events.

It is yet a further objective of the invention to provide a system and a method to sync a mobile electronic device running virtual badge software, with a separate mobile electronic device to display a virtual badge.

It is yet a further objective of the invention to provide a system and a method to sync a virtual badge from a web based or laptop server with the virtual badge software to a separate mobile electronic device capable of displaying a virtual badge using a Wi-Fi network or Mesh Wi-Fi network with BLUETOOTH® or other wireless technology, without a cell phone.

It is yet a further objective of the invention to provide a system, methods, and device for electronic identification with a virtual badge configured to print a hardcopy of the virtual badge on to a paper or plastic badge.

It is yet a further objective of the invention to provide a system, methods, and device for electronic identification with a virtual badge configured for payment to public and private sector entities.

It is yet a further objective of the invention to provide a variety of security features, such as a displayed color of the day, QR or bar code, photo or other images, levels of encryption, unique pin codes, all of which can be incorporated into a design and may be automated to change so as to minimize the threat of counterfeiting virtual badges.

It is a further objective of the invention to provide a system that allows administrators to make use of new mobile technologies to be able to more easily allow users with this system to scan virtual badges with their own virtual badge devices rather than having to use current separate scanning only devices built solely to scan bar codes, badges, or identification cards. As an example, this objective allows a virtual badge smart phone supervisor to scan another virtual badge smart phone user into a location without the need for any other hardware as is typically used for access control today.

It is yet a further objective of the invention to provide workforce and business management tools via an electronic device which can automatically upload data stored on the device to an internet-based server or a laptop server which has the back end software.

It is yet a further objective of the invention to provide a system, methods, and device for electronic identification with a virtual badge configured to act as a ticket validation system whereby the tickets are pre-purchased tickets and the systems, methods, and device are used to authenticate the user's right of access to an area.

It is yet a further objective of the invention to provide a system, methods, and device for electronic identification with a virtual badge configured to act as a credential system to store a user's rank, certifications, skill level qualifications, licensures, job titles, background check statuses, and/or education levels.

It is yet a further objective of the invention to provide a system, methods, and device for electronic identification with a virtual badge which is used to determine clearance levels for higher level restricted access areas and/or for monitoring for a user checking out certain supplies.

It is yet a further objective of the invention to provide a system, methods, and device for electronic identification with a virtual badge to allow the ability for a virtual badge user to unlock a door with NFC or other evolving technologies, with either a time and/or date restricted functionality tied to such access.

It is yet a further objective of the invention to provide a system, methods, and device for electronic identification with a virtual badge to automatically perform background checks as part of the registration process.

It is yet a further objective of the invention to provide a system, methods, and device for electronic identification with a virtual badge to automatically perform background checks as part of the registration process and can be programmed to automatically reject access to a virtual badge with various pre-set levels of questionable background issues from a potential user.

It is yet a further objective of the invention to provide a system, methods, and device for electronic identification with a virtual badge via the device to collect insurance data for claims' authentication following either a personal or regional disaster. A virtual badge user could fill in an administrator prescribed form on the system, take a picture, and said data then could be automatically supplied for insurance claim verification.

It is yet a further objective of the invention to provide a system, methods, and device for electronic identification with a virtual badge via the device to collect verification of repairs for insurance payouts for claims' authentication and tracking management.

It is yet a further objective of the invention to provide a system, methods, and device for electronic identification with a virtual badge via the device to collect health care data and/or transmit health care notifications or alerts to a virtual badge user.

It is yet a further objective of the invention to provide a system, methods, and device for electronic identification with a virtual badge via the device to aid in preventing fraud.

It is yet a further objective of the invention to provide a system, methods, and device for electronic identification with a virtual badge via the device to accommodate a wide variety of persons with disabilities.

It is yet a further objective of the invention to provide a system, methods, and device for electronic identification with a virtual badge via the device to allow an administrator to instantly share with public safety officials certain data of broad sets of homebound persons with a wide variety of special needs and/or disabilities to ensure said persons are properly accounted and cared for in the event of an emergency or disaster such as a hurricane or earthquake.

It is yet a further objective of the invention to provide a system, methods, and device for electronic identification with a virtual badge via the device to be able to use a virtual badge for tracking within a large facility which does not have access to satellite or cell tower GPS systems.

It is yet a further objective of the invention to provide a system, methods, and device for electronic identification with a virtual badge via the device to be able to use a virtual badge to collect field based assessment data with photos, images, or field forms on the virtual badge system.

It is yet a further objective of the invention to provide a system, methods, and device for electronic identification with a virtual badge via the device to be able to have the user's virtual badge information wiped clean from the electronic device, and thus allow the device to be reusable for another user, creating a "green," reusable virtual badge device, as opposed to typical plastic badges which only are good for one user and then must be discarded.

It is yet a further objective of the invention to provide a system and a method to ensure data integrity and transmission success for virtual badges via a sync through a Wi-Fi network or Mesh Wi-Fi network with BLUETOOTH® or other wireless technology in an extremely limited connectivity environment.

It is yet a further objective of the invention to provide a system and a method to ensure data integrity and transmission success for virtual badges via a sync through a Wi-Fi network or Mesh Wi-Fi network with BLUETOOTH® or other wireless technology in an extremely limited or no connectivity environment so as to aid in transmission and/or preserve the battery life of the electronic device while it is using a virtual badge.

It is yet a further objective of the invention to provide a system and a method to ensure data integrity and transmission success for virtual badges via a sync through a Wi-Fi network or Mesh Wi-Fi network with BLUETOOTH® or other wireless technology to display the status and/or location of a user's virtual badge to an administrator.

It is yet a further objective of the invention to provide a system and a method to ensure data integrity and transmission success for virtual badges via a sync through a Wi-Fi network or Mesh Wi-Fi network with BLUETOOTH® or other wireless technology to alert an administrator of certain types of virtual badge user events.

Other objectives and advantages of this invention will become apparent from the following descriptions taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 2A is a block diagram of exemplary components of the electronic device of FIG. 1;

FIG. 2B is a block diagram of a communications network linking the electronic device of FIG. 1 with a plurality of other electronic device units;

FIG. 7A is a front perspective view of a smart phone according to a preferred embodiment of the present invention;

FIG. 7B is a back perspective view of a smart phone and tablet according to a preferred embodiment of the present invention;

FIG. 7C is a front perspective view of a tablet according to a preferred embodiment of the present invention;

FIG. 7D is a block diagram of the components of the smart phone or tablet of FIGS. 7A-7C;

DETAILED DESCRIPTION OF THE INVENTION

Figure 1:
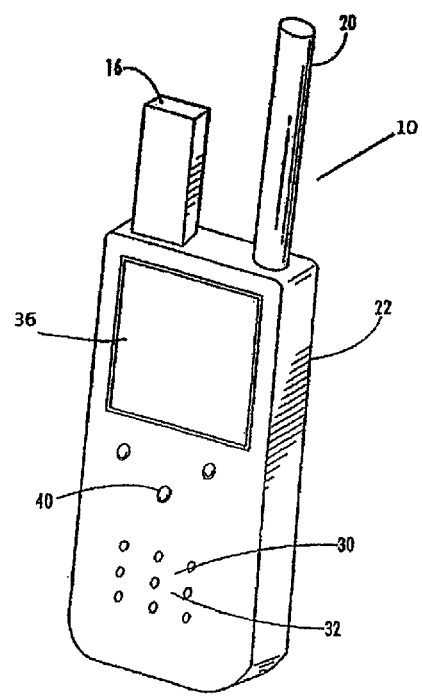
FIG. 1 is a perspective view of an exemplary electronic device, illustrated as radio and/or cell mobile, preferably equipped with GPS and having GPS functions with BLUETOOTH® or other wireless technology according to an illustrative embodiment of the present invention.

While the present invention is a susceptible embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

The present invention creates a system comprising of "backend" software (software adapted to provide necessary functionality for server) on a web based, cloud based, or laptop server synchronized with a "front-end" software, such as software adapted to be used by a display device, including an electronic display device capable of displaying images or text, such as a cell phone or tablet computer, to make the device function accordingly, i.e. properly display the information as a virtual badge, displayed on the electronic display device. The backend software system is designed for, but is not limited to, mapping, tracking, issuing, authenticating, validating, background checking, credentialing, managing, distributing, and monitoring an individual and/or designated group of virtual badge users, as well as engaging the self-destruct mechanism to render a virtual badge useless. The front-end is designed to communicate with the backend software system and interact in such a way to create a workforce solution by allowing virtual badge users to input information and present a display device that shows a virtual badge. The system allows added plug in features, i.e. software programs that provide additional functionality that can be added to or taken out of the primary software systems in place and include, for example, field forms with photos displayed on a map to maximize the capabilities of the virtual badge system. While various methods of communications and data transfer may be described, such examples are for illustrative purposes only as the use of any land-based communication systems or satellite-based communication systems known to one of skill in the art can be utilized within the systems, devices, or methods as described herein.

To use their BLUETOOTH®, wireless, and/or GPS functions in a disconnected environment, modifications to the software in the electronic display device, such as a cell phone, including smart phones, or a computer tablet are made prior to their use in the operations via the new software. Once these modifications have been made they do not need to be changed except as the user goes into and out of a working cellular network (or as the network is re-established by repairs). These modifications can be made utilizing the virtual badge software and BLUETOOTH® or other wireless communications from a base station or on the electronic device itself if the model has such capability. As another example, a GPS/cell phone can be used when modified, and with additional programming and/or modifications as well as newly developed cell phone hardware, a host of other phones and other mobile electronic devices can utilize this system. Newer cell phone models may not require as extensive a modification, but to work in the disconnected environment, changes maybe required. To allow for monitoring of other dumb and smart phone users simultaneously within a group by a smart phone supervisor, modifications designed within this system also are required for the front end user.

In the proposed system, first, an administrator, which could be an agency, a business, a group, and/or simply a resident/citizen (hereinafter collectively referred to as an "administrator"), would register on a web-based portal to obtain access to the software described herein. In a disconnected environment, alternative means described herein may be used. Validation, such as a background check of this entity or person could occur at this stage. Upon receiving access to a new virtual badge account, the administrator can then select from or create a menu of options (or customize further selections, if desired), which options create a specified list of registry items required to secure a virtual badge. These items could include as wide or narrow a list as desired. Some examples would be an ID photo, home address, business address, unique ID number, driver's license number, or a host of other options including credentialing for virtual badge users to be established by the administrator. Additionally, if desired, the software will allow the administrator to brand the front end such that the web or mobile device view can easily incorporate a logo or a group of logos to display affiliations as may be desired. Similarly, the front-end "splash page" is easy for an administrator to customize, if so desired, so that a unique identifier accompanies the software application distribution.

A payment may be included, with various levels of approvals such as security clearances, or alternatively volume based pricing, established as further alternatives to the business methodology proposed. If this initial application were to a Sheriff's office, such a fee could be split three ways between the Sheriff, a local police department, and the private administrator. Incentives to recapture costs for maintaining and sustaining the system are thus modeled in a true public/private partnership.

In a next step, users with mobile electronic devices, preferably with GPS and BLUETOOTH® and/or other wireless technology, can apply to the administrator for a virtual badge to be part of that grouping of virtual badges. Alternatively, the administrator could elect to send requests to a designated group of front end users. Either using their mobile electronic device to apply via a web link or by registering online via the Internet, each user then can supply the personal data as pre-established by the administrator to be approved for a virtual badge. Following the submittal of the personal data, the administrator can analyze the application (or the system can auto-analyze certain user criteria as set by an administrator), including if desired, outsourcing a background check of that user by a third party service. The administrator may choose different levels of checks for different users, as well as may choose different badge types for different events. As a further optional step, an additional payment can be made either by the administrator or by the user prior to the issuance of each virtual badge. Volume discounts, supervisory virtual badges with scanning features, and/or differing clearance levels can lead to various pricing models. All of these processes can be automated in the back end system.

Upon approval by the administrator and payment option if chosen, the cell phones and/or devices are sent an email, SMS message, or other electronic communication via methods described herein, with the appropriate link to download the front-end software, which also includes the virtual badge. This process could be obtained through commercially run stores, such as an online Apple or Android store or directly from an approved, client based location.

The virtual badge software can include any combination of the following options, abilities, and features which also may be added to and further customized by an administrator via plug ins, including an administrator "ghosting" any particular selection so as to not offer certain options to some virtual badge users in a group, dependent on various issues.

"Profile Surveys": allows users to create and complete surveys of personal information which may include their additional certifications, qualifications, skill-sets, interests, likes/dislikes, and preferences for matching logic purposes inherent in the design of the software.

"Employees List": allows users to sort, select, and view other users they have affiliated with, as well as control privacy settings and search for and add new users or groups.

"Routes": allow users to view historical data that represents the breadcrumb trail particular users traveled, based on a selected and customized time-frame selected by the user. This "breadcrumb trail" shall consist of but not be limited to: user/device path (represented by connecting symbols displayed on the map), speed, distance, form submissions, notes, events, and work orders submitted within the time frame selected.

"Main Menu": allows users to perform various submission-related functions in the software, including but not limited to: filling out forms (with or without photos), submitting a note, creating an event, completing profile surveys, and marking a place on the map.

"Clock In/Out": allows users to clock in or out of their various affiliations, meaning that a user is able to manage their privacy and submission settings for all affiliations the user belongs to. "Clocking In" represents enabling the authorized affiliation to view the user on the map and view submissions that are sent to this affiliation, while "Clocking Out" represents disabling the authorized affiliation from viewing any user-related information, including but not limited to: GPS location, Data Submissions, Location Information, and Messaging.

"Log Out": allows users to end their current session, which turns off the client-server connection and shuts down the application.

"Team List": allows users to easily create groups, teams, and task forces to organize and manage their users. Such teams also allow for a virtual badge leader to form a team of other virtual badge holders who may not have electronic devices with the software system on them. The Team List also allows users to be tasked for functional purposes, by allowing users to be assigned to Tasks, Needs, Work Orders, Events, Affiliations, and potentially other uses. Users may be organized and assigned to tasks via a "Drag and Drop" interface. Users may be sorted based on their profiles, skill-sets, FEMA (Federal Emergency Management Agency) ICS certifications, or other classifications via "Matching Logic".

"Forms": Modern smart phones and mobile electronic devices can be programmed with this system to create a unit's custom forms. Forms also can be customized readily on the cloud or laptop-based "server" or via administrative access at the base station and which optionally may integrate the text messaging or PUSH (i.e. internet-based communications where the request for a given transaction is initiated by a publisher or central server) notifications features of cell phones to complete certain information on the forms such as name and address. These forms consist of several different types of template "form fields", which are preset data-entry methods on electronic devices. These "form fields" may be customized to collect a wide range of information and the user may choose to assign branching logic or decision point logic in the forms. Comment sections can allow the user to enter any texted wording the mobile user desires. Alternatively, the forms can employ dropdown menus or simple check lists for pre-programmed answers that can be selected to standardize certain responses so as to increase the speed of entry of data by mobile users and to be able to be analyzed by the virtual badge system. Prior to saving the form, the user can be asked if the form needs any final editing before being saved. As new, mobile technologies are invented, creating such custom virtual badge forms in the field will become part of this capability.

Using these methods enhances the capabilities of the system to do more robust back end data analysis. For example, there can be a "minor damage or major damage" drop down option to select. When the form is submitted, it is saved into the electronic device (and into the server if the cellular network is functioning) and the system automatically geocodes and time/date stamps the information contained on that specific form. Submitted Forms may also have geocoded photos optionally attached to the information so a picture can provide reference to the form information. On the display of a form on the mobile and web-based front end of the virtual badge software, an icon can be assigned to display with varying colors on a map. Alternatively, thumbnail photos or icons might be displayed on a map, again with programmed highlighting around the photos or icons with varying colors. Said highlighting may indicate a priority of a need at that location or level of damage, with the color groupings being sortable on the map to allow for quicker visual analysis. Prior to saving the form on the mobile side, the user can be asked if the form needs any final editing before being saved.

"Matching Logic": refers to complex software algorithms that classify users based on their responses to profile surveys, allowing for users to be matched to appropriate Tasks, Needs, Work Orders, Events, Affiliations, and potentially other uses because the users' skill-sets match with the services needed. Users may be classified based on customizable information, (Ex—Profile surveys may classify based on functional skill-sets, qualifications, and/or certifications, such as medical, physical, technology, leadership, etc.); a corresponding Task, Need, Work Order, or Event may be customized based on a need for specific skill-sets. The appropriate users may then be matched to the appropriate Task, Need, Work Order, Event, or Affiliation. Likewise, as a user completes more details of his/her own profile and skill sets, the user may be better "matched" with a group or organization that listed its own set of profiles into the system in its own search for like-minded or like-skilled users.

"Who Can See Me": refers to an ability in the software that grants the user the ability to disallow other users from viewing or receiving GPS data, submission data, and any location information about the particular user (ex—User A turns off User B's ability to see User A on the Map as well as any of User A's information). Certain high security sites will have the ability to restrict a user from disabling this function.

"Friends": refers to users that the end-user has added to their application in terms of receiving tracking and electronic submission data. Users can be assigned "Friend Codes," which are unique identifiers that allow for user search to take place and for user created sub-groups.

"Notifications": allow users to view at-a-glance any status updates or pertinent information from selected users or an administrator, and functions as a rudimentary news feed to the user, displaying updated information about the user's affiliations, coworkers, friends, and family. The Notifications list also displays PUSH notifications sent by the administrator to virtual badge users as a group or individually.

"Sync": allows the user to sync the electronic device with the laptop server or cloud server by utilizing BLUETOOTH®, wireless technologies, or cellular networks.

"Start Break": allows the user to note a break time start and stop point to monitor his/her work cycle during the operations.

"Message": allows the electronic device user or base server to text message each other or other users via a canned, pre-programmed or custom message. As a further example, text messaging in a disaster environment can occur over partially destroyed cellular networks where voice communication has failed entirely.

"Setup": allows the user to enter into their electronic device the phone number and company name or name of the agency for which they are working.

"Edit Profile": allows the user to change or engage his/her password, PIN code, unique identifier, random ID number, or user name.

"GPS": allows the user to check the status of the GPS tracking unit and note any errors in communication of the GPS chip within the electronic device.

"Map": allows the user to view a map as loaded by the system into the electronic device.

"Map Trail": allows the user to randomly drop points on a map, which option triggers a call to connect a line of such GPS points so as to display a distinct and measurable line on the back end displayed map. A Start and Stop dropdown can map the location and distance of a flooded roadway or of the length of boom deployed in an oil spill, for a base unit to display to the administrator for actionable data.

"BLUETOOTH® Sync": allows the user to toggle between using just BLUETOOTH® or just the wireless network, depending on the circumstances.

"Diagnostics": allows the user to view his/her name, phone number, software application name, version of the software application, sync interval, last sync time, last upload time, number of syncs, sync errors, and message counts collected by that user.

"About": allows the user to view the name of the system, the contact info, and the version, along with a copyright date.

"Tracking Schedule" allows the administrator to enforce a GPS tracking schedule for affiliated users, which either enables or disables the ability of affiliated user's virtual badges to GPS track. The Tracking Schedule can be adjusted in blocks of minutes across an entire 24 hour cycle. Thus, to protect a user's privacy when "off duty," the device may be programmed for each virtual badge user to only track its history during an individual's work time and days.

"Realms" or "Scan Zones" allows the administrator to create new areas to become checkpoints. By creating new Scan Zones, users can be scanned by a virtual badge supervisor or fixed monitoring device and organized in a discrete, reportable manner that keeps track of which users entered where, and when they left. Scan Zones can be configured to NOT GPS track users that have been scanned-in, and can also be set to several different GPS tracking options, which result in differing levels of accuracy per-Scan Zone. These different GPS tracking options are controlled by the virtual badge administrator on the server-side, and can be customized for each different Scan Zone. For instance, a large outdoor Scan Zone may not need to have the most accurate level of GPS tracking (which will deplete battery life the quickest), compared to an indoor building, which may need the most accurate level of GPS tracking available.

"Print Badge" allows the administrator or the user to print a paper version of a virtual badge, either from the web-based front-end or the mobile-based front-end. A paper version of a virtual badge can be printed on sticky paper, temporary paper, or even a hard, plastic badge. When a printed badge is scanned the scan location will be saved in the virtual badge database, so locations can still be tracked, even if the virtual badge users does not have their own mobile electronic device with GPS technology.

"Badge" allows the user to view their virtual badge screen in the application, which can display their name, employer, photo, address, phone number, issuing agency, credentials, encrypted QR code, and/or additional other information.

"Scanner" allows the administrator to activate a QR code scanner in the virtual badge application on the mobile electronic display device, which enables the scanner user to "scan" another virtual badge user's encrypted QR code on their virtual badge. This act of scanning will either scan the user "in" or "out", thus optionally activating or deactivating GPS tracking on the device, and will log the time/date plus location of the scan activity. Colors of icons or virtual badges can be programmed to change to instantly display the status of a user on the administrator's map or on a supervisor's mobile map within the virtual badge software.

"Check-In List" allows the administrator to view the list of scanned-in and checked-in users to pre-defined areas, for easy identification that there may or may not be users that are still scanned-in. As another option within the system, a supervisor may view his team of virtual badge users on his mobile electronic device with the software on this list.

"Affiliations" allows the user (or administrator) to view the list of affiliated organizations to the virtual badge account. This list could include sub-companies, primary badge issuing authorities, and/or local, state, and federal government entities.

"Help" allows the user to view a pre-determined list of tutorial slides that help them understand how to use the front-end mobile application. The tutorial slides can be customized per an individual virtual badge account.

"Shutdown": allows the user to shutdown the software (again, in certain circumstances, an administrator may ghost out this option so a user cannot select the option).

Because the virtual badge is designed to be able to be mapped and tracked (though GPS mapping is not a requirement of the virtual badge), the data can be mapped out on a GPS mapping system, which allows shape files to be created from the metadata for analysis. Further, the latitude-longitude information can be converted automatically within the system to the National Grid System, which is used more by military responders. Likewise, the system may be integrated with a wide variety of software mapping systems to ensure interoperability. Additionally, the system can easily convert all of the collected data into Excel-formatted spreadsheets, which then are easily sorted using Excel technologies. The system also can be loaded with incoming data like a local tax assessor's property control maps with value and structural data or alternatively, a large team of incoming users' data can be loaded into the system to quickly create data system repositories, again using software like Excel. Data can then be e-mailed out in a readily workable solution and/or can be converted into pie charts or other graphic images using, for example, Microsoft Access® to present a snapshot picture of thousands of data inputs from a single or multiple days' operations. Data can also be exported in a number of other formats. This back end part of the system is critical to make the "tsunami of data" easy to interpret for an administrator at any point in time.

Several features originally disclosed in the '440 patent and associated patent applications are currently described herein, as any one or combinations thereof can be adapted to be a part of the system, method, or devices for an electronic identification system using a virtual badge. The various devices described or contemplated therein are illustrative examples of electronic display devices and methods of use, which can be incorporated with the virtual badge.

Figure 6:
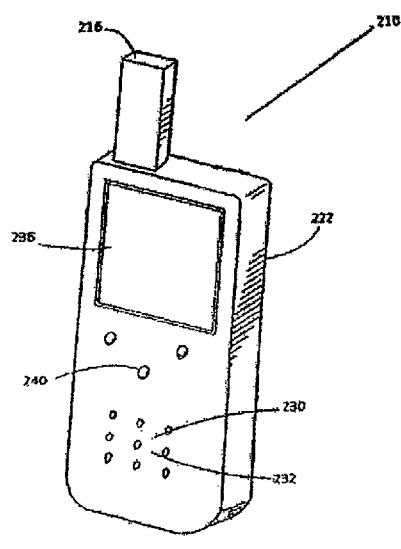
FIG. 6 is a perspective view of a cell phone, preferably equipped with GPS and having GPS functions with BLUETOOTH® or other wireless technologies according to an illustrative embodiment of the present invention.

The system, methods, and device for electronic identification in accordance with the present invention is described using a variety of electronic devices, such as portable radio and/or cell mobile, FIG. 1, cell phone FIG. 6, smart phone or other smart device, FIGS. 7A-7C. While each device is described individually and associated with various functions and/or features, such functions and/or features, where applicable, apply to any electronic device that can perform such functions/features. Accordingly, where a function is described for a particular embodiment of an electronic device, such disclosure is not intended to be limited as such function or operation is applicable to other devices. Smart devices, i.e. devices having computer functioning capabilities or properties, and/or capable of connecting to other devices, and/or can operate interactively and autonomously are preferred. Other devices can be used as well.

FIG. 1 illustrates an illustrative example of an electronic device, illustrated as a portable radio and/or cell mobile, preferably equipped with GPS and having GPS functions with BLUETOOTH® or other wireless technology into one unit 10. Throughout this application, the acronym "GPS" may be used to include and represent location services technologies throughout a broad reach of tracking capabilities and is not meant to limit this invention to just satellite and cellular tower tracking capabilities. A plurality of other similar electronic devices 10A-10G communicate with each other utilizing a communications network 12, as illustrated in FIG. 2B. The electronic devices 10A-10G determine their various locations utilizing GPS, and can then transmit these locations to the other units over a wireless network. While the use of a cell phone is described through out the specification to illustrate one or all components of the present invention, such embodiment is used for illustrative purposes and other electronic devices, such as tablet computer, computers, or any other electronic device having at least a processor operable to execute instructions and a data storage medium for storing instructions which when executed by the processor cause the processor to perform one or more functions, and/or a display screen for displaying an image, may be used or form part of the system. Memory may include, for example, RAM (random access memory) or ROM (read only memory), or for cell phones, built in memory or memory form SD memory card. In this manner, the locations of all the units can be determined and monitored by any one of the units. The units can also communicate with each other over a public radio network such as FRS, GMRS, GSM, CDMA, or iDEN.

Referring to FIGS. 1 and 2A, the electronic devices of the present invention will now be described. The electronic device 10 can include a GPS receiver 14, a GPS antenna 16, a radio transceiver 18 and an antenna 20 all mounted in or on the GPS/radio housing 22. The GPS receiver is electronically coupled to processor 24, which in turn is electronically coupled to a memory 26. The memory 26 can be built into the unit 10 or installed as a separate, removable module, such as a flash memory stick or removable cartridge (both not shown). The memory will normally contain the information necessary to operate the unit 10. The memory can also be used to store cartographic data (electronic maps), waypoints or locations which the unit's operator wants to save, waypoints of the other units and other data which may be input into the unit 10. The cellular radio transceiver 18 can be electronically coupled to the processor 24 and a data modem 28. The data modem is utilized for transmitting and receiving data such as location data of the units.

The electronic maps in the system or stored on the removable memory devices can be readily displayed on the unit's display 36. Waypoints or areas traversed by the unit and stored in the memory can also be displayed on the display 36. In a preferred embodiment, the display 36 is a liquid crystal display (LCD) or light-emitting diode display (LED) and is used to display other information in addition to navigational information. Any other type of display may also be used. The electronic device unit 10 also can include a microphone 30, a speaker 32, and an input 34. The microphone 30 and speaker 32 are conventional and can be the same type of microphone and speaker used on a conventional FRS or GMRS radio or other electronic device.

Input 34, in a preferred embodiment, is an alphanumeric keypad such as the keypad used on telephones. This permits the entry of letters, numbers and any other symbols found on keypads. Utilizing special software, almost any number, letter or symbol can be entered into the unit. This type of software is commonly available on cellular telephones. The input 34 could also be a microphone, a voice recognition input, a touch screen, a full keyboard similar to a BLACKBERRY® or a menu driven display screen.

Another optional feature of the electronic device 10 is a coding or encryption system. This system can employ any of the known coding or encryption schemes such as public or private key encryption methods. To employ this feature, a group of electronic device users would enter an agreed upon code into their units prior to use. The code would then encrypt the transmitted location data and the receiving units would be able to decrypt this information. This prevents other, unauthorized units from tracking the location of other units. This can be useful with groups such as law enforcement individuals.

After these modifications have been performed, the team members go out into the designated search areas with their portable hand held electronic devices. At the beginning of every day a different route or search area is programmed into each unit, as well as different forms or work orders. Preferably each team will have the same route or search area and different teams will have different routes or search areas. As the team members cover the routes or search areas they will encounter individuals or locations, which require specific needs. Various services to respond to these needs in disasters have been designated as Emergency Support Functions (ESF) and categorized with possible uses as follows ESF #1: Transportation: Monitoring assets and equipment, transportation safety, movement restrictions and damage impact and assessment.

ESF #2: Communications: Supplement existing systems without overwhelming capacity given a large scale operation.

ESF #3: Public Works and Engineering: Locating infrastructure protection and emergency repair, including roads, bridges, potable water, sanitation, utility grid emergency needs.

ESF #4: Firefighting: First responder's monitoring and coordination for incoming, out of region, fire rescue services following any disaster.

ESF #5: Emergency Management: Coordination and command resources, monitor and assign assets, and incident action planning.

ESF #6: Mass Care, Housing and Human Services: Follow up specialty resources as identified by first response teams with software waypoint system.

ESF #7: Resource Support: Logistics location, monitoring, dispatch and distribution, with emphasis on personnel from out of the area response teams within a given disaster zone.

ESF #8: Public Health and Medical Services: Logistics location including pharmaceutical supplies and medical personnel management; D-Mort service teams' and EMS personnel locations and assignments and precise locations.

ESF #9: Urban Search and Rescue: Accurate resource management and detailed tracking and mapping for 100% coverage of the affected area without costly re-searching areas previously covered.

ESF #10: Hazardous Materials: Locate and identify the precise location of various threats. Monitor and mitigate the needs to suppress these threats and prioritize the threats.

ESF #11: Food, Water and Natural Resources: Locate sources for mass food and water resources by sector. Food safety and security; locate historic properties protection and nutrition assistance.

ESF #12: Energy: Coordinate, dispatch, monitor and locate emergency energy needs and response units.

ESF #13: Military Affairs: Public safety and security—incoming units can be universally tracked and monitored for efficient management, including using military personnel for various other ESF function needs as required, including traffic management operations.

ESF #14: Public Information: Locates informational needs by street address and available resource allocation distributions.

ESF #15: Volunteers: Volunteer management of incoming personnel and resources to be distributed across ESF functions as needed using locator source system.

ESF #16: Law Enforcement: Coordinate the mobilization of law enforcement and security resources.

ESF #17: Animal Protection: Provide rescue, protective care and feeding for animals using GPS locator assistance.

ESF #18: Business and Industry and Economic Stabilization: Coordinate the response of State agencies in assisting local economic redevelopment via locator source system.

In addition to associating an ESF number with a waypoint, wherein a particular need or service has been identified, a 1-2 word descriptor can also be associated with the waypoint. This would help to clarify any ambiguities that a third party may have regarding a particular waypoint and emergency service that was associated with the waypoint. These descriptors could also be used to identify a particular need or resource that would be required at a particular area or site. Using pre-scripted drop down menus or check-lists on the electronic device can speed up this process and help with back end data analysis.

Figure 3:
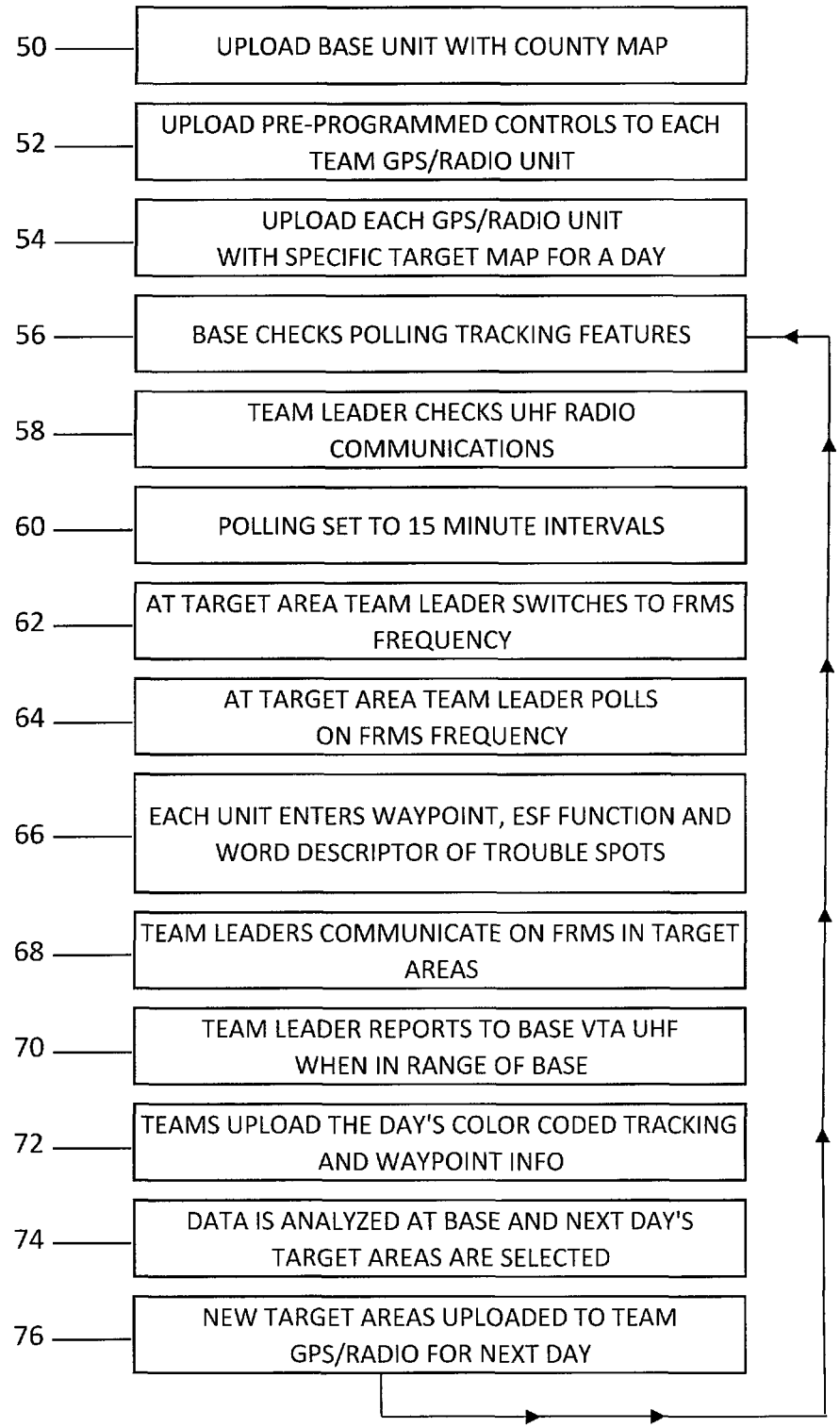
FIG. 3 is a flow diagram of the procedure used by search and response teams using the system in accordance with the present invention.

With reference to FIG. 3, the operation of a typical search would proceed as follows. The base unit is uploaded with a map of the county or area surrounding the site of the disaster at 50. The individual team's electronic devices 10 are uploaded with pre-programmed controls and settings at 52. The individual team units are uploaded with a specific target search map for one day at 54. The base unit checks the polling tracking features of the units at 56, if the devices have such a feature. The team leader checks the radio communications between his unit, the team members units and the base station at 58. These radio communications can be in UHF, VHF or 800 MHz frequencies as well as the IDEN network, again if the devices have such a feature. The polling feature of the field units is set for 15 minute intervals at 60. After the teams reach the target or search area, they switch their radios to operate on the FRS radio frequency at 62 or rely upon the iDEN system. The team leader polls the team members on the FRS frequency or iDEN during the searching operations at 64. Whenever they reach a trouble spot the team members enter a waypoint, ESF number and descriptor into their individual units at 66. The team leaders communicate with each other over the FRS frequency or iDEN while in the search area at 68. The team leader reports in to the base station over the UHF, VHF or 800 MHz frequencies or iDEN when they are within range of the base station at 70. The team members upload the routes covered, searched areas and waypoints from that day to the base station at 72. While the upload is preferably preformed wirelessly, any other type of data transfer is acceptable. These routes or search areas may be color coded. The data uploaded into the base station unit is analyzed and the next day's search areas or route are determined at 74. The new search areas or routes are uploaded into the teams' individual GPS/radio units at 76 and the procedure then returns to step 56. While the new routes are preferably uploaded wirelessly, any other type of data transfer is acceptable. Any of the data described above may be alternatively transmitted and received over other wireless systems like with cell systems to cell phones or other wireless electronic devices and methods.

Figure 4:
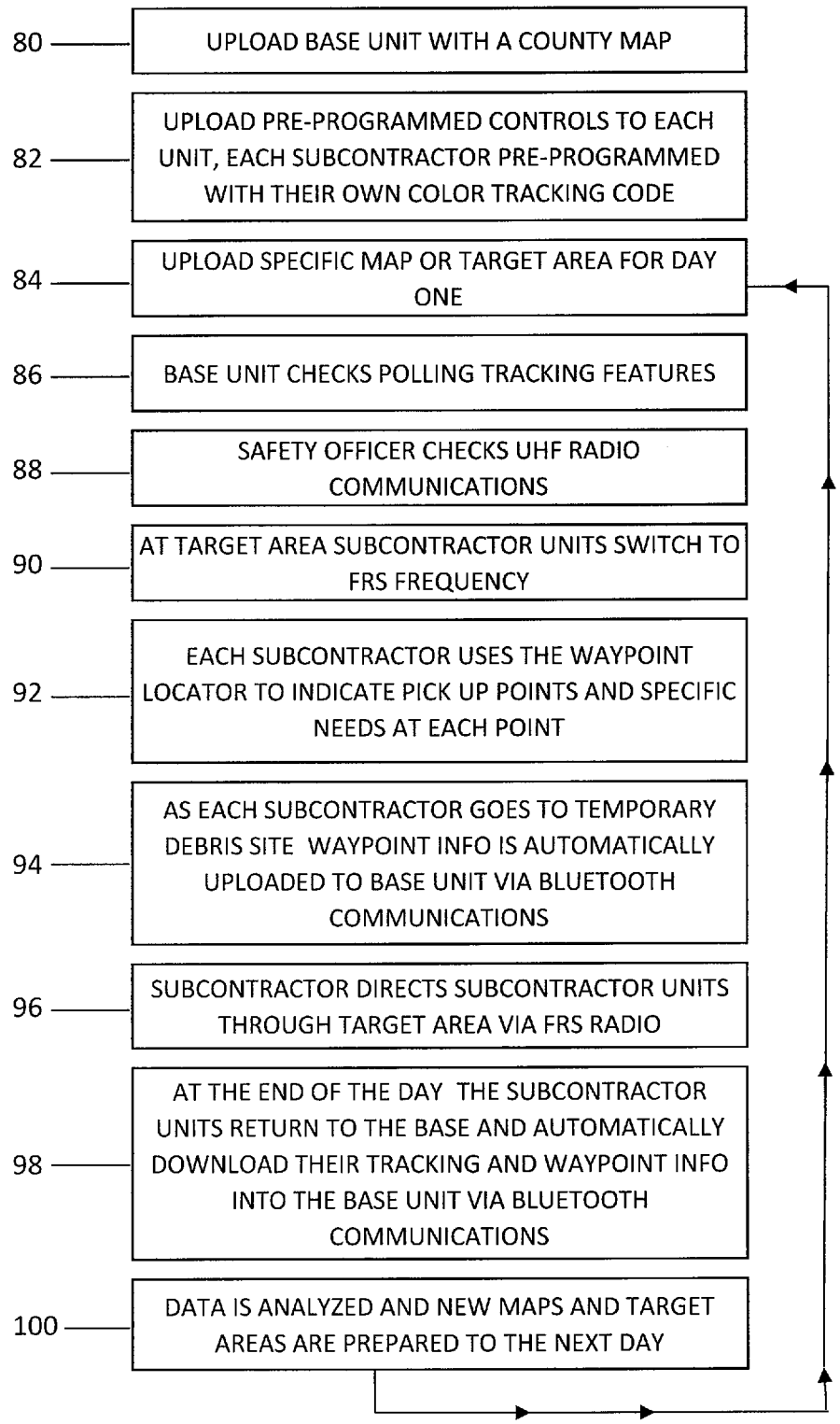
FIG. 4 is a flow diagram of the procedure used by a cleanup contractor.

With reference to FIG. 4, the procedure of a typical cleanup operation after a disaster is described. The base unit is uploaded with a map of the county or area surrounding the site of the disaster at 80. The subcontractors' units are pre-programmed with controls, settings and color codes at 82. The subcontractors' units are uploaded with a specific maps, target areas, forms and notes for the day at 84. The base unit checks the polling tracking feature of the individual units at 86 prior to dispatching the subcontractors if the devices have such a feature. The safety officer checks the UHF, VHF or 800 MHz frequency or iDEN communications feature of the individual units at 88 which are GPS/radio and/or cell phone units, again if the devices have such a feature. Once within the target area, the subcontractors' units are switched to operate on the FRS radio frequency or iDEN at 90. Each subcontractor uses the waypoint locator to indicate a pickup site and the specific needs at each site at 92. The subcontractors proceed to a temporary debris site within the target area. At this location the waypoint information which they have collected that day is downloaded to a unit at the temporary debris site via BLUETOOTH® communications at 94. This information is subsequently sent to a base station through the best methodology available during that moment in time, included but not limited to wireless or cellular data transfer as well as BLUETOOTH® technology. The subcontractor continues to direct the subcontractor units through the target area via FRS radio or IDEN at 96. At the end of the day the subcontractor units return to the base station and automatically download their tracking and waypoint information to a base station unit via BLUETOOTH® communications at 98. The data is analyzed and new maps, target areas, forms and notes are prepared for the next day's operation at 100 and the procedure then returns to step 84. Any of this data described above may be alternatively transmitted and received over other wireless systems like with cell systems to cell phones or other electronic devices and methods.

Figure 5:
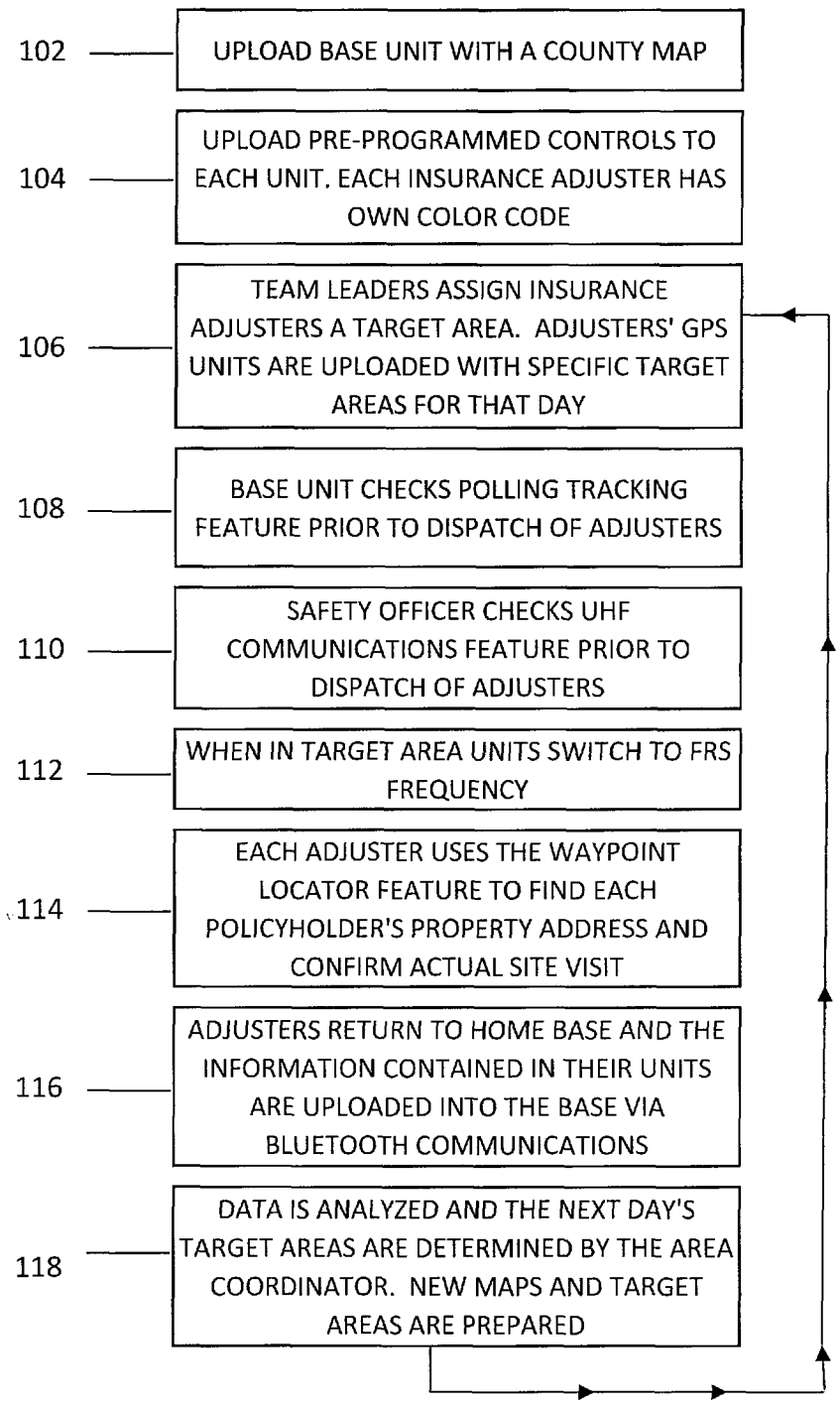
FIG. 5 is a flow diagram of the procedure used by insurance company adjusters.

With reference to FIG. 5, the operation of a typical insurance company's adjuster's visit to a disaster area is described. The base station unit is uploaded with a map of the county or area surrounding the site of the disaster at 102. The individual insurance adjusters' electronic devices are uploaded with pre-programmed controls, settings and color codes at 104. The team leaders assign the insurance adjusters a target area, and the adjusters' electronic devices are uploaded with the specific target areas to be covered that day at 106. The base station unit checks the polling tracking feature of the adjusters' units at 108, prior to dispatching the adjusters. The safety officer checks the UHF, VHF or 800 MHz frequency radio or iDEN communications between the electronic devices at 110. After the insurance adjusters have entered the target area, they switch their radios to operate on the FRS radio frequencies or iDEN at 112. Each insurance adjuster uses the waypoint locater feature of their electronic devices to locate each policyholder's property address and confirm the actual visit to the site at 114. The adjuster can then make notes regarding damages to the property in their own computers or other devices. The insurance adjusters return to the base station and the information contained in their units is uploaded into the base station unit via BLUETOOTH® communications at 116. The data is analyzed and the following day's target areas are determined by the insurance coordinator. New maps and target areas are prepared for the following day at 118 and the procedure then returns to step 106. Any of this data described above may be alternatively transmitted and received over other wireless systems like with cell systems to cell phones or other electronic devices and methods.

In addition to the users listed above, this system can be employed by any and all members of a first responder services such as Homeland Security, the military, the National Guard, Hazardous Material teams, non-governmental responders, volunteer groups, long term recovery organizations, public works department personnel, private sector responders, all other ESF personnel, and the Emergency Management Assistance Compact (EMAC). These individuals and associations will normally use the present invention to assist in the recovery, assistance, and cleanup after natural disasters such as hurricanes, tornadoes, floods and snow storms. However, the present invention can be used for any situation wherein a number of people require assistance like fires, power blackouts, etc., or just as a networking system.

Figure 8B:
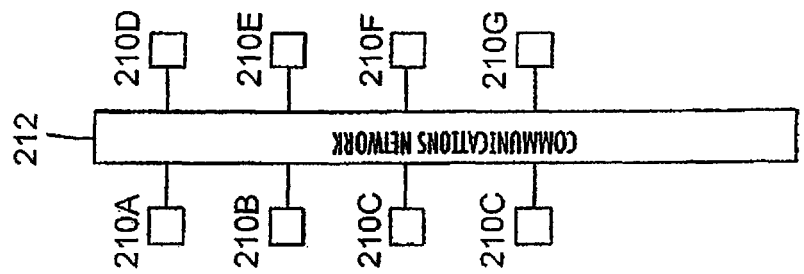
FIG. 8B is a block diagram of a communications network linking the cell phone of FIG. 6 with a plurality of other mobile electronic devices.

A portable cell phone 210 preferably equipped with GPS and GPS functions/capabilities as well as with wireless technology, such as BLUETOOTH is illustrated in FIG. 6. A plurality of other similar cell phones 210A-210G communicate with each other utilizing a communications network such as cell towers 212, as illustrated in FIG. 8B. The cell phones with GPS 210A-210G determine their various locations utilizing any variety of GPS methods available, and can then transmit these locations to the other units over a network, if it is functioning. If the cellular network is not functioning, the center of the communications network shown on FIG. 8B as 212 becomes a server and/or laptop "server," instead of the cell tower system being the communications network. Either way, when the units are within range of a network 212, all the units 210A-210G can be determined and monitored by any one of the units. The plurality of cell phones is thus able to communicate with each other. Alternatively, they can also communicate with a base station. This feature enables the plurality of users of the cell phones to continue to perform their tasks even when they cannot establish communication with a cell phone network via a cell transmission tower. In areas which have recently been devastated by natural disasters, such as hurricanes, cell phone towers have been destroyed. The system of the present invention enables first responders and other personnel to communicate with each other and with a base station or headquarters when the only form of communication is the cell phones the first responders or other personnel are equipped with. The communications between the cell phones are both voice and data. The system of the present invention also enables a search and recovery operation to be established quickly with minimal expense and setup time.

Figure 8A:
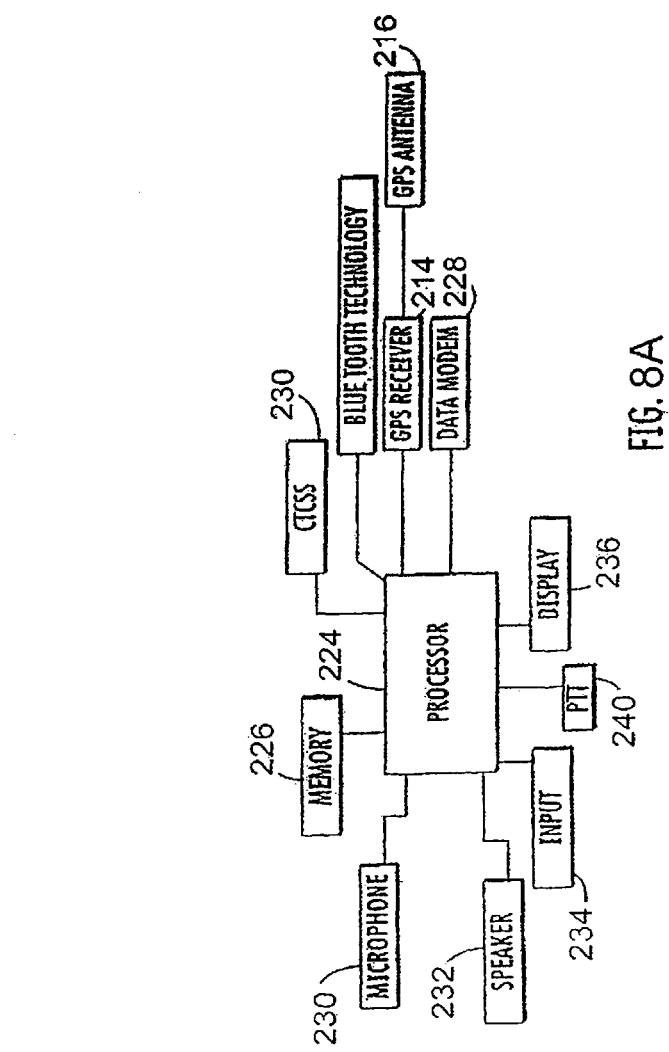
FIG. 8A is a block diagram of the components of the cell phone of FIG. 6.

Referring to FIGS. 6 and 8A, the cell phone with GPS of the present invention will now be described. The cell phone 210 incorporating BLUETOOTH® technology includes a GPS receiver 214 and a GPS antenna 216 mounted in or on the cell phone housing 222. The GPS receiver is electronically coupled to processor 224 which in turn is electronically coupled to a memory 226. The memory 226 can be built into the unit 210 or removably connected thereto, such as a flash memory stick or removable cartridge (both not shown). The memory will normally contain the information necessary to operate the unit 210. The memory can also be used to store cartographic data (electronic maps), waypoints or locations which the unit's operator wants to save, bread crumbs of the operator's tracks, waypoints of the other units and other assessment data, including but not limited to customized forms, notes, events, messages, and work orders, which may be input into the unit 210. The cell phone is electronically coupled to the processor 224 and a data modem 228. The data modem is utilized for transmitting and receiving data such as location data of the units.

The electronic maps stored on the memory devices can be displayed on the unit's display 236. Waypoints or areas traversed by the unit and stored in the memory can also be displayed on the display 236. In a preferred embodiment, the display 236 is a liquid crystal display (LCD) and is used to display other information in addition to navigational information. The unit 210 also includes a microphone 230, a speaker 232 and an input 234. The microphone 230 and speaker 232 are conventional.

Input 234, in a preferred embodiment, is an alphanumeric keypad such as the keypad used on cell phones. This permits the entry of letters, numbers and any other symbols found on keypads. Utilizing special software, almost any number, letter or symbol can be entered into the unit. This type of software is commonly available on cellular telephones. The input 234 could also be a microphone, a voice recognition input, a touch screen, a full keyboard similar to a BLACKBERRY® or a menu driven display screen.

The cell phone unit 210 can also include a continuous tone coded squelch system (CTCSS) 238 and a push-to-talk button 240. The CTCSS controls the audio output of the speakers so that only desired transmissions can be heard by the user of the cell phone 210. The push-to-talk button 240 can be any conventional pushbutton switch or a control device normally found on short-range two-way radios. The push-to-talk button 240 is coupled with the processor 224 to combine two important functions in a single button. The push-to-talk button 240 is operable to both initiate transmission of voice communications and transmission of a radio signal, which indicates the GPS location of the unit. Additionally this feature permits updated location information to be automatically transmitted each time the user transmits a voice transmission. Activation of the push-to-talk button can also trigger a transmission of a radio signal including GPS derived location data indicating the location of the unit transmitting the radio signal. This transmission occurs normally shortly after the voice communications are complete and the push-to-talk button has been released. The processor 224 keeps the radio transceiver enabled for approximately 100-300 milliseconds to allow the transmission of the location data. The cell phone with GPS unit 210 can also include another feature which enables other individuals to determine its location. This is a "polling" feature wherein one unit 10 sends a request to the other unit's 210A-210G for them to transmit their locations back to the requesting unit. This request can be performed manually by the operator of the requesting cell phone 210, or the requesting unit can be programmed to perform this operation automatically at pre-selected time intervals. The locations of the other electronic devices 210A-210G are updated on the electronic map of the requesting unit so that at any time all the units can know where all the other units are. Any and all of the units can perform this location request. If the units are programmed to perform this automatically, then no input is required by any of the operators.

Cell phones with GPS units which include all of these features are complicated to operate and numerous intricate operational procedures must be memorized and/or deciphered to obtain the desired results. Many individuals who are involved in search operations after disasters such as hurricanes are ordinary individuals who are not familiar with the operation of these cell phones. Therefore, for the missions to be successful, these units need to be modified so that anyone could readily operate them.

Using as an example the Motorola Brute, Sanyo Model 7050, Pro 200 or 700 cell phones, the following modifications to the software in these cell phones are made prior to its use in the operations. Once these modifications have been made they do not need to be changed except as the user goes into and out of a working cellular network (or the network is re-established by repairs). These modifications can also be made utilizing BLUETOOTH® communications from a base station or on the cell phone unit itself if the model has such capability. As another example, a BLACKBERRY® Curve Model 3330 GPS/cell phone can also be used when modified as stated above, and with additional programming and/or modifications as well as newly developed cell phone hardware, a host of other phones can utilize this system. Newer cell phone models such as Android and iOS based devices may not require extensive modification to utilize their Bluetooth® or GPS functions in a disconnected environment. The cell phones with GPS and BLUETOOTH® are uploaded with the virtual badge software which can contain the following options, abilities, and features "Forms", 'Pathfinders", 'Time Frame Views", 'Main Menu", "Clock In/Out", "Sign Out", "Who Can See Me Know", "Notifications", "Synch Now", "Start Break", "Message", "Message", "Setup", 'Change User", "GPS", "Map", BLUETOOH® Synch", "Diagnostics", "About", "Shutdown:, "Friends" as described previously. Additional options, abilities and features can include:

"Work Orders": can be tasked out to individual mobile electronic devices with the virtual badge software. Detailed information such as location, specific needs, tasks, or any "work" duties can be sent from the server to one or multiple electronic devices via the system. Once sent to a device or devices with the software, the user has the ability to comment and enter in completion information on the work order, which then can be transmitted back to the base server, with automated time/date stamps that are geocoded at that location.

"Events": allows mobile users to create, invite, and confirm attendance for "Events", which are specified locations with time/date information attached within, including a description of activities and purpose.

"Notes": allows mobile users to create and submit text and photos without predetermined formatting. Mobile users may choose to submit notes privately or to any Affiliation they belong to.

"Profile Surveys": allows users to create and complete surveys that profile their skill-set, credentials, interests, likes/dislikes, and preferences for matching logic purposes inherent in the design of the Pathfinders Task Force software.

"Places": allows users to create and view locations specifically marked on a map. Users may share these "Places" with other users, and administrators may mark special places of interest for their users.

"Data View": allows users to easily access, view, and interpret GPS, submission, and location data as it appears on the map. The Data View is a front-end feature that displays selected map information in a standardized format on the cell phone.

"Aggregate Data Button": allows users to access a grid-style view of GPS, submission, and location data in chronological order. This interface provides users with the ability to sort and filter submitted information based on pre-determined attributes as well as allowing users the ability to export this information in a number of formats, compatible with $3^{rd}$ party software including but not limited to: Microsoft Excel, Tableau Server, Tableau Desktop, VirtualUSA, ArcGIS, ArcMAP Google Earth Pro, and Crystal Reports.

"Form Creator": allows users to create Forms and Profile Surveys, which are accessed by authorized users to fill out and complete. This Form Creator shall be accessible via the web and mobile platforms, and utilizes a "Drag and Drop" interface to create Forms to capture customized information via a multitude of different "Field Types". These Forms must be "Deployed" before additional users may utilize the Form.

"Field Types": refer to the different types of information the user is able to capture. These Field Types include but are not limited to: Alphanumeric Entry, Numeric Only Entry, Single-Select Multiple Choice Entry, Multiple-Select Multiple Choice Entry, Geotagged Photo Upload, Geotagged Photo Attach, Checkbox, Radio Button, Signature Capture, Barcode Scan, and Submit Button. Any given field type can be programmed to either require a field user to input information into that field before submitting, or it can be programmed to save the last value entered on a previous form so that the user does not need to re-enter the same data again. An example of this feature might be to save a filed user from needing to re-enter a street name with 50 homes on the same street.

"Deploy Forms": refers to granting certain users, groups, and affiliations authorization to submit a particular Form. Forms must be deployed before any user other than the creator to submit, and thus, undeployed forms are listed as "Draft".

"Organization and Assignment Screen": allows users to easily create groups, teams, and task forces to organize and manage their users. The Organization and Assignment Screen also allows users to be tasked for functional purposes, by allowing users to be assigned to Tasks, Needs, Work Orders, Events, Affiliations, and potentially other uses. Users may be organized and assigned to tasks via a "Drag and Drop" interface. Users may be sorted based on their profiles, skill-sets, ICS certifications, or other classifications via "Matching Logic".

"Matching Logic": refers to complex software algorithms that classify users based on their responses to profile surveys, allowing for users to be matched to appropriate Tasks, Needs, Work Orders, Events, Affiliations, and potentially other uses because the users' skill-sets and qualifications match with the services needed. Users may be classified based on customizable information, (Ex-Profile surveys may classify based on functional skill-set, such as medical, physical, technology, leadership, etc.), and a corresponding Task, Need, Work Order, or Event may be customized to need one of these functional skill-sets. The appropriate users may then be matched to the appropriate Task, Need, Work Order, Event, or Affiliation. Likewise, as a user completes more details of his/her own profile and skill sets, that user may be better "matched" with a group or organization which has listed its own set of profiles into the system in its own search for like-minded or like-skilled users.

The administrator likewise has the ability to pre-set the expiration date of a user or group of users via a self destruct mechanism. Alternatively, if a user is terminated before the pre-set date, the administrator may send a self destruct code to the virtual badge as well as "notify" supervisory mobile virtual badges to immediately restrict access to a specific virtual badge.

After an operational duty has been inputted, with any related maps, the responder goes out into the designated search areas with an electronic device which has GPS features and functions. At the beginning of every day a different route or search area can be programmed into each electronic device. Preferably, each team will have the same route or search area and different teams will have different routes or search areas. As the team members cover the routes or search areas they will encounter individuals or locations which require specific needs. These items can be inputted into the electronic device in the methods described above.

Figure 9:
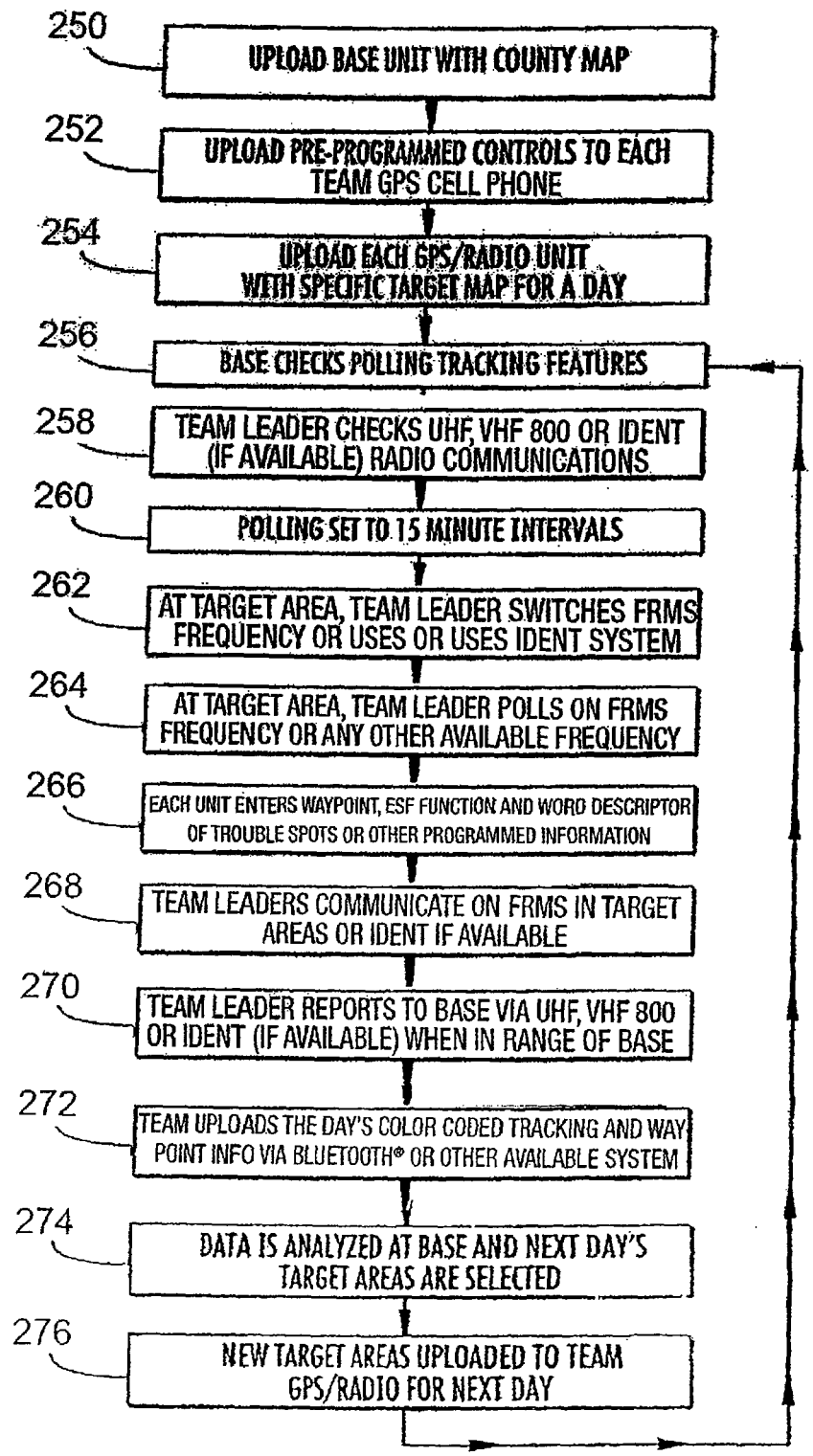
FIG. 9 is a flow diagram of the procedure utilized by the response teams.

The system also can recognize and list the Emergency Support Functions (ESF) and categorize (ESF 1-18) with possible uses as described previously:

With reference to FIG. 9, the operation of a typical search would proceed as follows. The base unit is uploaded with a map of the county or area surrounding the site of the disaster at 250. The individual team electronic devices are uploaded with the virtual badge software and with pre-programmed controls and settings at 252. The individual team units are uploaded with a specific target search map for one day at 254. The team members upload the routes covered, searched areas, assessment data, and waypoints from that day to the base station at 272. While the upload is preferably preformed wirelessly, any other type of data transfer is acceptable. These routes or search areas may be color coded. Any photos taken using the software can be tied directly to a related, custom form, all of which, when saved, is automatically time/date stamped and marked with that location via GPS. The data uploaded into the base station unit is analyzed and the next day's search areas or route are determined at 274. The new search areas or route are uploaded into the teams' individual electronic devices at 276 and the procedure then returns to step 256. While the new routes are preferably uploaded wirelessly, any other type of data transfer is acceptable.

Figure 10:
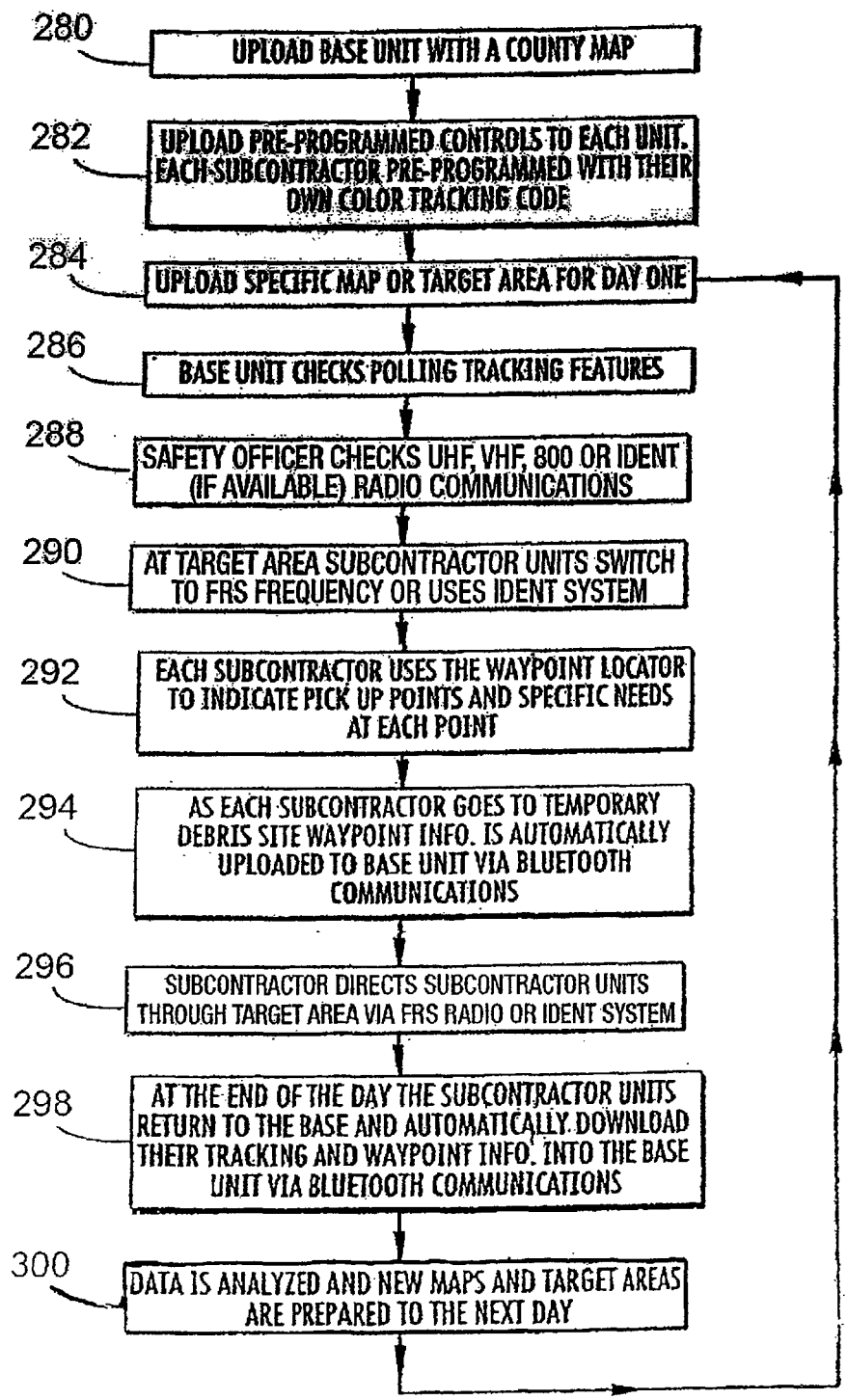
FIG. 10 is a flow diagram of the procedure utilized by a cleanup contractor.

With reference to FIG. 10, the procedure of a typical cleanup operation after a disaster is described. The base unit is uploaded with a map of the area surrounding the site of the disaster at 280. The subcontractors' units are pre-programmed with virtual badge software and with controls, settings and color codes at 282. The subcontractors' units are uploaded with a specific map or target area for the day at 284. The safety officer checks the UHF, VHF or 800 MHz frequency communications or iDEN features of the individual electronic devices at 288, if they have such features. The subcontractors proceed to a temporary debris site within the target area. At this location the waypoint information which they have collected that day is downloaded to a unit at the temporary debris site via BLUETOOTH® communications at 294. This information is subsequently sent to a base station. Any photos taken using the software can be tied directly to a related, custom form, all of which, when saved, is automatically time/date stamped and marked with that location via GPS. At the end of the day or during the work cycle, the subcontractor units return to the base station and automatically download their tracking and waypoint information to a base station unit via BLUETOOTH® communications or other wireless technologies at 298. Alternatively, a field server may be deployed with the software loaded into it to afford mobile users a remote download location without returning to a base. The data is analyzed and new maps and target areas are prepared for the next day's operation at 300 and the procedure then returns to step 284.

Figure 11:
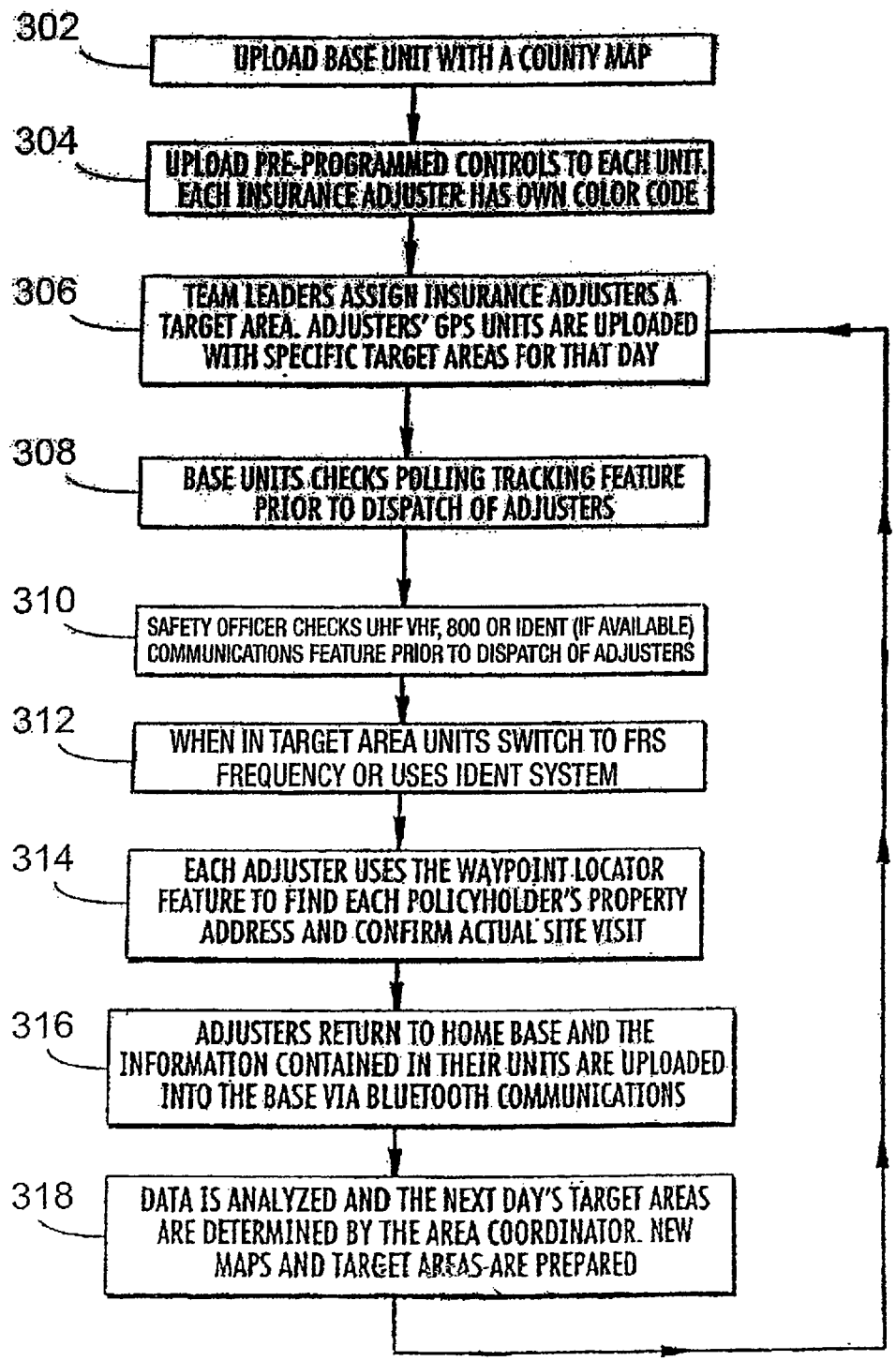
FIG. 11 is a flow diagram of the procedure utilized by insurance company.

With reference to FIG. 11, the operation of a typical insurance company's adjuster's visit to a disaster area is described. The base station unit is uploaded with a map of the area surrounding the site of the disaster at 302. The adjuster's units are pre-programmed with virtual badge software and with controls, settings and color codes at 304. The team leaders assign the insurance adjusters a target area to be covered and the adjusters' electronic devices are uploaded with pre-programmed controls, settings and color codes at 306. Each insurance adjuster uses the waypoint locater feature of their electronic device with GPS to locate each policyholder's property address and confirm the actual visit to the site at 314. The adjuster can then make notes regarding damages to the property in their own computers or other devices. Any photos taken using the software can be tied directly to a related, custom form, all of which, when saved, is automatically time/date stamped and marked with that location via GPS. The insurance adjusters return to the base station and the information contained in their units is uploaded into the base station unit via BLUETOOTH® communications or other wireless technologies at 316. Alternatively, a field server may be deployed with the software loaded into it to afford mobile users a remote download location without returning to a base. The data is analyzed and the following day's target areas are determined by the insurance coordinator. New maps and target areas are prepared for the following day at 318 and the procedure then returns to step 306.

In addition to utilizing electronic devices described previously to implement the system of the present invention, smart phones, such as the iPHONE® and tablet personal computers, such as the iPAD® can also be utilized to implement the system of the present invention. Such features and functions described previously are applicable to the smart phone and/or tablet devices. FIGS. 7A and 7B illustrate the front and back of a typical smart phone 301. The front of the smart phone includes a screen 303 which displays images and data obtained by the software programs of the smart phone. Buttons or controls 305, 4 of which are illustrated, extend along a lower portion of the smart phone. These buttons or controls are employed to perform different functions, depending on the software within the smart phone. A speaker 307 is located proximate an upper portion of the smart phone. This speaker is normally used to broadcast audio transmissions received by the smart phone, though it could be used to allow voice activated field form fill-ins. The smart phone is preferably encased in a material 309 which protects the smart phone from damage. A camera 311 is located on the rear portion of the smart phone. The camera is used to record video images for retention on the smart phone or transmission to another location. Each photo taken using the software can be tied directly to a related, custom form, all of which, when saved, is automatically time/date stamped and marked with that location via GPS. A connection 313 on an upper portion of the smart phone enables auxiliary devices, such as ear buds, to be connected to the smart phone. Another control 315 is located along a side of the smart phone. Control 315 is similar to controls 305.

A tablet personal computer, such as an iPAD®, is illustrated in FIG. 7C. The tablet computer 318 includes a screen 322 on the front of the computer. The screen 322 displays images and data obtained by the tablet computer. A control button 323 is located on the front of the tablet computer and in a lower portion thereof. Control button 323 is used to select certain options available within the software on the computer. The options can be, for example, Go Back, View the Operating System Main Menu, Search, etc. The control button is similar to the controls 305 and 315 on the smart phone. Button 323 can perform many different functions dependent upon the software operating within the tablet computer. A camera 325 is located in an upper portion of the front of the tablet computer 318. The camera is used to record video images for retention on the tablet computer or transmission to another location. Each photo taken using the software can be tied directly to a related, custom form, all of which, when saved, is automatically time/date stamped and marked with that location via GPS. One or more speakers 326 are located proximate a lower portion of the tablet computer. This speaker is normally used to broadcast audio transmissions received by the tablet computer, though it could be used to allow voice activated field form fill-ins. Buttons or controls 320, 321 extend along a side portion of the tablet computer. Button 320 can be employed to lock the computer from receiving any user input. Button 321 can be a volume control button. These buttons or controls are employed to perform different functions, depending on the software within the tablet computer. A button 319 on an upper portion of the tablet computer puts the computer into a hibernation mode and awakens it from this mode. Headphone jack 324, on an upper portion of the computer, permits audio output devices to be connected to the computer.

Referring to FIG. 7D, of the major components of the smart electronic device illustrated in FIGS. 7A-7C is described. The features described in schematic diagram are in addition those elements described above. Components described above and identified in the FIG. 7D with a different identifying number are not meant to indicate different structures. Accordingly, the smart phone 301/tablet 318 may include a GPS receiver 1214 and a GPS antenna 1216 mounted in or on the smart phone 301/tablet 318. The GPS receiver is electronically coupled to processor 1224 which in turn is electronically coupled to a memory 1226. The memory 1226 can be built into the smart phone 301/tablet 318 unit or removably connected thereto, such as a flash memory stick or removable cartridge (both not shown). The memory will normally contain the information necessary to operate the smart phone 301/tablet 318. The memory can also be used to store cartographic data (electronic maps), waypoints or locations which the unit's operator wants to save, bread crumbs of the operator's tracks, waypoints of the other units and other assessment data, including but not limited to customized forms, notes, events, messages, and work orders, which may be input into the smart phone 301/tablet 318. The smart phone 301/tablet 318 is electronically coupled to the processor 1224 and a data modem 1228. The data modem is utilized for transmitting and receiving data such as location data of the units. The processor 1224 may be designed to provide voice command capabilities, in which the user's voice would allow for various tasks, including but not limited to send text messages, listen to music, get directions, call contacts, send emails, view a map, go to websites, or other functions such as populate forms with data or other text.

The electronic maps stored on the memory devices can be displayed on the smart phone 301/tablet 318 unit's display 1236. Waypoints or areas traversed by the unit and stored in the memory can also be displayed on the display 1236. In a preferred embodiment, the display 1236 is a liquid crystal display (LCD) and is used to display other information in addition to navigational information. Any other type of display may also be used on the smart phone 301/tablet 318. The smart phone 301/tablet 318 also includes a microphone 1230, a speaker 1232 and an input 1234.

Input 1234, in a preferred embodiment, is an alphanumeric keypad such as the keypad used on telephones. This permits the entry of letters, numbers and any other symbols found on keypads. Utilizing special software, almost any number, letter or symbol can be entered into the unit. This type of software is commonly available on cellular telephones. The input 1234 could also be a microphone, a voice recognition input, a touch screen, a full keyboard similar to a BLACKBERRY® or a menu driven display screen.

The smart phone 301/tablet 318 can also include a continuous tone coded squelch system (CTCSS) 1238 and a push-to-talk button 1240, or other voice activated systems. The CTCSS controls the audio output of the speakers so that only desired transmissions can be heard by the user of the cell phone 1210. The push-to-talk button 1240 can be any conventional pushbutton switch or a control device normally found on short-range two-way radios. The push-to-talk button 1240 is coupled with the processor 1224 to combine two important functions in a single button. The push-to-talk button 1240 is operable to both initiate transmission of voice communications and transmission of a radio signal, which indicates the GPS location of the unit. Additionally this feature permits updated location information to be automatically transmitted each time the user transmits a voice transmission. Activation of the push-to-talk button can also trigger a transmission of a radio signal including GPS derived location data indicating the location of the unit transmitting the radio signal. This transmission occurs normally shortly after the voice communications are complete and the push-to-talk button has been released. The processor 1224 keeps the radio transceiver enabled for approximately 100-300 milliseconds to allow the transmission of the location data. The smart phone 301/tablet 318 can also include "polling" feature which enables other individuals to determine its location. Additional components of the smart phone 301/tablet 318 may include a camera or camera input 1242, sensors 1244, such as image sensors, touch screen sensors, peripheral connectors 1246 for charging a battery 1248 or for uploading or downloading data, such as a USB data port. For those devices that require tracking, tracking technology 1250, such as an RFID tag 1552 or NFC chip 1254 may be included.

Figure 12:
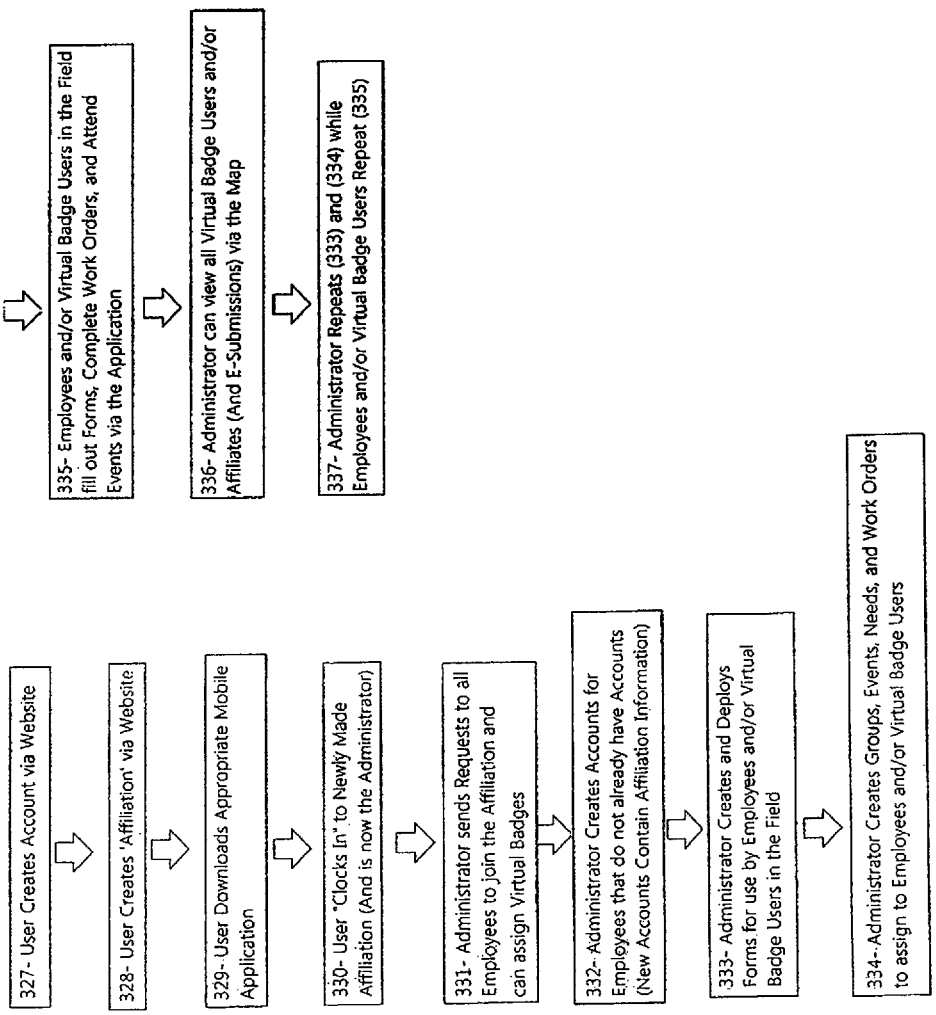
FIG. 12 is a flow diagram of the procedure utilized by a business and/or agency for workforce management.

FIG. 12 is a flow diagram illustrating how an electronic device can be employed utilizing the present invention to manage a workforce using virtual badges. At step 327, the user, who will become the administrator, creates an account via a Website. Next, at 328, the user creates an "affiliation" via the Website. Then, at 329, the user downloads the appropriate application(s). Once these are installed, the user "clocks in" to the newly made affiliation and now becomes the administrator, at 330. Next, the administrator can send requests to all selected users and/or employees to join the affiliation at 331, and the administrator can assign virtual badges to selected individuals or users. Alternatively, mobile users can download the application to their device by a request to the administrator or by going to on line stores. The administrator then can create accounts for the user and/or employees that do not already have accounts at 332. These new accounts contain affiliation and registration information. The administrator may choose at any step to perform a desired background check, using a third party screening service. Then, the administrator can create and deploy custom forms for use by mobile users with the virtual badges in the field at 333. Next, the administrator can create groups, events, and work orders to assign to employees at 334. The mobile users in the field then fill out forms, complete work orders and attend events via the application at 335. The administrator can view all the affiliates, virtual badges and e-submissions via the map at 336 (recalling a Smart phone supervisor can view all of a group's users with the system). Finally, at 337, the administrator repeats steps 333 and 334, while the mobile users repeat step 335.

Figure 13:
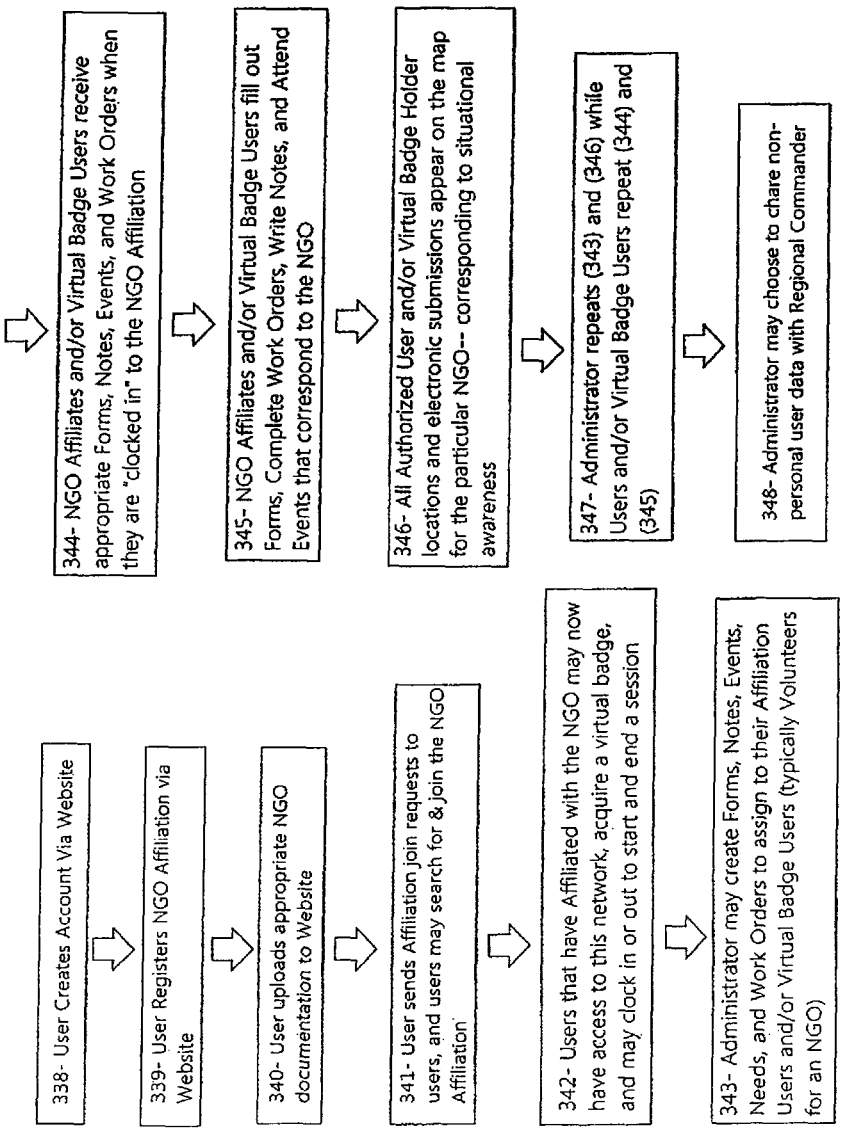
FIG. 13 is a flow diagram of the procedure utilized by a Non-Governmental organization for volunteer management.

FIG. 13 is a flow diagram illustrating non-governmental organization (NGO) volunteer management. First, at step 338, a user, who may become the administrator, creates an account via a Website. Next, the user registers the NGO affiliation via the Website at 339. Then, the user uploads appropriate NGO documents to the Website at 340. The user next sends join requests to specific users, or users may search for and join the NGO affiliation at 341. At 342, the users that have affiliated with the NGO may now have access to this network and may acquire a virtual badge, clock in or out to start and end a session. The administrator also may choose at any step to perform a desired background check, using a third party screening service. The administrator also may create forms, notes, events, needs, and work orders to assign to their affiliated users (typically volunteers for an NGO) at 343. Likewise, with the mobile user's completed skill sets as in task books (used in the forestry "red card" systems) and submitted certifications, the NGO may choose to Type the mobile user, using Incident Command System (ICS) typing guidelines. Each NGO may customize these Typing features to meet their agency needs, but with 5-7 Type levels, the NGO can far better pair skill sets of personnel with the needs of the specific tasks at hand. These ICS types similarly could display a virtual badge user's qualifications and certifications with this numeric display, combined with the ESF function those credentials are tied to. (It is important to note that this Typing feature is not limited to just volunteer operations covered in this subsection). Next, at 344 the NGO affiliates receive appropriate forms, notes, events, needs and work orders when they are "clocked in" to the NGO affiliation. Then, at 345, the NGO affiliates fill out forms, complete work orders, write notes and attend events that correspond to the NGO. At 346, all authorized user and/or virtual badge holder locations and electronic submissions appear on the map for the particular NGO, corresponding to situational awareness. Then at 347, the administrator repeats steps 343 and 346 while the users repeat steps 344 and 345. Finally, at 348, the administrator may choose to share non-personal user data with an Incident Commander (IC).

Figure 14:
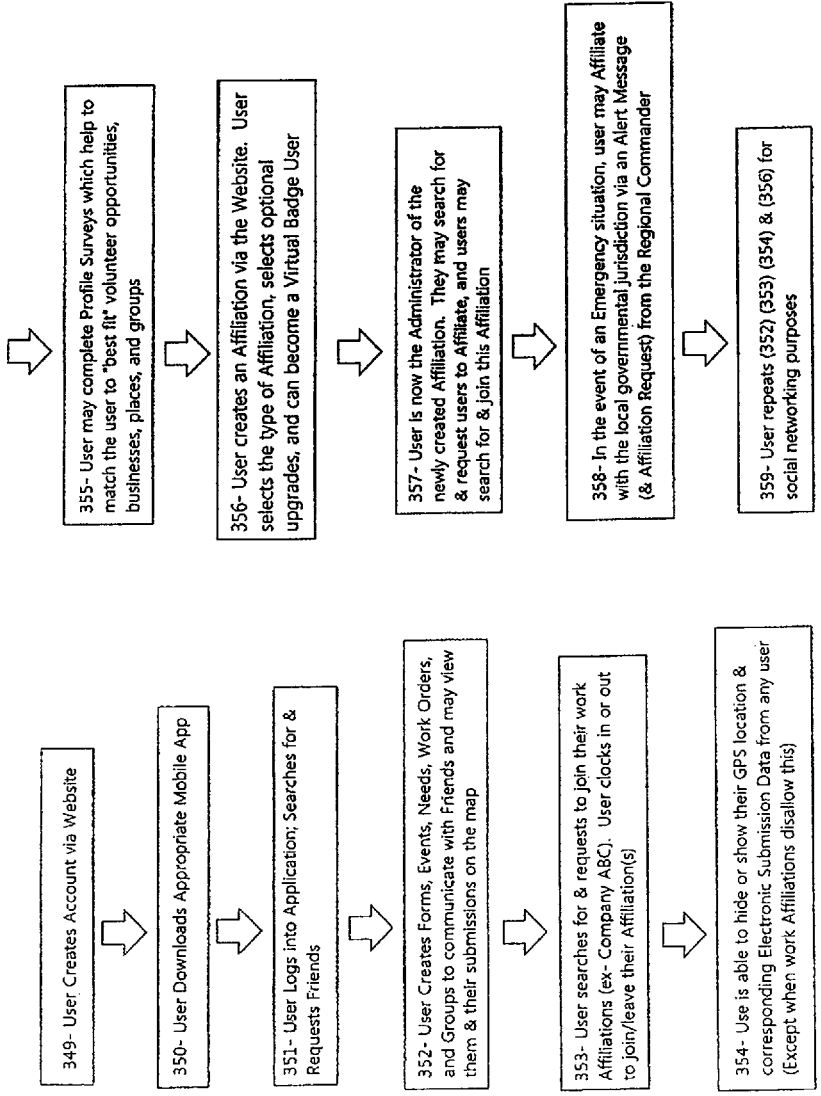
FIG. 14 is a flow diagram of the procedure utilized by an End-User for social networking and GPS tracking for event creation and management.

FIG. 14 is a flow diagram illustrating end user social networking. At step 349, a user creates an account at a Website. Then, at 350, the user downloads appropriate mobile application(s). Next, at 351, the user logs into the application and searches for and requests friends. Next, at 352, the user creates forms, events, needs, work orders, and groups to communicate with the friends and may view them and their submissions on the map. Then, at 353, the user searches for and requests to join their work affiliations. The user then clocks in or out to join or leave their affiliations. At 345, the user is able to hide or show their GPS location and corresponding electronic submission data from any user (except when work affiliations disallow this). Next, at 355, the user may complete profile surveys which help match the user to "best-fit" volunteer opportunities, businesses, places and groups. At 356, the user creates an affiliation via the Website. The user selects the type of affiliation and selects any optional upgrades. At 357, the user can become an administrator of the newly created affiliation, if authorized. Different administrative levels can allow for different levels of controls of the system itself. Administrators may search for and request users to affiliate and users may search for and join this affiliation. Administrators also can track hours logged by mobile users as well as a host of other valuable field data. In the event of an emergency situation, the user may affiliate with local governmental jurisdiction via an alert message and affiliation request from the regional commander at 356. Finally, at 359, the user repeats steps 352, 353, 354, and 356 for social networking purposes.

The virtual badge system of the present invention can be employed to provide a functional and efficient database to serve as the repository for all information gathered in the field via the electronic device. This database shall be separated into sectors based on user permission and user affiliations to other organizations contained inside the software. The system also may allow for a separate database storage system at a specifically desired location, like a user's normal offices.

The virtual badge system of the present invention can also provide the means for an authorized and affiliated Governmental entity (typically a County or Parish's Emergency Management Team) to control a disaster response operation via the electronic device, which is interfaced with a web-based version of the cell phone software meant for administrative purposes. This affiliated Governmental entity (henceforth referred to as the "Regional Commander") may submit a mass-alert to authorized users that serves as an "opt-in" program to the particular disaster response operation. This ability (via the customized software) allows the Regional Commander to organize and task both his virtual badge users of responders and what would normally be spontaneous volunteers with no affiliation or tasking.

The virtual badge system of the invention allows users to create discrete groups, businesses, organizations, and affiliations via the electronic device for the purpose of business management and user privacy. Groups, businesses, organizations, and affiliations are treated as discrete entities by utilizing the cell phone software that contains a private sector of the database that only authorized users may access. Users may "clock in" or "clock out", using the electronic device software, to enable or disable affiliation with a group, business, organization, or affiliation.

Organization tools are also available via the electronic device such that responders and users in the field can customize the organization of their virtual badge users. Users have the ability via the system and/or electronic device equipped to "drag and drop" user representations (in the electronic device or base's software) to assign them to organizations and groups, and in emergency management events, into chain of command charts for both paramilitary and military responses.

Inventory management related tools are also available via the electronic device such that responders and users in the field can easily create and maintain inventory lists for further reference. This generally applies to disaster environments, primarily for critical inventory management, but is applicable to non-disaster scenarios. In this embodiment, with a plug in module, the virtual badge may contain similar information to a person's identification data such as a photo, data, location, quantity, condition, clock in, clock out, timed maintenance required (like servicing a generator) or expiration schedule (like medications) of inventoried assets, and/or an image like a Bar or QR code linked of the inventoried equipment, all of which can be monitored, managed, and scanned as described herein.

The present invention can also provide a mobile credit card payment/reward system and credit card payment gateway for mobile users to process payment via the electronic device equipped for purchasing the virtual badge or for payment for jobs completed in the field. This mobile credit card payment system and credit card payment gateway can be implemented via pre-existing external attachments to the cell phone that allow for or by NFC or scanning technologies, including magnetic-strip cards to be read, interpreted, and processed for payment (via the customized electronic device software, credit card payment gateway, and/or database). The electronic device can be adapted to incorporate software and/or a digital chip that holds a virtual badge user's information. The chip can be designed to generate a unique pin code when used. The unique pin code can be generated every time it is used or at predetermined times. If the virtual badge is lost or stolen, the self-destruct mechanism will render the virtual badge useless immediately upon implementation.

The present invention can also provide privacy controls via the electronic device for the purpose of allowing virtual badge users in non-disaster purposes the ability to "hide" their location and information submitted from other discrete users, groups, businesses, organizations, or affiliations (subject to an administrator's approval). The nature of GPS tracking necessitates that privacy controls be implemented via the customized cell phone software in order for the invention to be viable on a day-to-day basis. It is yet a further objective of the invention to provide the user easy means via the cell phone to change settings in the cell phone software related to user Profile Information, GPS & Locations Settings, BLUETOOTH® Synchronization, Wi-Fi Synchronization, and privacy controls. All of these settings change settings in the cell phone software. This can be accomplished by pre-programming a single "push button" on a cell phone or device to perform all of these functions when activated. Some secure facilities may choose to not allow virtual badge users the option of turning off the tracking mechanism, and alternative forms of the software allow such controls by a client.

The present invention also provides a system and method for identifying or classifying members of a team of virtual badge users based on their knowledge, skills, qualifications, certifications, and abilities to perform particular functions. The members of the team can be career responders or volunteers. The members of the response team are preferably identified or classified into "Types" based on completion of FEMA sponsored National Incident Management System (NIMS) instructional and command-oriented classes, based on previous disaster response experience using Task Books, or based on defined parameters by the system of the present invention. Each "Type" can have sub-categories. The following six "Types" are an example, though any additional "Types" are also possible, dependent on an administrator or agency's preference or policies, such as the Forest Service's current "red card" system designed to qualify and credential first responders:

Type VI—non-registered applicants and/or responders with just a headshot photo of themselves and/or personal data.

Type V—Entry level. Inexperienced and untrained. Passed initial verifications as set by an administrator Type IV—Inexperienced with some training. Has completed a criminal background check. Completed certifications like NIMS courses IS-100 IS 200, and IS-700. Completion of orientation and/or on-boarding as a new user. Has photo identification.

Type III—Inexperienced with some command training. Has completion of criminal background check. Completed NIMS courses IS-100.a, IS-200.a, and IS-700.a. Basic first aid and CPR knowledge. Completion of orientation. Has photo identification. Type II—Some experience with full command training. Has completion of criminal background check. Completed NIMS courses IS-100.a, IS-200.a, ICS-300, IS-700.a, and IS-800.b. First aid and CPR knowledge. Completion of orientation. Has photo identification.

Type II—Lots of verifiable experience with full command training. Has completion of criminal background check. Completed NIMS courses IS-100.a, IS-200.a, ICS-300, IS-700.a, IS-800.b., IS 0305, and other command level certifications. First aid and CPR knowledge. Completion of orientation. Has photo identification. Has more extensive, verifiable task book type qualifications in addition to certifications from various courses.

Type I—Extensive experience with full command training. Has completion of criminal background check. Completed NIMS courses IS-100.a, IS-200.a, ICS-300, ICS-400, IS-700.a, IS-800.b., IS 0305, and other command level certifications. First aid and CPR knowledge. Completion of orientation. Verifiable field experience. Has photo identification. Has extensive, verifiable task book type qualifications in addition to certifications from various courses.

Software contained within the electronic devices or on the web-based version can sort the virtual badge users based on the above noted criteria, using matching logic or manually matching their skills and talents with the needs of an organization to accomplish a job or task. EMAC mission assignments then would be assured of relying upon currently qualified and certified personnel during a deployment. Students attending a course could be sent a virtual badge as part of the registration process, and then be Clocked in or Clocked Out by the Instructor with a virtual badge, either using scanning or NFC type technologies. On successful completion of a course, the virtual badge users can upload their National Incident Management System (NIMS) or other course certificates via a portal on the software's website or upload said documents using the software. The courses can be verified by an administrator and entered into the system via the server-side database of the software system. Alternatively, the system could import this kind of data from a state or local training center via an API link if desired. This updates the system to sort and "Type" the individuals or volunteers, as well as to assist with assigning appropriate tasks to appropriately qualified virtual badge users. The system can be designed to send an alert to a supervisor or administrator if a virtual badge user's certificates have expired or are inadequate for a task. For example, in working an oil spill, a virtual badge user may need a HazMat course, and if a virtual badge user were inappropriately selected for a task, an alert could be automatically sent to the administrator advising of this inadequate level of certification of that user for that task.

The invention also provides the user with tools for integration with existing software, via software APIs, such that the data collected via the electronic device software system may be exported and integrated for additional uses, reporting, analytical, or business development purposes.

The present invention further enables 2-way satellite communication via cell phones and satellite devices that transmit data through the satellite network as opposed to through cellular signal. These devices can permit the virtual badge user to be "online" at all times, even when the device is disconnected from cell service, and will aid in disaster operations.

The present invention also involves a process wherein a small crew and/or family unit with the virtual badge software could set user-defined administrative settings which restrict or allow selective GPS visibility in the mobile and/or desktop software application. These user-defined administrative settings should allow for user data in the form of geo-tagged photos, events, forms, tasks, and locations to be encrypted in the mobile and/or desktop software application before this data is sent to the server. As per this technical process, only authorized users' mobile and/or desktop applications possess the corresponding private key to decrypt this data. For further safety and security, additional administrative settings allowing remote access to the handset may be enabled. These additional administrative settings include but are not limited to: turning on the handset microphone, either forward or backward facing cameras, and browsing history. This invention therefore has administrative settings that can be enabled or disabled in certain builds of the application. These administrative settings further encrypt locations in the application and help ensure safety. This process allows very strict monitoring of a small crew or family unit of virtual badge users by an administrator within a protected silo.

Figure 15:
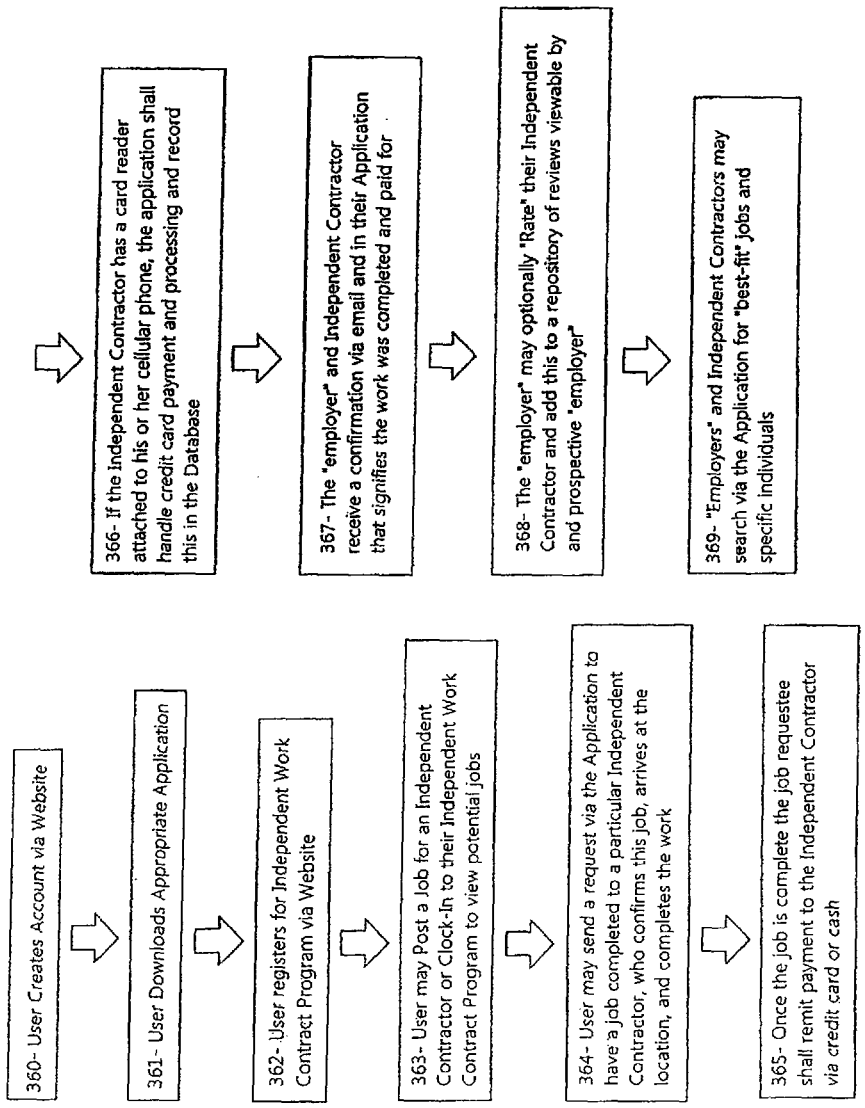
FIG. 15 is a flow diagram of the procedure following a disaster utilized by a contractor and/or potential employer to post jobs, find jobs, complete jobs, and have payment processed for jobs.

FIG. 15 is a flow diagram illustrating work contracts and jobs, like for example, debris haulers (or other contractor). At step 360 a user creates account(s) via a Website. At 361, the user downloads the appropriate application(s). Next, at 362, the user registers for the work contract program via a Website. The user can now post a job for a contractor or "clock in" to their work contract program to view potential jobs, at 363. Next, at 364, the user may send a request via the application to have a job completed to a particular contractor, who confirms this job, arrives at the location, and completes the work. Once the job is complete, the job requester can remit payment to the contractor via credit card or cash at 365. If the contractor has a card reader attached to his electronic device, the application can handle the credit card payment and processing and record them in a database at 366. Next at 367, the "employer" and contractor receive a confirmation via e-mail, and in their application, that signifies that the work was completed and paid for. At step 368, the "employer" may optionally "rate" their contractor and add to a repository of reviews viewable by any prospective "employer". Finally, at step 369, the "employers" and contractors may search via the application for "best-fit" jobs and specific individuals using the system's matching logic features.

Figure 16:
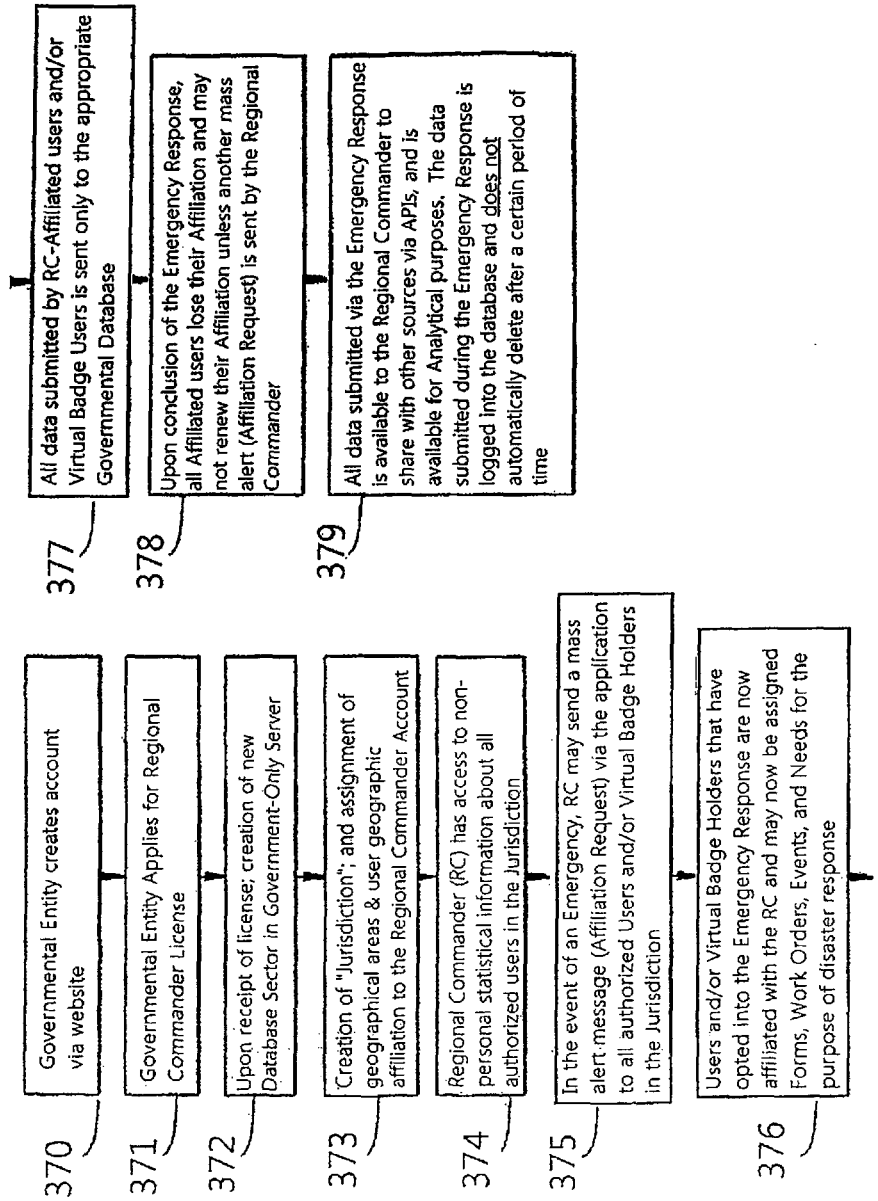
FIG. 16 is a flow diagram of the procedure utilized by a regional commander to manage resources and assets in the event of an emergency.

FIG. 16 illustrates a flow diagram demonstrating how an Incident Commander (IC) can gain access to various areas and information. First, at step 370, a governmental entity creates an account via a Website. Then, at 371, the governmental entity applies for an Incident Commander license. Upon receipt of the license, a new database sector in a government only server is created at 372. Next, at 373, a "Jurisdiction" is created and an assignment of geographical areas and user geographic affiliation to the IC account occurs. Then the IC has access to non-personal statistical information about all authorized users in the jurisdiction at 374. In the event of an emergency, the IC can send a mass alert message (affiliation request) via the application to all authorized users and/or virtual badge holders in the jurisdiction at 375. Users who have opted into the emergency response are now affiliated with the IC and may now be assigned forms, work orders, notes, tasks, events, and needs for the purpose of disaster response at step 376. All data submitted by IC affiliated users is sent only to the appropriate governmental database sector at 377. Then, at 378, upon conclusion of the emergency response, all affiliated users lose their affiliation and may not renew their affiliation unless another mass alert (join request) is sent by the IC. Finally, at 379, all data submitted via the emergency response is available to the IC to share with other sources via APIs and is available for analytical purposes. The data submitted during the emergency response is logged into a selected database and does not automatically delete after a certain period of time.

Figure 17:
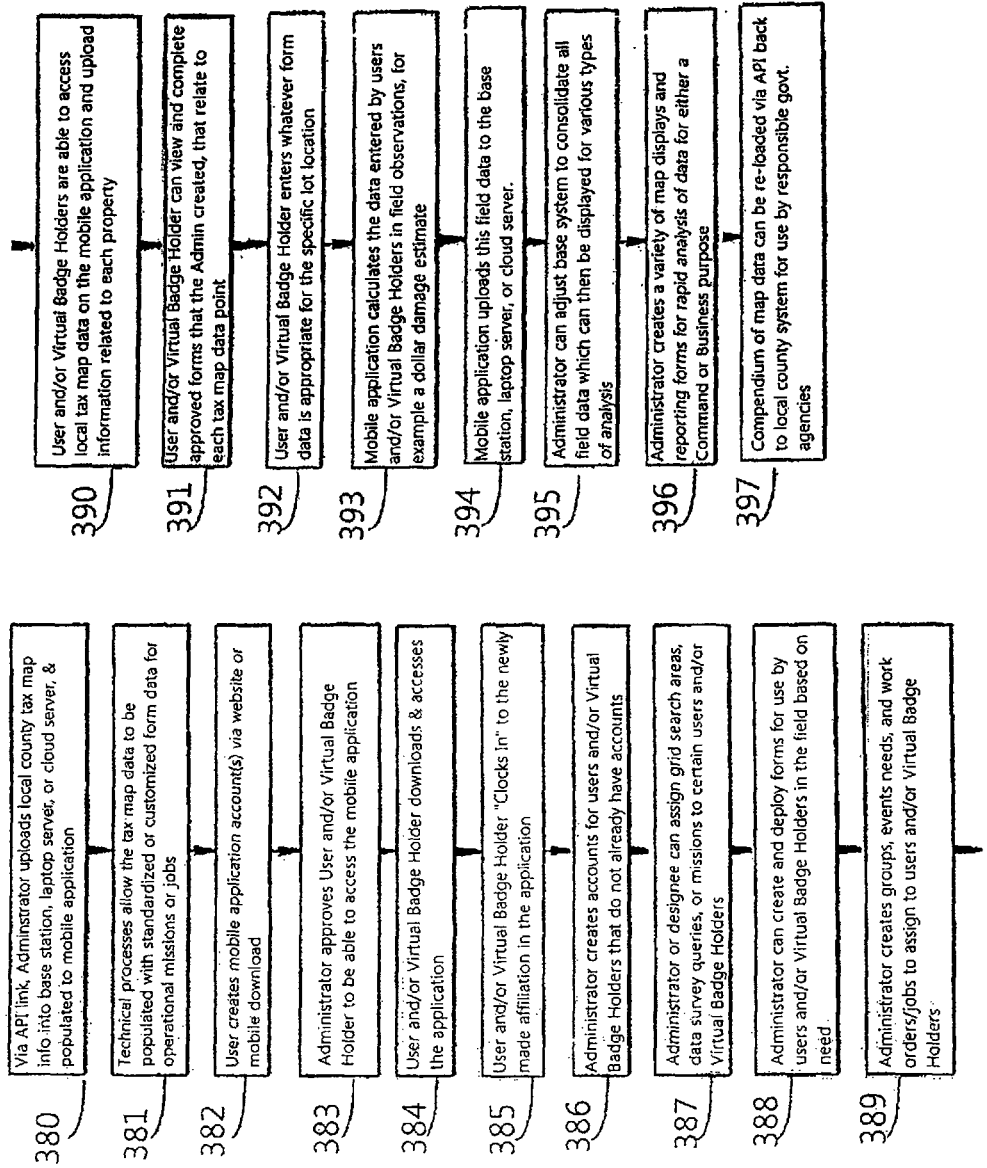
FIG. 17 is a flow diagram of the procedure for GPS enabled software to interact with a software to upload public data such as tax maps.

FIG. 17 is a flow diagram illustrating a process or method on the GPS enabled software interacting with the software system and uploaded, local, publicly stored government data such as a local tax assessor's data information base merged into the system via an API link. Such tax data bases contain individual lot I.D. numbers, lot sizes, owner's names, addresses, contact information, often detailed floor plans, valuations, zoning, building permit information, construction history, etc. Such tax maps also can reveal critical infrastructure details and locations as well. Step 380 illustrates an upload via an API link of the local county tax data base into a secondary or remote third party independent data storage device such as the base station, laptop server, or cloud server such that this information then can be populated into the map in the mobile and/or desktop software application. Step 381 is when the technical process allows these map points to be populated with standardized or customized form data and tasked to users for operational missions or jobs. At step 382, a user creates account(s) via a Website; and at Step 383, the Administrator needs to approve the virtual badge holder to allow access to the mobile app. At 384, the virtual badge holder downloads the appropriate application(s), and at Step 385, the virtual badge holder "Clocks In" to the newly made affiliation. Step 386 shows the Administrator creating an account for virtual badge holders that do not already have accounts. At Step 387, the Administrator or his designee can assign certain grid search areas or data survey queries to certain virtual badge holders and/or teams. The Administrator can create and deploy forms for use by virtual badge holder and/or responders in the field at Step 388 based on the needs. Step 389 shows the Administrator creating groups, events, needs, and work orders to assign to virtual badge holders. At Step 390, virtual badge holders are be able to access the consolidated mobile mapping and local tax data on any specific lot by uploading the specific point within an illustrated set of lot lines via a touch screen on the phone. Every lot on the mobile map can have such a touch point to allow the user to pull up the background, detailed data. With the mobile application now revealing the lot's designated data at Step 391, the virtual badge holder can view the Administrator's choice of field viewable data, which will contain form fields with either fill in options or drop down options to rapidly collect GPS field data about that lot. Step 392 illustrates the virtual badge holder entering whatever form data or selecting an appropriate drop down option as may be appropriate for that lot location. Step 393 illustrates the virtual badge holder's mobile application calculating the data entered by these field observations. One example of an input could include the mobile user's observations of the percentage of damage to the structure, which can be numerically entered into the form field or by selecting an appropriate drop down option, where the GPS enabled mobile application can note the GPS coordinates, the time and date of the entry, and the user ID number for subsequent accountability. The virtual badge holder also has the option of taking photos of the lot, which photos are tied to the form and its data. By entering a number or a drop down, pre-scripted, percentage of observed damage, the GPS enabled phone software can auto-calculate the actual dollar damage estimate, based on the local tax assessor's valuation and/or based upon the user's inputted field observations. After auto-calculating the damage observed, a color code can be associated with a predetermined damage valuation or other needs at GPS location. Color codes can be displayed on a map whereby damage to a location and/or resources needed to address the specific damage, need, or assistance to an area can be determined. Additionally, the color codes can be displayed on a mobile user's software application on their phone, a web application, or combination thereof. On viewing a host of such locations on a map, color codes, and especially groups of similar colors, a virtual badge holder readily could identify areas of need or areas with little needs. Patterns based on such group color codings could lead to quicker evaluations and more efficient responses. Data from the virtual badge holder's software or software application can also be transferred to a remote storage device, such as the base station, laptop server, or cloud server as described above. A designated color code also can be auto-assigned to each lot ahead of sending users out for assessments, based on the Administrator's tasking. For example, the base station, laptop server, and/or cloud server may auto-calculate and/or analyze impacts and needs to pre-defined geographic areas, with views of groups of color codes as described above. Step 394 documents the mobile application uploading its field data back into the base station, laptop server, or cloud server. At Step 395, the Administrator can adjust the base system to consolidate all of the field data into the system's data base which can then be queried for any and all of the geotagged and time date stamped data gathered from a host of users to analyze a variety of impacts to a local community. At Step 396, the Administrator can create a variety of map displays, color coded and data driven, reporting forms like ICS 209 forms, graphic and tabular displays—all for rapid analysis of large amounts of data into simplistic displays for either a Command or business application. The Administrator also could choose to display miniature thumbnail photos on the base maps, with the photos and/or icons each bordered by the same chosen color codes to again quickly reveal patterns of lot assessments. Step 397 illustrates how this compendium of map data can then be re-loaded via an API back into the local county system for use by a host of responsible government agencies. Step 397 illustrates how the Administrator can repeat Steps 387, 388, 395-397, while the virtual badge holder can repeat Steps 389-394 as needed.

In yet another use of a variation of FIG. 17, a local government could use the same displayed methods for training, which training can integrate with on-going research in a community. For example, if teams were receiving training on the software system, forms could be created which can survey data collection by students in the field. By targeting a certain low income community for such a training zone, a class could collect housing data such as the age and type of roofing, storm hardened windows, obvious code enforcement issues. As a result of such a survey, the local government then could use the field collected data for grant application, like block grant funding from the federal government, to prove for the grant application that there is indeed a justified need for the grant monies to support. Similar data could be pre-scripted into forms for such trainings on door to door surveys of local populations as well, with invaluable data for collecting unmet needs, local trends, and research for university studies. Once again, this system used in these examples meets FEMA's Whole Community approach to developing such systems, and more day to day use like described herein offers viable uses for training opportunities for a wealth of development programs as well.

Figure 18:
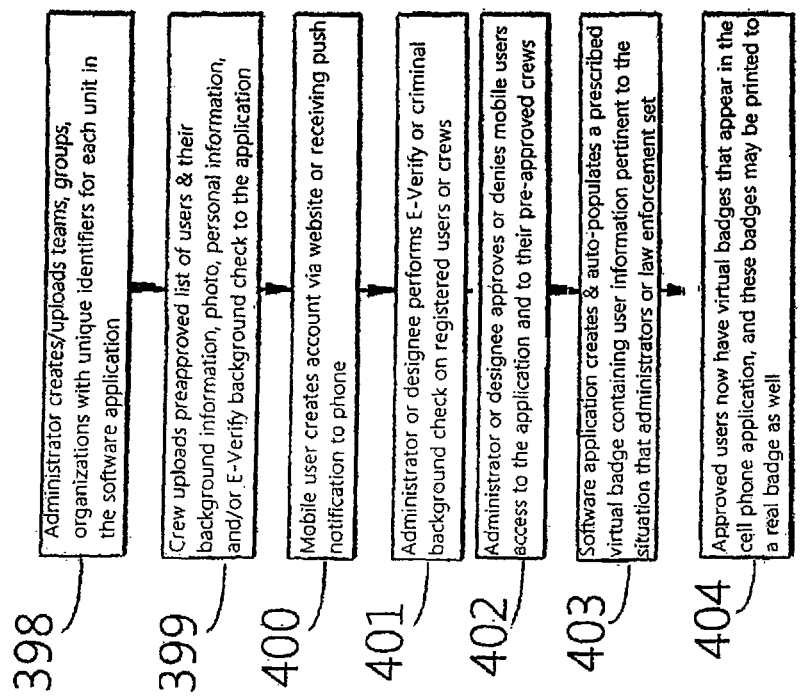
FIG. 18 is a flow diagram illustrating how an administrator might create a virtual badge profile, including groups or teams of virtual badge users, including various background checks of registered users.
Figure 20:
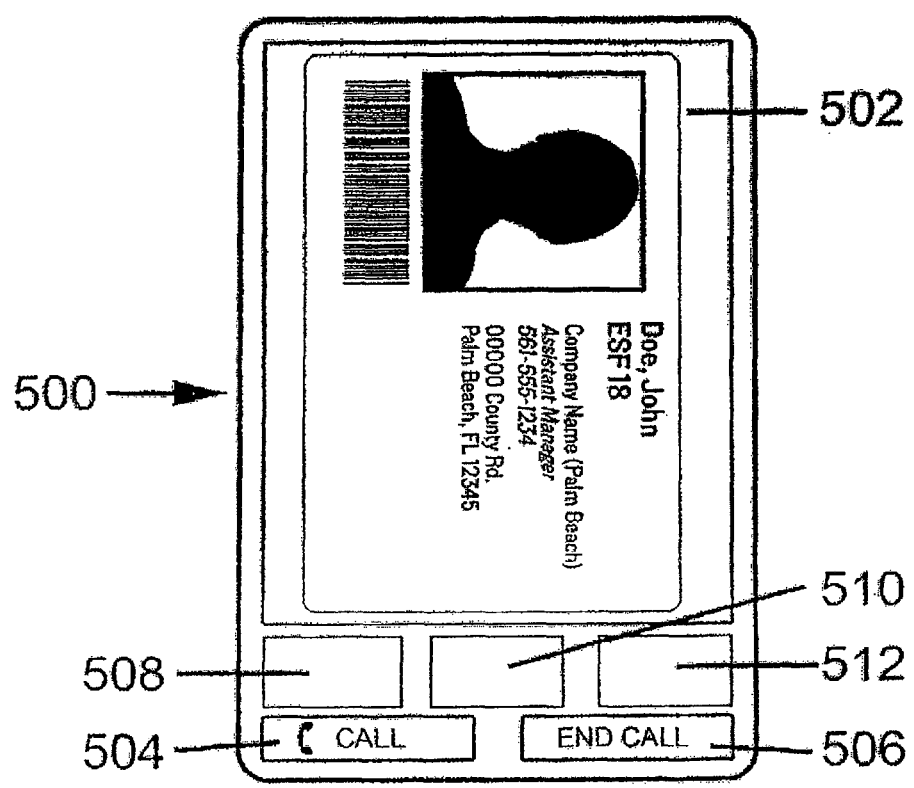
FIG. 20 is an illustrative example of a cell phone with the virtual badge.

FIG. 18 describes an illustrative process or method wherein a certain screen or view of the handset application contains the virtual badge. At Step 398, an Administrator creates or uploads teams, groups, volunteer organizations, and/or local businesses plus their employees (collectively referred to as "a crew") with unique identifiers for each unit. As an illustrative example, for temporary access following a disaster or other emergency or for normal day to day access, Step 398 could be used to upload information relating to a resident (or one of his/her staff members) of a barrier island community or other neighborhood, including the address to which those users are allowed access. Other uses include, but are not limited to providing citizens with temporary access to gated communities or privately restricted areas, monitoring cruise ship passengers entering and exiting the ship, monitoring visitors to public buildings, armed services facilities, volunteers responding to disasters, and/or institutions. Step 399 illustrates how each crew uploads its own pre-approved list of virtual badge users. As an illustrative example, a response crew could upload its crew of users. Alternatively, a homeowner on a barrier island or other neighborhood could perform this Step, if allowed by the Administrator. The upload process would include adequate details of background information to allow proper identification, such as a photo of the user, a name, date of birth, address, and/or social security numbers (enough information for instance of an E-verify background check to confirm the user is a legal resident allowed to work in the United States or for a simple "wants and warrants" check by a local law enforcement agency, all subject to the Administrator's discretion). Step 400 illustrates a mobile user creating an account via a Website seeking a link to a designated crew, or other entity, or the user could receive a push notice via the mobile phone from the Administrator. At Step 401, the Administrator or his designee can perform an E-Verify background check or criminal background check, or other type of check, as may be desired. Step 402 shows the Administrator then needs to approve linking the virtual badge user to a pre-approved crew and/or home site and/or business location to allow access to the virtual badge holder and merge that user's data with its designated crew, home site, or business location in the application's database. The Administrator could push the virtual badge to the designated mobile device via the cellular network or via Bluetooth® or other means as needed. At Step 403, the software system then auto-populates a prescribed virtual badge on the mobile device containing user information pertinent to the situation, as illustrated in FIG. 20, such as a photo, logos, a name, social security number, gender, age, skill set, credentials, blood type, etc., randomly created unique ID number, along with its unique bar code or QR code image which may contain the same data or more, as determined by the Administrator. This virtual badge may also be color coded, (see FIG. 21 where the shaded 534 region is colored in for example red, blue, yellow, orange), corresponding to any information an administrator, like ESF-16—law enforcement and security, or authorized designee sets. Alternatively, or in addition to the color coded region, other counter measures to counterfeiting such as the use of logos, symbols, security clearance levels, or words added to the background or as watermarks and programmed to change based on one or more factors, such as code commands or varying, specified, time periods. At Step 404, the now approved user has an approved virtual badge that can be displayed from his cell phone application.

Figure 19:
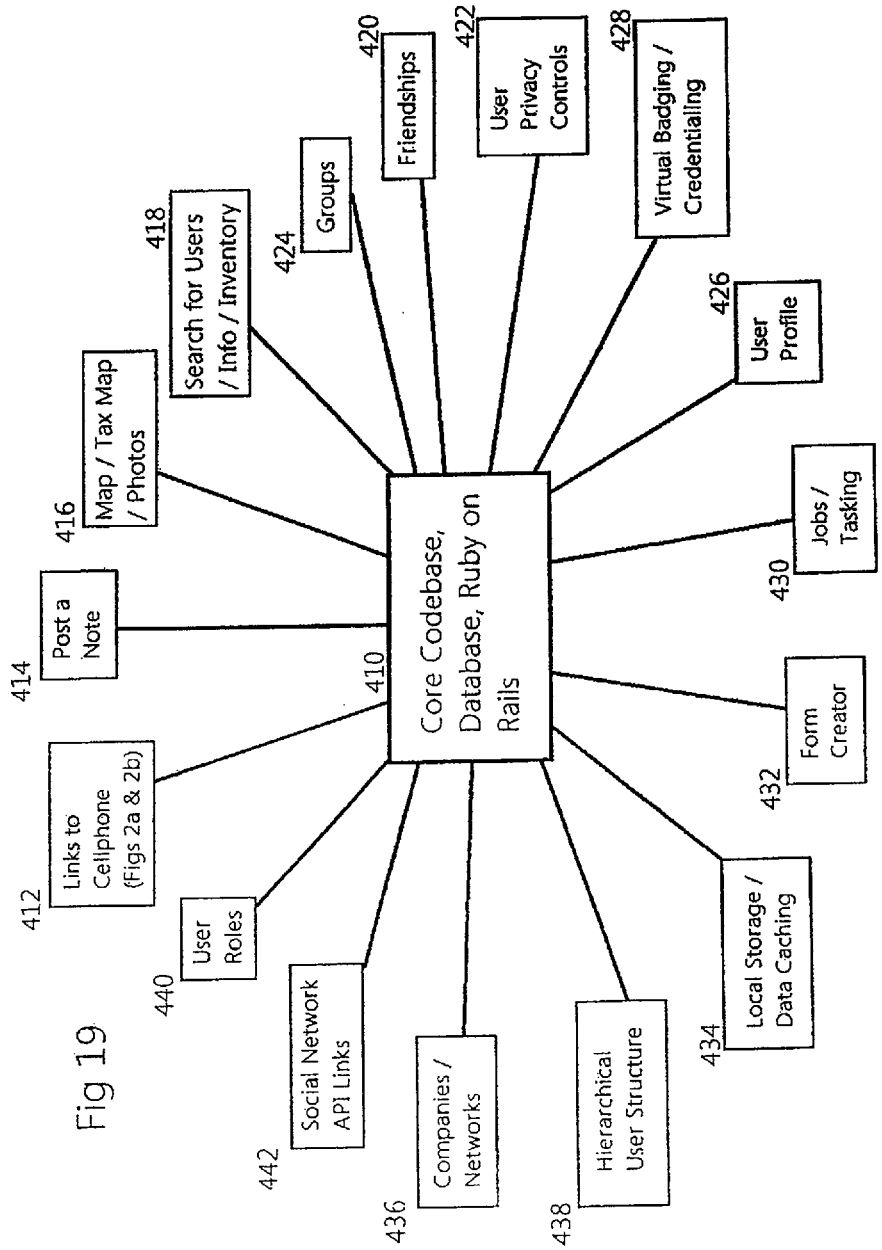
FIG. 19 is a block diagram of the components associated with the functions of FIGS. 17 and 18.

FIG. 19 is a block diagram of the components of the software system processor with a sample of the software's plug in modules. The core component of the system is the database or core code base 410. Links to an electronic device are illustrated at 412. A post a note function is shown at 414. Local tax maps, maps and photographs can be associated with the database 410 at 416. A search for users, an asset inventory, or other information takes place at 418. Friendships are associated with the database at 420 and user privacy controls which can control access to the friendships take place at 422. Groups are associated with the database 424. As a further example, friendships or groups could exchange prescribed virtual badge data to another approved user in a situation like a classroom or conference setting where virtual badge users previously might have exchanged business cards. As a further example, using API systems, this exchange may be automatically loaded into a virtual badge user's Outlook Contact file on his personal cell phone device. A user profile is established at 426. Badging and credentialing is associated with specific users at 428. Jobs and tasks which are required to be performed are associated with the data base at 430. A form creator is associated with the database at 432. Local storage and caching takes place at 434. Companies and networks are connected to the database at 436. A hierarchical user structure for the database is established at 438. User roles are established at 440. Network API links and/or social network links are provided at 442.

Referring to FIG. 20, a cell phone 500 with an illustrative embodiment of a virtual badge 502 is shown. The virtual badge may be shown while still allowing the user the capability of using the cell phone, such as making calls 504, ending calls 506, or applications for web-browsing 508, texting 510, or gaming 512.

Figure 21:
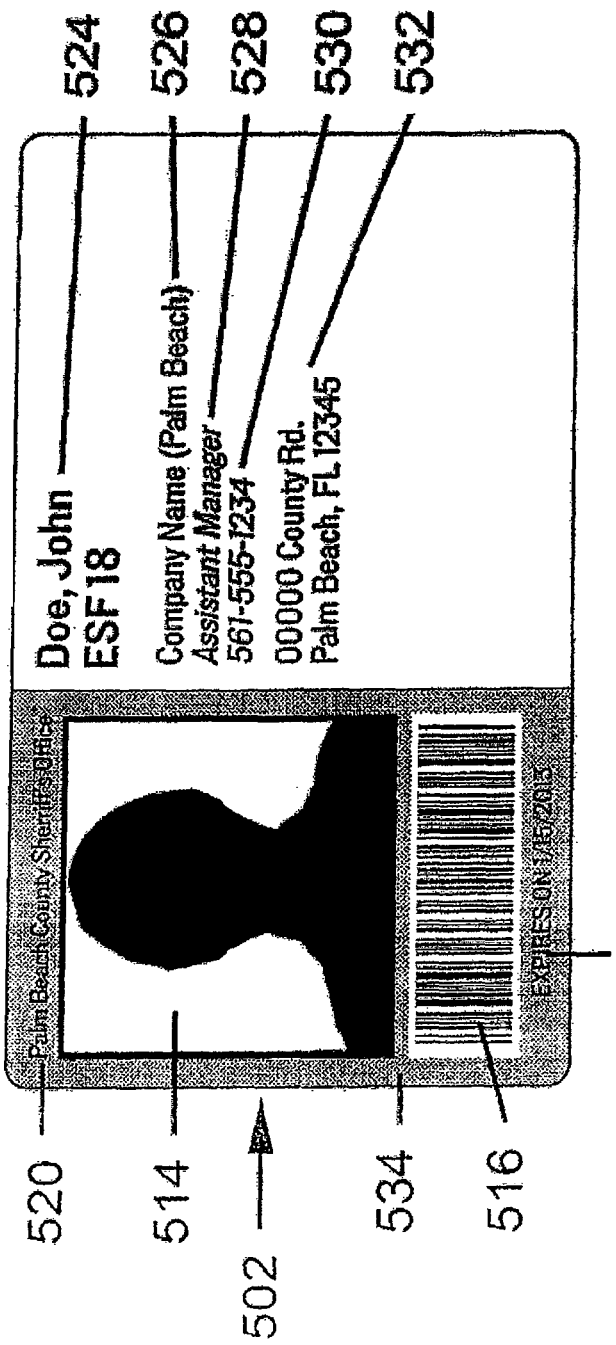
FIG. 21 is an illustrative embodiment of the virtual badge in accordance with the present invention.

Referring to FIG. 21, an illustrative embodiment of the virtual badge 502 as illustrated in FIG. 20 is shown. The virtual badge in the phone, or a handset, can be designed and programmed to be functional by displaying fixed data or data that can be changed, include a variety of information such as an image 514, a picture of the individual, a barcode or QR code 516 (provides for additional functionality) which contains the same and/or additional data about the user and which can be scanned for that data on the image via another electronic device with scanning technology or any other scanning technology, such as barcode or QR code readers. This virtual badge concept in this figure can be applied to electronic devices like both Smart phones and Feature phones alike. In addition to the photo images, or as part of being Federal Information Processing Standard (FIPS) Compliant, the virtual badge 500 may include details like the badge's issuing agency name 520, expiration date 522, as well as other text based identification, such as name of the individual 524, company identification 526, title 528, and phone number 530. In addition to or if the person with the virtual badge is an individual, the address of the location the individual is allowed access to or the address at which the individual resides 532 can be included. Such information is for illustrative purposes only and is not meant to be limiting; whatever other information or FIPS standards may be imposed can be included in the badge.

Figure 22:
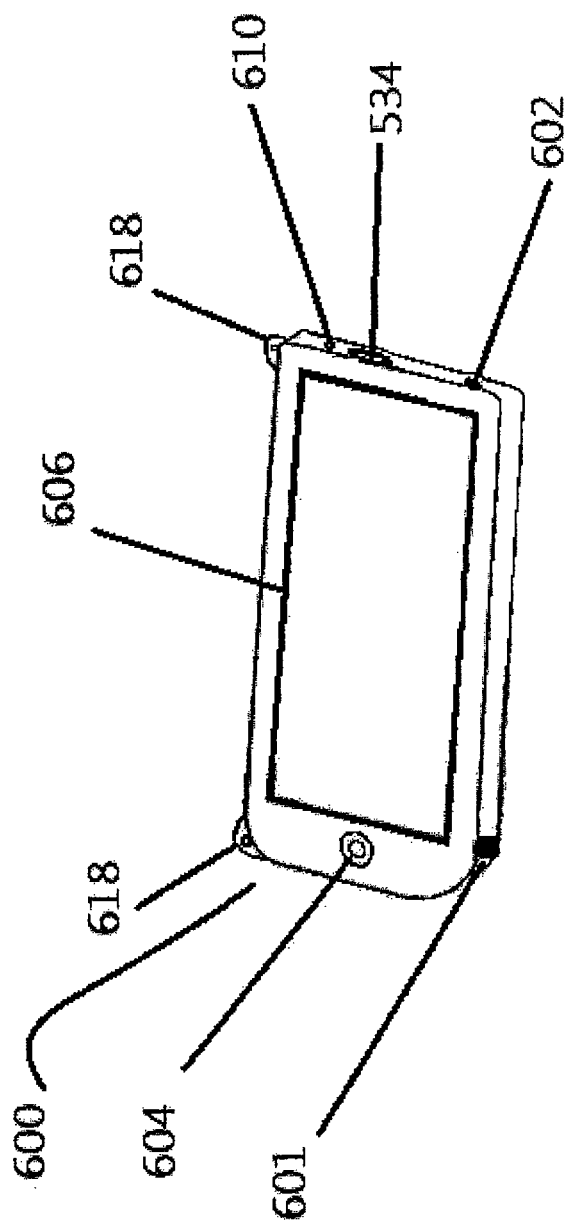
FIG. 22 is a perspective view of a virtual badge device according to a preferred embodiment of the present invention.
Figure 26:
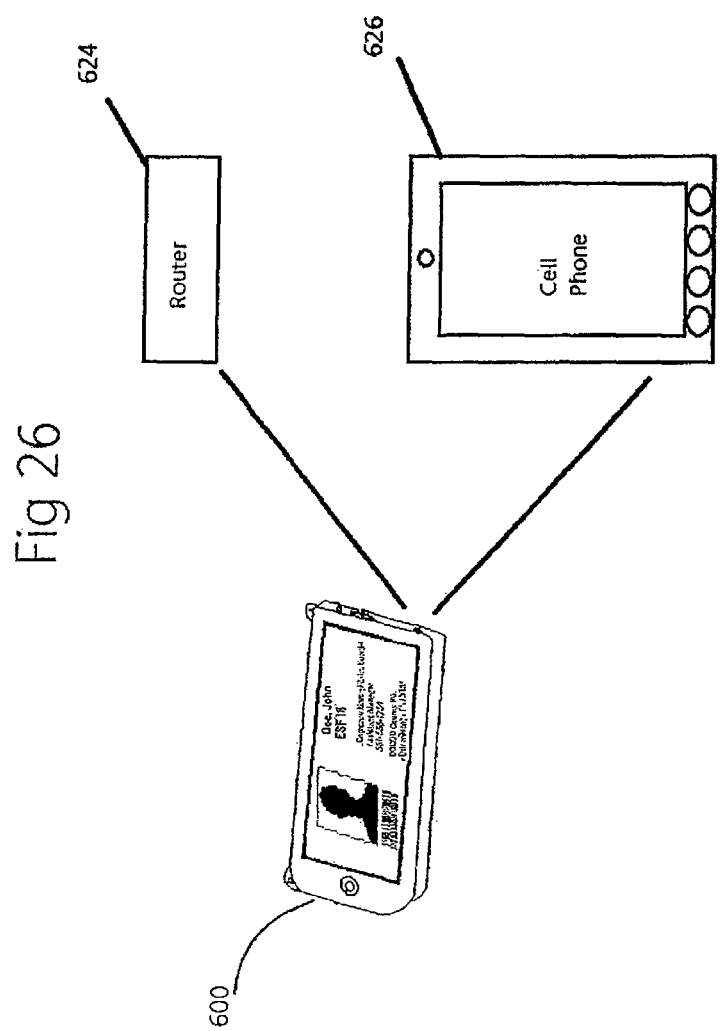
FIG. 26 is a diagram illustrating use of a separate electronic device with a virtual badge connecting either through a router to a Wi-Fi or Mesh Wi-Fi Network or to a cell phone.

FIG. 22 refers to an illustrative embodiment of the virtual badge on a separate, independent electronic display device 600. The electronic display device 600 is preferably designed to be portable, small, lightweight, and very inexpensive to manufacture. This device may be either linked to a cell phone via wireless technology or it can function independent of a cell phone, linked to a local Wi Fi or other wireless network, which is able to monitor the virtual badge device just like described for the cell phone virtual badge, within that Mesh Network, as an example. The device may optionally contain a cellular radio chip at 601. This optional cellular radio chip allows the device to communicate over established cellular radio channels such as 3G and 4G. The device is power cycled by holding down the control button at 602. Once the sync/control button at 604 is activated by holding down the button, the device will sync wirelessly to a designated cell phone or to a WiFi or wireless network as shown at FIG. 26. At that time, a digital passcode is displayed on the device's screen 606. The cell phone user, a laptop server, or an administrative server can enter in the passcode to sync to that specific device. Once the user is authorized to sync with the device or WiFi or wireless network, either the administrator will transmit the user's virtual badge data, photos, and images into the cell phone and/or into the device itself wirelessly, with the new data, photos, and images now stored within the device's memory at 608.

Figure 24:
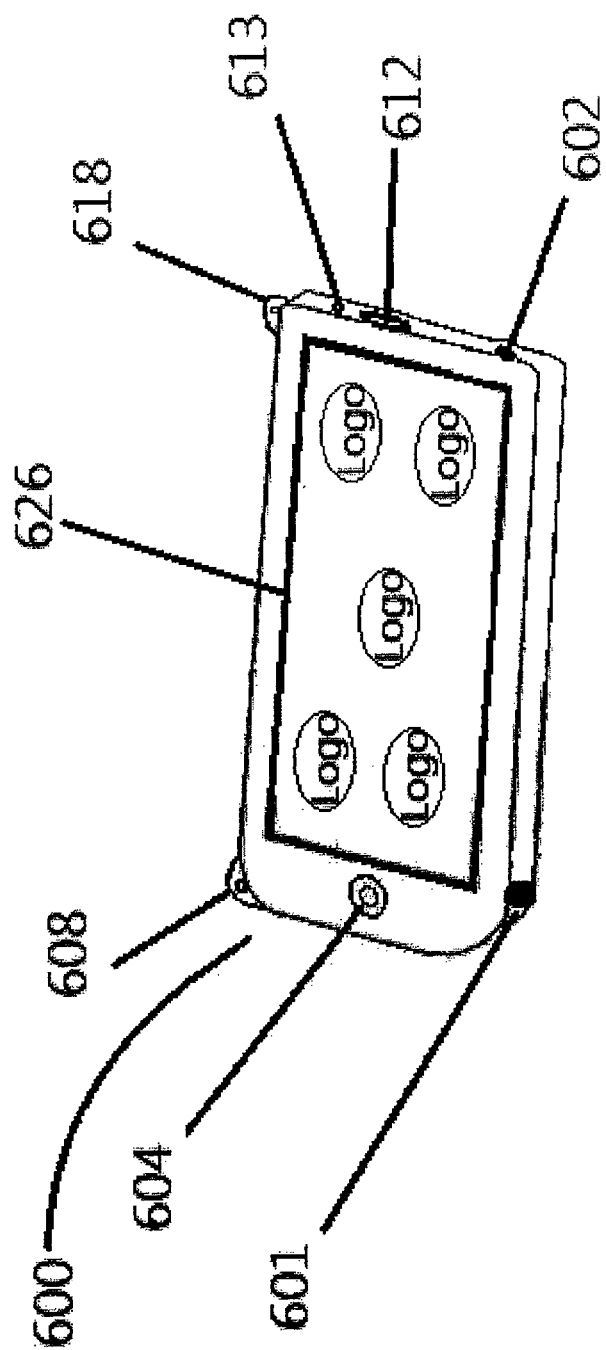
FIG. 24 is a perspective view of a virtual badge device displaying a sample of one potential custom view of a sample badge with various logos.
Figure 25:
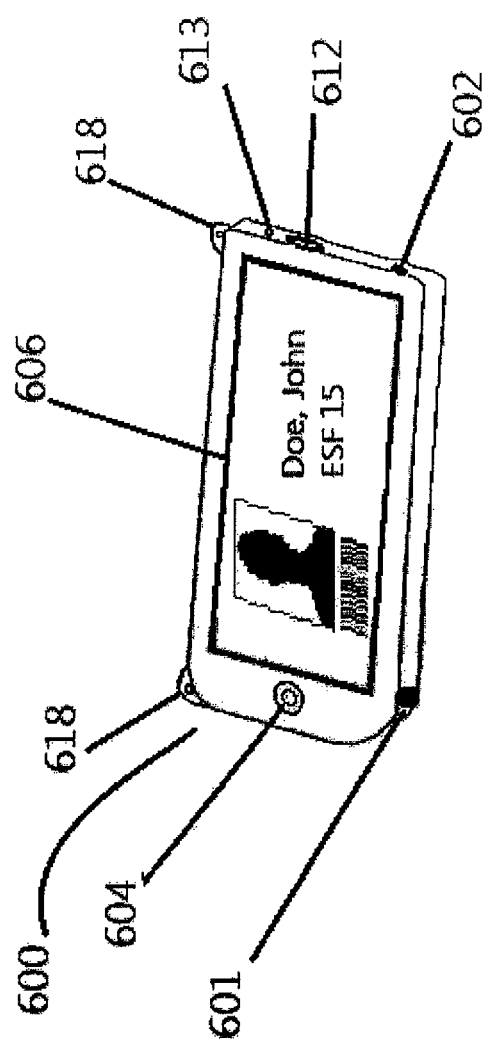
FIG. 25 is a second view of a virtual badge device displaying a second sample of a second potential custom view of a sample badge with illustrative identification information.

The electronic display device 600 includes alternate power sources like a rechargeable battery pack 610, a USB port 612 to recharge the battery and/or synch to a separate computing device, a power adapter 613 to recharge the battery and/or directly power the device, and a control unit including a circuit board at 614, such as a printed circuit board and/or a microcontroller with memory capacity to store limited amounts of data, including images and/or photos, see FIG. 25. The circuit board at 614 also could be programmed to randomly create a unique pin ID number for security reasons, such as for example to help avoid hackers corrupting a payment gateway. The electronic device also includes the necessary associated circuitry at 616 to electrically couple to the display screen 606, such as an LCD screen. The electronic display device 600 could be worn by the user, hanging from a lanyard with clips like at 618, see FIG. 24, similar to plastic badges. For additional tracking and access control features, this lightweight electronic display device 600 also could contain an RFID tag or NFC chip 620, which could be used for additional user tracking via RF check-points, or for opening doors, locks, or other security devices which the RFID or NFC chip 620 can be provided credentials. The RFID tag could be active or passive. If passive the tag comprises at least an integrated chip or circuit, an antenna, and a substrate. If active, the tag comprises a microchip, an antennae, an on board power supply, and on board electronics. The electronic display device 600 could utilize the sync/control button 604 to manually view various screens at by pressing the button (or a scroll screen as pricing for such alternatives may become affordable for this embodiment). The power button 602 power cycles the display device 600, which button could recall the unit from a sleep mode, wherein the unit automatically transitions into a power saving mode, which time span may be pre-set by the Administrator. The electronic display device 600 could alternatively contain a chip 603 which generates a unique security code, such as when a credit card linked to the virtual badge account is used, which provides yet another anti-counterfeiting solution. The security code may be generated every time, at predetermined times, or randomly. This device could be linked to the user's own cell phone or other electronic device whereby the virtual badge data and images could be transferred by Bluetooth® or Wi Fi or other wireless link from the phone to the device. Using this method, the user's phone could be carried in its case, while the inexpensive device is hung from a lanyard so that other personnel can view the badge in the separate device.

The virtual badge displayed on the display units such as the phone as described previously could also be linked to the electronic display device 600 so that the same images are displayed on the screen 606 via BLUETOOTH® or other wireless technology. In this manner, the electronic device 600 connects to a cellular network via cellular radio chip 601, or the internet via a WI-FI or Mesh-WIFI network and receives the virtual badge information relating to the user, either through the virtual badge device, through a cell phone with the virtual badge software running 626, linked via BLUETOOTH® or other wireless technology, or through a router 624, see FIG. 26. The electronic display device 600 could further be configured to connect to the user's cell phone 626, which transfers the virtual badge info via wireless technology form the phone 624 to the electronic display device 600.

Figure 23:
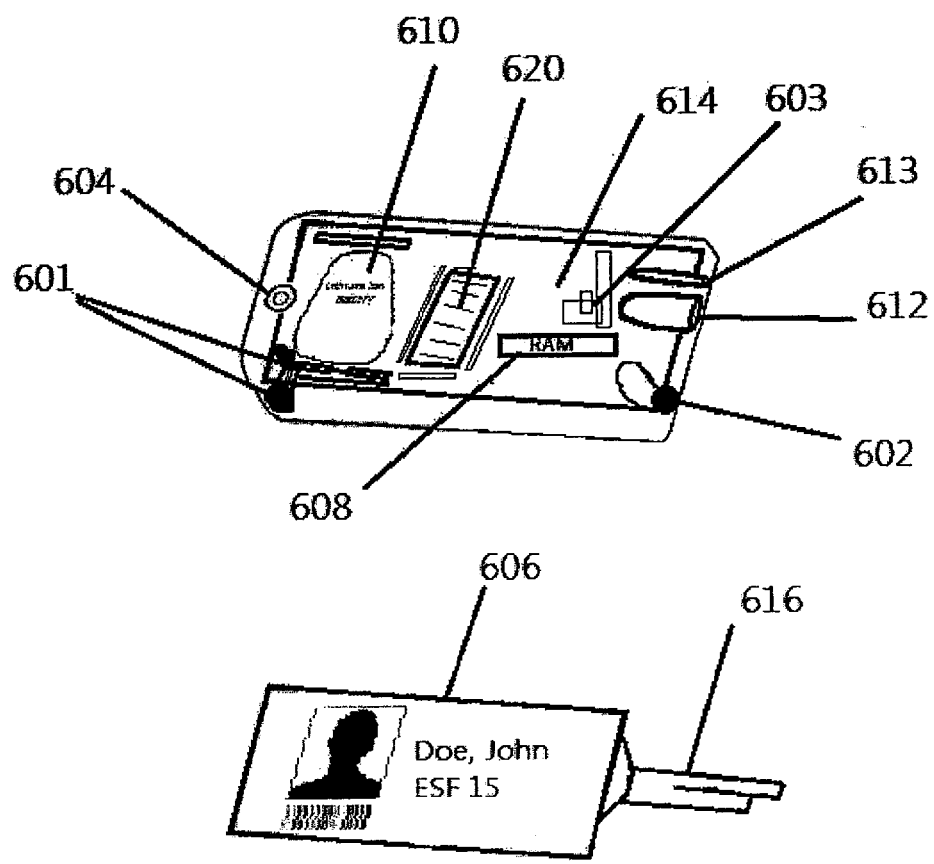
FIG. 23 shows the components of a virtual badge device illustrated in FIG. 21 or FIG. 22.

At a checkpoint where a visible inspection may be needed, the virtual badge information would be stored on the device shown at FIGS. 22 and 23. By using the power button at 602, the security person could activate the device from its "sleep mode" into a "read mode" to allow a full view of the data displayed on the LCD screen at 606. By using the control button at 604, the security person could scroll through various screens of data on its LCD screen such as the logo screen 626, see FIG. 24, to verify the appropriate issuing agencies, and then scroll the screen display to show the user's personal identification data such as in FIG. 25, where a security personnel could scan the barcode or QR code of the user's virtual badge device via 606. After scanning the virtual badge as described above, on a pre-set and adjustable interval or field of movement of the user, the device would return to its "sleep mode" to conserve the battery after a pre-set time period.

As another feature in the device, when it is in sleep mode, the device can be programmed to display in large block letters a user's identification, like his or her first name or a shape or color. The LCD screen, in its sleep mode, would have adequate back lighting to display just the basic block letters so that passer by personnel might readily identify the user and thus also authenticate that the user is in the appropriate section of the secure area or facility.

Alternatively, the device could be worn by a user and linked to a Wi Fi mesh or other wireless network within a facility, or for example, a ship. Using this method, the device contains the same data and information as described above and illustrated in FIG. 21, but in this instance, no cell phone is needed. The user still may be tracked via the RFID or NFC or other tracking technology at 535 in the device when the user passes through pre-assigned check points with readers in place. For example, if the virtual badge is used in a hotel setting, the device could be used for various access points using NFC or similar technologies to unlock hotel room doors, provide payment gateways, allow reward programs, provide local Internet access passcodes, provide hotel maps, allow for push notifications, provide enhanced safety monitoring systems, and/or provide user analytic information for increased visitor access efficiencies and analytics. After using the device, it could be swiped clean of that user's data and be ready for use by another user immediately.

Figure 27:
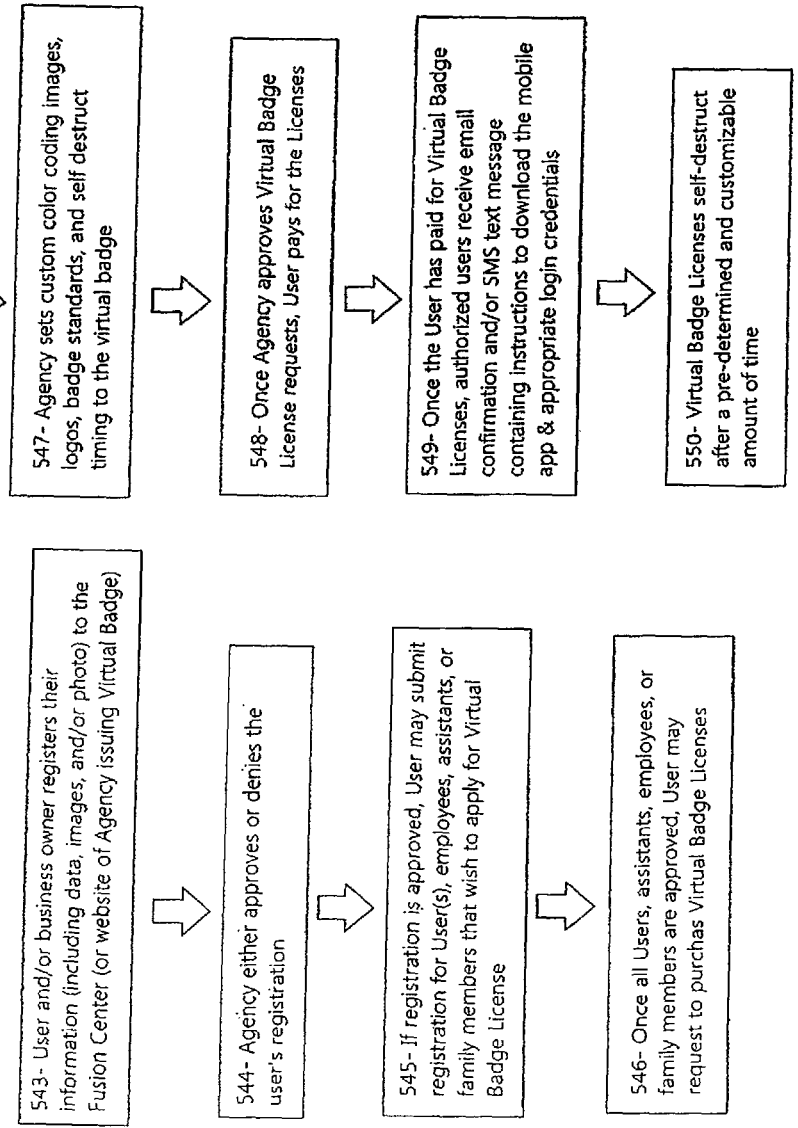
FIG. 27 is a flow chart displaying an example of the life cycle of a user requesting the virtual badge through to the self-destruction of the virtual badge.

FIG. 27 displays a chart where a user and/or business owner registers information, and then say, for example, trucker drivers or responders coming from around the country into a disaster area or guests traveling from afar to visit servicemen in a foreign or domestic military base could apply for virtual badge. The applicant/user could register through a web portal either their own personal information or employee information at 543. This registration method could incorporate a user fee to be split between various agencies. The administrator then could screen the applicant/user(s) at 544, like at 401 in FIG. 18. This screening may or may not include various levels of criminal background checks to account for various clearance levels. Once approved, the driver, individual, business, resident, or serviceman is registered. For a business or resident seeking approvals for employees and/or house staff, the business or homeowner then would enter requested data, images, and/or photos through the administrator's web portal for a secondary approval for badges for their respective employees or staff like at 544. A serviceman likewise could request a badge for his family or friends to access the base this way. The user then may request to purchase or obtain virtual badge at 546. At 547, like at 403, the administrator can customize and/or change the desired virtual badge for different access protocols for various levels of badges, programmed timed color changes of the badge, bar code or QR code styles, image data contents, various logos, photo placement, and/or pre-set self-destruct schedules. At 548, similar to 402, the administrator approves or denies the request following a payment, if needed, for the virtual badge license(s). Authorized users then receive either an email or text SMS or other form of communication with instructions on how to download with an appropriate log in credential at 549. The virtual badge then can display on the user's phone screen and/or the synced device's screen 606. Finally, the self-destruct "timer" within the virtual badge causes the badge to self-destruct and become unusable, unless a new payment or re-authorization is processed by the administrator/agency at 550.

FIG. 27 also displays a method of securing an approved virtual badge and could coincide with a user in a disaster checking in to an area and signing into to an ICS Form 211. Using the system outlined in this application, the registration could be automated and auto-loaded into the ICS 211. With the virtual badge data, an administrator could more quickly organize crews and personnel by the qualification data which might be collected as part of the virtual badge registration. Colors could be assigned to Type these personnel, again to facilitate organization of personnel. If the virtual badge was loaded into an ICS 211 in an Excel format, which may include a photo of the virtual badge user, each badge on the ICS 211 could be designed to change colors, say from green to red, to display when that user is active. This system upgrade could add to accountability for logging in and logging out on the ICS 211.

Once loaded into an ICS 211 in a format like Excel, the virtual badge with a possible added unique identifier like the user's phone number's last four digits, could be used in other ways to facilitate filling in ICS forms during an incident. Attendance at classes using such ICS 211 process also could be enhanced and eliminate the need for paper and pen registration systems which later need to be loaded into electronic systems manually or by scanning. Using copy and paste or drag and drop methods, an administrator could simply take a listed virtual badge from the ICS 211 and move it over to an ICS 204 (a work assignment sheet). Because the virtual badge user can be ranked by qualifications, crew leaders as well as crew members are more easily created in the ICS 204. Using the same methodology, an administrator can create other ICS forms as well, again relying upon the virtual badge data transfer into the various forms. For example, by linking a red or green color to the virtual badge, the administrator easily can view which users are active as well on the scene at any given moment in time based on the color linked to that virtual badge's listing on the various forms.

The present invention may be used to increase user awareness in various situations. For example, using split screen technology, a local commander can gain far broader situational awareness. For example, one screen might display a map with all of the virtual badge users in the field. A linked screen could display another map with incoming geotagged and time/date stamped field photos and forms being submitted from the virtual badge holders. Yet another screen could project thumbnail photos on the map, linked to various icons displayed on the same map, to further represent incoming field data. These photos or icons can be ringed with selected color codes by pre-designating certain fields to display certain colors on submission form the field user to more easily identify the priority or level of that icon or photo, as an administrator views a collection of such icons on a map displayed in the software. Another screen could display active and inactive command personnel on an ICS 203 or ICS 207. An interactive ICS 209 "supplement," in Excel or HTML format could be on yet another screen, allowing for monitoring events as they unfold, and allowing for the quick assignment of personnel to incoming field forms coming in from one field virtual badge user or crew and then automatically assigning another virtual badge user or crew to the task of resolving the need at that same geotagged location. With a fully functioning system integrating all the technologies described herein, with or without cell and Internet service, an Incident Commander is provided with far greater awareness and accountability of all operations.

In another embodiment of the system, a separate scanner can be attached to the electronic device directly (or through a computer on a network synced to the phone), which scanner can scan a magnetic strip or collect a random chip generated unique identifying number of an ID like a driver's license. In this method, the user's license information then is transferred directly into the virtual badge. This method is yet another alternative, though it may not share the pass through of the data into a local law enforcement or administrative network, which may or may not be desired. Nonetheless, this is yet another way for the virtual badge to load data and images where low security thresholds may be acceptable. In yet another embodiment of the system, a device like a simple I-Touch (manufactured by APPLE) with no cell capability may be tethered to a GPS device, if GPS is desired, and the software loaded on to this device would allow the device, which could be preloaded with specific data and images into its memory, to then scan in and out virtual badges and/or inventoried assets as described herein. Using mobile fingerprint hardware or biometric readers on smart phones and/or tablets, a user could load biometric data into the system For use in the 100% disconnected environment, the Bar or QR code 516, see FIG. 21, may be scanned at a check point by a guard with a Smart phone with a camera or using NFC technology, loaded with the mobile software and system. The guard's Smart phone can pull up its own cache of data information pre-loaded by the Administrator while the guard's phone was either connected by WiFi, WiFi Mesh, Bluetooth, or cell to the system. On scanning the virtual badge in a location with no cell or Internet, the guard also can retrieve verification of the data set at 547 on FIG. 27 like a photo, logos, a name, date of birth, and/or address for the guard to verify the user matches the virtual badge as displayed on the user's phone. In this embodiment, no cell service is needed at the check point, whether the check point is in a disaster area where the infrastructure has been destroyed or in a foreign country with inadequate, incompatible cell service.

All data and images can be wiped clean from the electronic device 600, allowing them to be used over and over by multiple users. For example as part of this method, by holding down the control button simultaneously for a pre-set amount of time, the device thoroughly would scrub and erase all data stored in its memory at 614. The re-use capability creates a "green" technology which can replace the generally single use plastic and paper badge technologies.

All of the tracking and mapping history of the user would be integrated into the rest of the system defined within this application to allow for mapping and data assessments. With an RFID, NFC, or other chip, users also could be passively tracked without the need for check point personnel, thereby reducing monitoring costs while simultaneously increasing the precision of monitoring due to more frequent check points being implemented. With a Wi-Fi network, as an example, coupled with an area wide system of chip check points and overlays, the administrator could in fact live time track all personnel within a facility, dependent on the coverage of the entire network and system. Further, with a Mesh Wi-Fi network, such as at a disaster or on a ship, users within the network could be live tracked with the use of chip check points and overlays, even in an environment with no cell or Internet service. Likewise, PUSH notifications within the system would allow administrators to select individual or group users of virtual badges to send messages to the users.

Besides use at check points on bridges approaching restricted barrier island communities following a disaster, this system has a broad ability to adapt to day to day uses. College campuses could use the virtual badge for visitors or prospective applicants, who can be tracked as they visit a campus if desired. Mass volunteer operations could make use of the device for short term events like parades or festivals. Travel or Tourism facilities could make use of the device to keep track of tourists entering or leaving a hotel or resort. Using the electronic devices, preferably with NFC, or RFID tracking capability or the GPS devices described in U.S. Pat. No. 8,154,440 or related applications, the virtual badge offers the ability to track a user throughout a network of roads and buildings spanning even the largest of bases and/or even third world countries, which likely will have inadequate cell tower coverage.

All facilities and/or restricted areas would benefit from a far more accurate method of ensuring that all users actually have exited an area through an exact accounting method of tracking all exiting personnel at the end of a shift or work cycle. Even in tours of sensitive federal facilities like The White House, where visitor information is sent to a clearing facility ahead of allowing entry, said data and information could be fed through the system into the cell phones and/or devices. Once activated on the day of the individual arriving for the tour, the cell phone and/or device can be worn on a lanyard, allowing for easy identification of the virtual badge holder. Further, with the RFID, NFC, or other chip, remote monitors could live track all virtual badges if so desired, or at the least, monitor all badges to make sure every user safely exits the secure area after a given time period. PUSH notifications could be used for emergency incidents as well. With the self destruct feature, virtual badge users lose access once a prescribed time period elapses in case they forget to turn in their electronic device at the end of a visit. When the user returns the badge upon exiting, the device can be wiped clean, re-charged as needed, and then re-used again countless times.

Consistent with the rest of this mobile software application, a user with an approved virtual badge on his device or cell phone, may have the device's history mapped and tracked via the GPS based, mobile application for minutes, hours and/or days, subject to the Administrator's setting. This method of tracking allows for yet another business method of charging for the virtual badge's tracking during usage by charging by the minute, just as cell phone usage is normally charged. Related to this option and if selected by an administrator as an option, a guard at a check point could turn on the tracking of the user's device via manual or electronic means at the check point for the period when the user is within the restricted area. If the user departs from the restricted area, the guard or Administrator may be alerted and/or the time, location, and the time at the location can be stored for future retrieval. As part of proper exit protocol, i.e. when the individual is no longer in the known restricted area, the guard or administrator could deactivate the tracking software in the same manner it was activated on entry. Using this option for a group of users with badges within the restricted area thus allows, for example, for law enforcement to examine all the users' track histories if there were a burglary within the restricted area to help establish which user may have been near the GPS location of the burglary at the time of the intrusion.

While the system can be designed to not let the virtual badge user deactivate the virtual badge while in such a zone, the user might disable the virtual badge by simply turning off the phone or the phone or device's battery might go dead. The system could note the time and date of such a deactivation, and either alert an administrator, or log the time, date, and last known coordinates of that virtual badge. An icon on the administrator's map representing that virtual badge also can automatically be programmed to change to a certain color as part of such an alert. With connectivity, the users could be live tracked on base maps or from a supervisor's smart phone with the application while the virtual badge users were within the restricted area. Even within areas where there are not cell towers resulting in a completely disconnected environment, the device with the virtual badge could be tracked using the methods described in the rest of this software application and its earlier versions.

Figure 28:
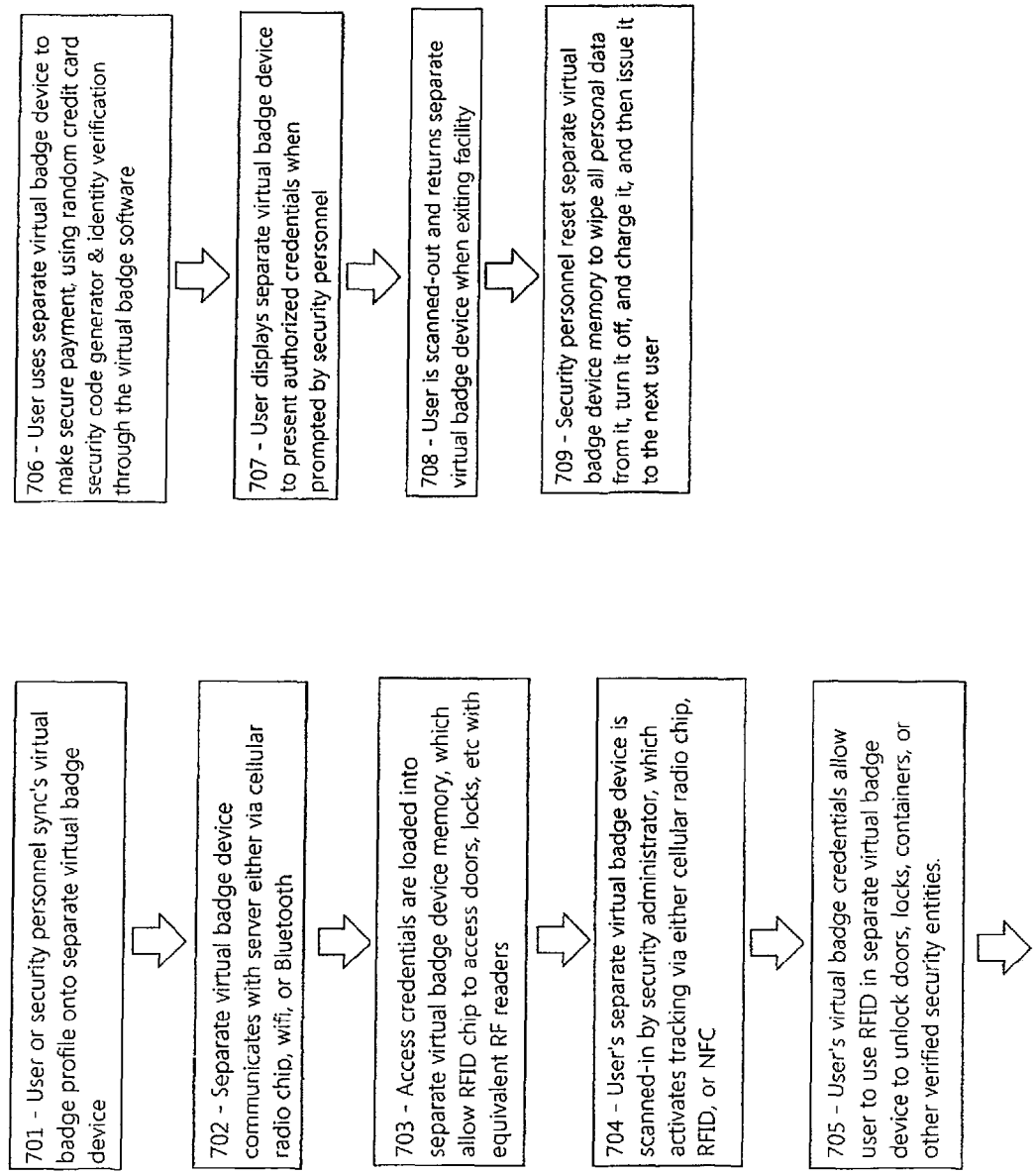
FIG. 28 is a flow chart diagram illustrating an exemplary use to control admittance to areas which require restricted access, such as laboratories, hotels, or other facilities that may have restricted zones.

Referring to FIG. 28, an illustrative use of the system, method and devices is illustrated in an access control environment. The system is also designed to allow virtual badge user profiles to be loaded onto a separate virtual badge device for the purpose of using the device to handle access control at place such as laboratories, hotels, or other facilities that may have restricted zones. A user or security personnel would sync a virtual badge profile to a separate virtual badge device 701. This separate virtual badge device would communicate with the virtual badge server 702, using its cellular radio chip 601, WIFI chip, or NFC/RFID chip 620. Once the separate virtual badge device has communicated to the server successfully at 703, this means that the appropriate access credentials are loaded into the virtual badge device's memory, which allows the device to access and open doors, locks, and other controlled areas that use RF readers. If the virtual badge administrator requires it, the user's separate virtual badge device may be scanned-in, which could optionally activate GPS tracking via either the cellular chip, RFID, or NFC chip 704. Once the virtual badge device has been loaded with an active profile, this device can be used to unlock doors, containers, or other verified security entities 705. Optionally a user may choose to use their separate virtual badge device to make secure payments, using the random credit card security code chip 603 & identity verification provided through the virtual badge software 706. If a user is prompted by security personnel 707, they may require the user to present their separate virtual badge device for the purposes of displaying authorized credentials. When the user is finished on-site, when the user leaves they will be scanned-out by security personnel and will be required to leave their separate virtual badge device before exiting the facility 708. This allows security personnel to reset the separate virtual badge device's memory, which wipes all personal data from the separate virtual badge device. The security personnel can then turn off the device, charge it, and then issue it to the next user 709.

The present invention also involves a method that allows for the primary functions of the core mobile and/or desktop software application to be easily adapted for a multitude of uses, including but not limited to: social networking, business fleet-tracking/management, disaster response, post-disaster recovery, mitigation, preparedness, and insurance claims. This technical process is accomplished by adding or subtracting plugin-modules from the code base so as to develop FEMA's Whole Community mentality for responding to disasters by users utilizing the mobile application as a part of their normal daily routine. By using the GPS based cell phone application on a regular daily basis for fun or for business, when an emergency occurs, all of the users are already adept at using the application, rather than needing some new training or refresher to recall how to use the application. The switch from normal daily use to a use designed to immediately upload numerous Situational Awareness reports from the Whole Community re-emphasizes the capacity of using non-governmental responders as force multipliers during a disaster. This collection of technical processes enables the same source code to be customized to fit a multitude of needs. This plug-in module design allows for maximum flexibility in adjusting designs to fit the Whole Community, whether for business, school, friends, family, church, or any other applicable group.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A system for controlling access to an area and monitoring movement within the area comprising a GPS and radio frequency enabled, wearable electronic device having a screen for displaying images, a processor operable to execute instructions and a data storage medium for storing instructions which when executed by the processor cause the processor to:

display a remotely changeable electronic profile corresponding to and identifying an individual requiring electronic identification on said screen, said remotely changeable electronic profile comprising at least one pictorial image, text, optical machine readable representations of data, or at least one color indicating display, said processor altering said data displayed on said screen in response to GPS location of said wearable badge or radio frequency instruction by altering said at least one of said at least one pictorial image, text, optical machine readable representations of data, or color indicating display on said screen; said electronic profile formed from a customizable set of data stored in said data storage medium for use in identifying one or more individuals, said data displayed on said screen of said electronic device forming a virtual badge to identify said individual; and execute a self-destruct mechanism associated with said virtual badge which renders said virtual badge unusable after a prescribed time period or upon command from said processor.

2. The system for controlling access to an area and monitoring movement within the area according to claim 1 further including a second electronic device electronically linked to said electronic device, said second electronic device comprising a screen for displaying images, a processor operable to execute instructions and a data storage medium for storing instructions which when executed by the processor of said second electronic device cause the processor to display said electronic profile for said individual requiring electronic identification independent of said display of said virtual badge on said electronic device.

3. The system for controlling access to an area and monitoring movement within the area according to claim 2 wherein the instructions, when executed by the processor, further cause the processor to display images, indicia, or combinations thereof which identify said individual on at least said second display unit.

4. The system for controlling access to an area and monitoring movement within the area according to claim 3 wherein said display images, indicia, or combinations thereof includes a photo of said individual, data, a pictorial image, text, optical machine readable representations of data, or combinations thereof.

5. The system for controlling access to an area and monitoring movement within the area according to claim 2 wherein said second electronic device is configured for GPS functionality.

6. The system for controlling access to an area and monitoring movement within the area according to claim 2 further including an electronic identification system database electronically linked to said electronic device or said second electronic device and stored remote from said electronic device and said second electronic device, said electronic identification system database comprising a set of data for identifying one or more said individuals.

7. The system for controlling access to an area and monitoring movement within the area according to claim 2 wherein said second electronic device includes an RFID tag or a NFC chip.

8. The system for controlling access to an area and monitoring movement within the area according to claim 2 wherein the instructions associated with said second electronic device, when executed by the processor, further cause the processor to generate a unique identification number associated with said second electronic device.

9. The system for controlling access to an area and monitoring movement within the area according to claim 1 wherein the instructions, when executed by the processor, further cause the processor to:
display images, indicia, or combinations thereof which identify said individual.

10. The system for controlling access to an area and monitoring movement within the area according to claim 9 wherein said display images, indicia, or combinations thereof include a photo of said individual, data, a pictorial image, text, optical machine readable representations of data, or combinations thereof.

11. The system for controlling access to an area and monitoring movement within the area according to claim 1 wherein said electronic device is configured for wireless communication.

12. The system for controlling access to an area and monitoring movement within the area according to claim 1 wherein said at least one color indicating display includes a color stripe, a watermark, colored background, or combinations thereof into said virtual badge.

13. The system for controlling access to an area and monitoring movement within the area according to claim 12 wherein the instructions, when executed by the processor, further cause the processor to change said color stripe or colored background to a second color after a prescribed time period.

14. The system for controlling access to an area and monitoring movement within the area according to claim 1 wherein said electronic device includes an RFID tag or a NFC chip.

15. The system for controlling access to an area and monitoring movement within the area according to claim 1 wherein the instructions, when executed by the processor, further cause the processor to map or track said virtual badge.

16. The system for controlling access to an area and monitoring movement within the area according to claim 1 wherein the instructions, when executed by the processor, further cause the processor to determine at least one location of said virtual badge; and store said location within said electronic display device.

17. The system for controlling access to an area and monitoring movement within the area according to claim 1 wherein the instructions, when executed by the processor, further cause the processor to determine if said individual is eligible to use said virtual badge.

18. The system for controlling access to an area and monitoring movement within the area according to claim 1 wherein the instructions, when executed by the processor, further cause the processor to send an electronic message to a printer, said message including information which allows said printer to replicate said virtual badge on a non-electronic medium.

19. The system for controlling access to an area and monitoring movement within the area according to claim 1 further including an electronic identification system database stored remote from said electronic device, said electronic identification system database comprising a set of data for identifying or qualifying one or more said individuals.

20. The system for controlling access to an area and monitoring movement within the area according to claim 19 wherein said electronic identification system database is electronically linked to said electronic device.

21. The system for controlling access to an area and monitoring movement within the area according to claim 20 wherein said electronic link is wireless.

22. The system for controlling access to an area and monitoring movement within the area according to claim 19 wherein said electronic profile is established by an administrative entity.

23. The system for controlling access to an area and monitoring movement within the area according to claim 1 wherein the instructions, when executed by the processor, further cause the processor to generate a unique identification number.

24. The system for controlling access to an area and monitoring movement within the area according to claim 1 wherein the instructions, when executed by the processor, further cause the processor to adjust a ping rate for either synching to a server or to a GPS enabled station.

25. The system for controlling access to an area and monitoring movement within the area according to claim 1 wherein the instructions, when executed by a user, cause the processor to fill in forms on said device.

26. The system for controlling access to an area and monitoring movement within the area according to claim 25 wherein the instructions, when executed verbally by a user cause the processor to fill in forms on said device via voice communication.

27. A system for controlling access to an area and monitoring movement within the area comprising a GPS or radio frequency enabled, wearable electronic device having a screen for displaying images, a processor operable to execute instructions and a data storage medium for storing instructions which when executed by the processor cause the processor to:

display a remotely changeable electronic profile corresponding to and identifying an individual requiring electronic identification on said screen, said remotely changeable electronic profile comprising at least one pictorial image, text, optical machine readable representations of data, and at least one color indicating display, said processor altering said data displayed on said screen in response to GPS location of said wearable badge or radio frequency instruction by altering said at least one of said at least one pictorial image, text, optical machine readable representations of data, or color indicating display on said screen, said data displayed on said screen of said electronic device forming a virtual badge to identify said individual; and execute a self-destruct mechanism associated with said virtual badge which renders said virtual badge unusable after a prescribed time period or upon command from said processor.

* * * * *